US009835875B2

(12) United States Patent
Becken et al.

(10) Patent No.: US 9,835,875 B2
(45) Date of Patent: Dec. 5, 2017

(54) METHOD OF CALCULATION FOR DETAILED WAVERFRONT CALCULATION FOR SPECTACLE LENSES WITH A DIFFRACTIVE GRATING

(75) Inventors: Wolfgang Becken, Munich (DE); Gregor Esser, Munich (DE); Helmut Altheimer, Baisweil-Lauchdorf (DE); Edda Wehner, Emmering (DE); Stephan Trumm, Munich (DE); Rainer Sessner, Roth (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 1026 days.

(21) Appl. No.: 13/988,130

(22) PCT Filed: Nov. 16, 2011

(86) PCT No.: PCT/EP2011/005782
§ 371 (c)(1),
(2), (4) Date: Jun. 18, 2013

(87) PCT Pub. No.: WO2012/065738
PCT Pub. Date: May 24, 2012

(65) Prior Publication Data
US 2013/0261782 A1 Oct. 3, 2013

(30) Foreign Application Priority Data
Nov. 17, 2010 (DE) .................... 10 2010 051 762

(51) Int. Cl.
*G02C 7/02* (2006.01)
*G01M 11/02* (2006.01)
*G05B 19/418* (2006.01)

(52) U.S. Cl.
CPC ............. *G02C 7/028* (2013.01); *G01M 11/02* (2013.01); *G02C 7/02* (2013.01); *G05B 19/418* (2013.01); *G02C 2202/22* (2013.01)

(58) Field of Classification Search
CPC ............................... G02C 7/024; G02C 7/028
(Continued)

(56) References Cited

U.S. PATENT DOCUMENTS

| 8,757,800 B2* | 6/2014 | Esser | G02C 7/02 351/159.76 |
| 2003/0016355 A1* | 1/2003 | Koike | G01J 3/18 356/328 |

FOREIGN PATENT DOCUMENTS

| WO | WO 02/084381 | 10/2002 |
| WO | WO 2005/098518 | 10/2005 |
| WO | WO 2008/089999 | 7/2008 |

OTHER PUBLICATIONS

Zhao, Chunyu, and James H. Burge.; Generalized Coddington Equations for Refractive/Diffractive Hybrid Surfaces; Proc. of International Optical Design Conference, Wyoming, Jackson Hole. www.osapublishing.org. Optical Society of America, Jun. 2010. Web. Apr. 6, 2016.*

(Continued)

*Primary Examiner* — Zachary Wilkes
(74) *Attorney, Agent, or Firm* — Schiff Hardin LLP

(57) ABSTRACT

Method for assessing an optical property of $k^{th}$ order of an optical element at an evaluation point. The optical element has a boundary surface formed of a refractive base surface and a phase-modifying optical element. The method includes determining the properties of a wavefront in the local surrounding of the evaluation point by means of a local wavefront tracing, and
determining the optical property at the evaluation point based on the properties of the wavefront in the local surrounding of the evaluation point, (Continued)

wherein the local wavefront tracing has a local wavefront tracing upon passage through the boundary surface, and the local wavefront tracing upon passage through the boundary surface is performed according to the equation for the local wavefront tracing through the refractive base surface, the equation being supplemented by an additive additional term $PK^{(k)}$.

21 Claims, 18 Drawing Sheets

(58) Field of Classification Search
 USPC .......................... 351/159.74, 159.75, 159.76
 See application file for complete search history.

(56) References Cited

OTHER PUBLICATIONS

Zhao, Chunyu, and James H. Burge.; Coddington Equations; University of Arizona, Jun. 2010. Web. Apr. 6, 2016.*
Lindlein, Norbert, and Johannes Schwider. "Local Wave Fronts at Diffractive Elements."Journal of the Optical Society of America, vol. 10, No. 12, Dec. 1993, pp. 2563-2572.*
Campbell, Charles E. "Generalized Coddington Equations Found via an Operator Method."Journal of the Optical Society of America, vol. 23, No. 7, Jul. 2006, pp. 1691-1698.*
International Search Report issued for PCT/EP2011/005782 dated Feb. 24, 2012.

* cited by examiner

METHOD OF CALCULATION FOR DETAILED WAVEFRONT CALCULATION FOR SPECTACLE LENSES WITH A DIFFRACTIVE GRATING

BACKGROUND

A method for determining the optical properties of a spectacle lens for all visual points is based on a determination of the course of a main ray at each visual point and of the wavefront belonging to this main ray for an extension determined by the pupil diameter. The wavefront can be considered to be known when it is sufficiently known within a specific approximation, e.g. when Zernike coefficients can be indicated for the wavefront up to a specific order. This order can be the second order if the prismatic power, the refractive power, and the astigmatism are exclusively relevant, the third order if coma and trefoil are to be considered as well, the fourth order if the spherical aberration is to be considered as well, or even a higher order.

It is known from the prior art to determine the shape or form of these wavefronts for optical elements, and in particular for spectacle lenses, which are restricted by at least two refractive boundary surfaces. For example, this can be accomplished by numerically calculating a sufficient number of neighboring rays, along with a subsequent fit of the wavefront data by Zernike polynomials. A different approach is based on a local wavefront tracing (cf. WO 2008 089999 A1). Here, only one single ray (the main ray) is calculated per visual point, and concomitantly the derivatives of the vertex depth of the wavefront with respect to the transversal coordinates (perpendicular to the main ray). These derivatives can be created up to a specific order, the second derivatives describing the local curvature properties of the wavefront (such as refractive power, astigmatism) and the higher derivatives being related to the higher-order aberrations.

With a tracing of light through a spectacle lens, the local derivatives of the wavefront are calculated at a suitable position in the ray path in order to compare them there with desired values resulting from the refraction data of the spectacle lens wearer. This position can be the vertex sphere, for example. To this end, it is assumed that a spherical wavefront originates at an object point and propagates to the first spectacle lens surface. The wavefront is refracted there and subsequently propagates to the second spectacle lens surface, where it is refracted again. If further surfaces are present, the alternation of propagation and refraction is continued until the last boundary surface has been passed. The last propagation takes place from this last boundary surface to the vertex sphere.

WO 2008 089999 A discloses the laws for refraction on refractive surfaces not only for second-order aberrations or optical properties, but also for higher orders. If a wavefront with local derivatives known up to a specific order is incident on a boundary surface in an oblique manner, then the local derivatives of the outgoing wavefront can be calculated up to the same order by means of the calculation methods according to WO 2008 089999 A1. Such a calculation, in particular up to the second order, is important to the assessment of the image formation properties or optical properties of a spectacle lens in its wearing position. In particular, such a calculation is of great importance if a spectacle lens in its wearing position is to be optimized over all visual points.

To improve optical elements/systems, and in particular spectacle lenses, it may be advantageous to additionally introduce optical components into the ray path, which are based on other physical effects than a mere refraction at a curved boundary surface. For example, it is known from the prior art to use diffractive optical elements (DOE) to reduce the color fringe (i.e. the lateral chromatic aberration and/or the chromatic aberration) of image-forming systems/elements. However, if at least one of the boundary surfaces of an image-forming system/element is configured in a more complicated way, for example by including a diffraction grating, then the prior art laws relating to the refraction cannot be applied here.

In the case of an optical element/system with at least one diffraction grating, it has not been possible so far to perform a precise wavefront tracing. This means that the advantages of a diffraction grating cannot be used to the fullest. Specifically, according to the prior art, a refractive error possibly resulting from the introduction of the diffraction grating could at best be calculated very generally, vaguely, and in any way not precisely in the wearing position. In the case of an optical element with at least one phase-modifying (phase-delaying or phase-modulating) element, it is also not possible to perform a precise wavefront tracing with the methods known.

It is an object of the invention to provide a method and a corresponding device, which allow performing a fast and efficient tracing of the optical properties of an arbitrary optical element or system with at least one phase-modifying optical element.

SUMMARY

A first aspect of the invention relates to a computer-implemented method for (automatically) assessing at least one optical property of $k^{th}$ order, $k=2, 3, 4, \ldots$ of an optical element at at least one evaluation point, wherein the optical element comprises at least one boundary surface formed of a refractive base surface and at least one phase-modifying optical element. The method comprises the steps of:

determining the properties of a wavefront in the local surrounding of the at least one evaluation point by means of a local wavefront tracing; and determining the at least one optical property at the at least one evaluation point on the basis of the properties of the wavefront in the local surrounding of the at least one evaluation point, wherein the local wavefront tracing comprises a local wavefront tracing through the at least one boundary surface, and the local wavefront tracing upon passage through the at least one boundary surface is performed according to the equation for the local wavefront tracing through the refractive base surface, said equation being supplemented by an additive additional term $PK^{(k)}$, wherein the additive additional term $PK^{(k)}$ depends on the local derivatives of $k^{th}$ order of a phase function $\Psi(\bar{x},\bar{y})$, assigned to the phase-modifying optical element, with respect to the coordinates tangentially to the base surface, wherein the phase function $\Psi(\bar{x},\bar{y})$ represents the optical path length difference introduced by the at least one phase-modifying optical element as a function of the coordinates $(\bar{x},\bar{y})$ tangentially to the base surface.

The at least one optical property of $k^{th}$ order, $k=2, 3, 4, \ldots$ of an optical element is the at least one (monochromatic) image formation property of $k^{th}$ order, such as refractive power, astigmatism, coma, trefoil, spherical aberration, etc.

The invention is based on the surprising finding that the vergence equation $B=A+D$ and the corresponding higher-order equations, which describe a (local) wavefront tracing through ordinary refractive boundary surfaces, can be modified in a comparatively easy way, so that also arbitrary phase-modifying optical elements can be included. Here, either the passage of light through an isolated phase-modifying optical element or the passage through a directly successive combination of a phase-modifying optical element and a refractive base surface can be described.

Moreover, it has surprisingly turned out that a generally vectorial variable $PK^{(k)}$ can be assigned to any arbitrary, non-rotationally symmetric, phase-modifying optical element even under arbitrary, oblique-angled ray incidence conditions for every order k, k=2, 3, 4, . . . , so that the corresponding (local) vergence equation (B=A+D) and the corresponding higher-order equations for purely refractive surfaces substantially only have to be extended additively by the additional term $PK^{(k)}$ ($PK^{(2)}$, $PK^{(3)}$, $PK^{(4)}$, . . . ) in order to correctly describe the vergences for the wavefront passage in the presence of a non-rotationally symmetric, phase-modifying optical element.

In other words, however asymmetric a situation may be for which the wavefront tracing could be described precisely for purely refractive surfaces, it is sufficient to extend the corresponding equation substantially only by an additive additional term $PK^{(k)}$ in order to also describe the phase-modifying optical element correctly. Further, it has been found that the vergence of the outgoing wavefront is independent of the order in which the refractive surface and the phase-modifying optical element succeed one another.

The components of the additional additional term $PK^{(k)}$ depend on the local derivative of $k^{th}$ order (i.e. second and higher order) of a phase function $\Psi(\bar{x},\bar{y})$ with respect to the coordinates $\bar{x},\bar{y}$ tangentially to the refractive surface, i.e. with respect to the transversal coordinates. The phase function $\Psi(\bar{x},\bar{y})$ represents the optical path length difference (optical path difference or OPD), which is introduced by the phase-modifying optical element, as a function of the coordinates $\bar{x},\bar{y}$ tangentially to the refractive surface (i.e. the base surface). The description of a phase-modifying optical element by the phase function $\Psi(\bar{x},\bar{y})$ allows the constructive determination of the additive additional term $PK^{(k)}$ and the additive additional terms $PK^{(2)}$, $PK^{(3)}$, $PK^{(4)}$.

Since the additive additional term depends on the second and higher-order derivatives of the phase function with respect to the coordinates tangentially to the refractive surface of the main ray passing through the evaluation point, this term will be referred to as a "phase curvature" in the following.

If the optical property to be determined is a second-order optical property, the local wavefront tracing can be performed according to the equation $B=A+D+PK^{(2)}$.

In the above formula
A is the power vector form of the local vergence matrix of the incident wavefront at a penetration point of a main ray, which passes through the at least one evaluation point, with the at least one boundary surface;
B is the power vector form of the local vergence matrix of the outgoing wavefront at the penetration point of the main ray with the boundary surface;
D is the power vector form of the local surface refractive power matrix of the refractive base surface; and
$PK^{(2)}$ is an additive additional term, which depends on the second-order local derivatives of a phase function $\Psi(\bar{x},\bar{y})$ assigned to the phase-modifying optical element, with respect to the coordinates $\bar{x},\bar{y}$ tangentially to the base surface or refractive surface, wherein the phase function $\Psi(\bar{x},\bar{y})$ represents the optical path length difference introduced by the at least one phase-modifying optical element as a function of the coordinates $(\bar{x},\bar{y})$ tangentially to the base surface or the refractive surface of the main ray.

With regard to the technical terminology used and in particular the definition and representation in power vector form of the vergence matrix of a wavefront and the surface refractive power matrix, reference is e.g. made to document WO 2008/089999 A1, or to the publication G. Esser et al., "Derivation of the refraction equations for higher-order aberrations of local wavefronts at oblique incidence", JOSA A, vol. 27, no. 2, February 2010, pages 218 to 237, the corresponding explanations of which constitute an integral part of the disclosure of the present application.

For example, if the optical property to be evaluated is a second-order optical property (image formation property), such as sphere, astigmatism, then the additive additional term depends on the second-order derivatives of the phase function:

$$PK^{(2)} = -\begin{pmatrix} \Psi^{(2,0)}(0,0) \\ \Psi^{(1,1)}(0,0) \\ \Psi^{(0,2)}(0,0) \end{pmatrix} = -\begin{pmatrix} \partial^2 \Psi(\bar{x},\bar{y})/\partial \bar{x}^2 \\ \partial^2 \Psi(\bar{x},\bar{y})/\partial \bar{x} \partial \bar{y} \\ \partial^2 \Psi(\bar{x},\bar{y})/\partial \bar{y}^2 \end{pmatrix}\bigg|_{(\bar{x},\bar{y})=(0,0)}.$$

If the optical property to be evaluated is a third or higher-order optical property, then the additive additional term depends on the third or higher-order derivatives.

For example, if the optical property to be evaluated is a third-order optical property (image formation property), such as coma, trefoil, etc., then it holds for the additive additional term:

$$PK^{(3)} = -\begin{pmatrix} \Psi^{(3,0)}(0,0) \\ \Psi^{(2,1)}(0,0) \\ \Psi^{(1,2)}(0,0) \\ \Psi^{(0,3)}(0,0) \end{pmatrix} = -\begin{pmatrix} \partial^3 \Psi(\bar{x},\bar{y})/\partial \bar{x}^3 \\ \partial^3 \Psi(\bar{x},\bar{y})/\partial \bar{x}^2 \partial \bar{y} \\ \partial^3 \Psi(\bar{x},\bar{y})/\partial \bar{x} \partial \bar{y}^2 \\ \partial^3 \Psi(\bar{x},\bar{y})/\partial \bar{y}^3 \end{pmatrix}\bigg|_{(\bar{x},\bar{y})=(0,0)}.$$

If the optical property to be evaluated is a fourth-order optical property (k=4), then the corresponding fourth-order additional term $PK^{(4)}$ can be created by analogy with the third-order additional term $PK^{(3)}$.

The generalized Coddington equation for the second-order wavefront tracing and the corresponding equations (wavefront equations) for the wavefront tracing upon passage through a refractive boundary surface (base surface), on which a phase-modifying optical element is applied in addition, will be described in detail in the following (cf. e.g. tables 2, 2A, and 2B, and the corresponding explanations).

Within the scope of the present application, an optical element is understood to be an arbitrary, image-forming optical element or system having one or more optical component(s). The optical element may be a lens or lens system, a spectacle lens, a prism, etc. The optical element has at least on boundary surface formed of a base surface and at least one phase-modifying optical element. The optical element can have further purely refractive boundary surfaces and/or boundary surfaces with at least one phase-modifying optical element each. The wavefront tracing is performed again for each additional boundary surface in the manner described above. If the boundary surface is a purely refractive boundary surface, the additive additional term is zero. The local wavefront tracing for this surface can be performed on the basis of the equations for the wavefront tracing through a purely refractive surface, which are known from the prior art (e.g. WO 2008/089999 A1, G. Esser, et al., "Derivation of the refraction equations for higher-order aberrations of local wavefronts at oblique incidence", JOSA A, vol. 27, no. 2, February 2010, pages 218 to 237).

The refractive base surface can be an arbitrary surface, in particular a non-rotationally symmetric aspherical surface.

Within the scope of the present application, a phase-modifying optical element is an optical element (POE) that is phase-delaying or phase-modulating such that the change of the optical path length, by adding the element, depends on the penetration point of the ray. A phase-modifying optical element (POE) can be realized by a diffraction grating or diffractive optical element (DOE), for example. It is also possible to realize the POE by any other type of phase modulation, e.g. by a thin film with varying refractive index (gradient index material). Optionally, the materials delimiting the diffraction grating or forming the layer can be static or e.g. electrically switchable. Methods for producing static or switchable POEs are known from the prior art.

The phase-modifying optical element can be an arbitrary, in particular non-rotationally symmetric phase-modifying optical element. In particular, the phase-modifying optical element can be single-periodic or double-periodic phase-modifying optical element, for example. If the phase-modifying optical element is a diffractive optical element or diffraction grating, the phase function will be evaluated preferably for a predetermined wavelength and for a predetermined diffraction order ($\Psi(\bar{x},\bar{y})=\Psi(\bar{x},\bar{y},\lambda,m)$). The phase-modifying optical element can extend substantially across the entire base surface. Alternatively, the phase-modifying optical element can be arranged only in one region of the base surface.

The coordinate system $\bar{x},\bar{y},\bar{z}$ is a local coordinate system, which serves to describe the passage of a main ray through a boundary surface (a base surface with at least one diffraction grating), wherein $(\bar{x},\bar{y},\bar{z})=(0,0,0)$ holds at the penetration point of the main ray with the boundary surface, and wherein the $\bar{z}$ axis is perpendicular to the base surface there. A special possible choice of such a local system is to require that the incident ray be e.g. in the $\bar{x}$-$\bar{z}$ plane or in the $\bar{y}$-$\bar{z}$ plane. The main ray is a ray that passes through the respective evaluation point. Thus, the main ray differs from possible neighboring rays, which pass off the evaluation point. In the exemplary case of a spectacle lens, a main ray is a light ray, which starting from the object point passes through the center of the entrance pupil. Upon eye movements, the entrance pupil coincides with the ocular center of rotation, and not necessarily with the physical pupil of the eye.

Determining at least one optical property (image formation property) particularly comprises determining the second and higher-order local derivatives of the wavefront in the local surrounding of the at least one evaluation point. The second and higher-order optical properties (e.g. astigmatism, spherical power, coma, spherical aberration, etc.) in a predetermined evaluation point upon ray passage through a purely refractive boundary surface can be determined in a per se known manner on the basis of the determined derivatives of the local wavefront in the surrounding of the evaluation point. In this respect, special reference is made to document WO 2008/089999 A1, to the article by W. Becken et al. "Brillengläser im Sport: Optimierung der Abbildungseigenschaften unter physiologischen Aspekten", Z. Med. Phys., 17 (2007), pages 56-66, or to the article by G. Esser "Derivation of the refraction equations for higher-order aberrations of local wavefronts at oblique incidence", JOSA A, vol. 27, no. 2, February 2010, pages 218-237. These documents are explicitly referred to with regard to the technical terminology used as well as the connection of the second and higher-order optical properties to wavefront properties. Thus, the corresponding explanations constitute an integral part of disclosure of the present application.

The second and higher-order local derivatives of the wavefront in the local surrounding of the at least one evaluation point can be determined from the properties of the wavefront $W_{In}$ incident on the entrance surface of the optical element (e.g. described by the vergence matrix of the incident wavefront in the surrounding of the penetration point) and the properties of the optical element. The properties of the optical element e.g. comprise the surface properties of the refractive portions (or the respective refractive base surfaces) of all boundary surfaces of the optical element and the phase curvature introduced by the at least one phase-modifying optical element (POE). The surface properties of the refractive portions of all boundary surfaces in particular comprise the second and higher-order local derivatives of the vertex depth of the respective refractive base surface. The second-order surface properties of the refractive portion of a refractive base surface can be described by the surface refractive power matrix D, for example.

In the case of a second-order wavefront tracing, the variables A, B, and D can be written both as matrices and as vectors. A can be the power vector form of the vergence matrix of the wavefront incident on the boundary surface, B can be the power vector form of the vergence matrix of the outgoing wavefront, and D can be the power vector form of the surface refractive power matrix of the refractive base surface. Instead of power vectors, linear combinations of power vector components, which are combined to form a new vector, can be used as well. In particular, the normal curvatures and the torsion, i.e. the second derivatives with respect to the transverse coordinates and the mixed derivative, can be used.

The method according to the invention can also be considered an extension of the local wavefront tracing through purely refractive boundary surfaces, which is known e.g. from document WO 2008/089999A1 or from the publication by G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237, for the case of complex optical systems with at least one phase-modifying optical element. With the method according to the invention, the optical properties or image formation properties of an arbitrary optical element can be calculated exactly even in the presence of arbitrary phase-modifying optical elements that are not based on pure refraction.

Thus, it is possible to quickly and efficiently determine and assess the properties of complex optical elements, preferably in a plurality of evaluation points, in an exact manner also in the actual wearing position of the optical element. If the method for assessing at least one optical property is part of a quality assurance process or an optimization of a production process, it leads to a corresponding improvement of the entire quality assurance process or optimization process. Specifically, if the method for assessing at least one optical property is part of an (iterative) optimization and/or production process, the total potential of phase-modifying optical elements can be used full, e.g. for color fringe correction.

Since the method for assessing at least one optical property according to the invention can be performed quickly and efficiently, this method is suitable for quality assurance of optical elements as part of a mass production as well as for a fast (e.g. online) optimization of optical elements optimized individually for a specific wearing position. In particular, the method according to the invention is suitable for an individual online optimization of spectacle lenses with at least one phase-modifying optical element for a specific spectacles wearer. They can be spectacle lenses with corrected color fringe, for example, which have at least one diffraction grating. Alternatively or in addition, they can be spectacle lenses having a thin layer with a variable refractive index, for example.

Determining the at least one optical property can comprise determining the course of the main ray passing through the evaluation point.

In order to describe wavefront properties, the ray tracing of a main ray passing through an evaluation point of the optical element can be performed first. The course of the main ray can be determined by means of a "modified" ray tracing, which takes the influence of the phase-modifying optical element into consideration. In particular, determining the course of the main ray can comprise determining directional vectors N, N':

$$N = \begin{pmatrix} \sin\varphi_x \\ \sin\varphi_y \\ \sqrt{1 - \sin^2\varphi_x - \sin^2\varphi_y} \end{pmatrix}$$

and $$N' = \begin{pmatrix} \sin\varphi'_x \\ \sin\varphi'_y \\ \sqrt{1 - \sin^2\varphi'_x - \sin^2\varphi'_y} \end{pmatrix}$$

which describe the course of the main ray in front of and behind the boundary surface (e.g. the refractive base surface with the phase-modifying optical element), the components of the vectors referring to the local coordinate system $\bar{x}$, $\bar{y}$, $\bar{z}$. In the following, the part or portion of the main ray which is incident on the boundary surface will be referred to as an incident (main) ray, and the part or portion of the main ray having exited the boundary surface will be referred to as an outgoing or exiting (main) ray. Here, it can specifically be taken into consideration that the ray incident on the boundary surface, the outgoing ray, and the normal vector of the refractive surface do not necessarily lie in one plane if a phase-modifying optical element is present.

If the phase-modifying optical element is a diffraction grating, it holds for the course of the main ray through the at least one boundary surface that:

$$n'\sin\varphi'_x - n\sin\varphi_x = \frac{\partial}{\partial x}\Psi(\bar{x}, \bar{y}; \lambda, m)$$

$$n'\sin\varphi'_y - n\sin\varphi_y = \frac{\partial}{\partial y}\Psi(\bar{x}, \bar{y}; \lambda, m)$$

where
n' is the refractive index of the material behind the refractive base surface;
n is the refractive index of the material in front of the refractive base surface;

$\varphi_x$ is the angle of the incident ray against the $\bar{y}$-$\bar{z}$ plane;
$\varphi_y$ is the angle of the incident ray against the $\bar{x}$-$\bar{z}$ plane;
$\varphi'_x$ is the angle of the outgoing ray against the $\bar{y}$-$\bar{z}$ plane;
$\varphi'_y$ is the angle of the outgoing ray against the $\bar{x}$-$\bar{z}$ plane;
$\lambda$ is the wavelength; and
m is the diffraction order.

Subsequently, the local derivatives of the wavefront assigned to the main ray can be determined as described above with respect to the coordinates perpendicular to the main ray in the local surrounding of the respective evaluation point. On the basis of the determined second and/or higher-order local derivatives, the second and/or higher-order optical properties at the evaluation point of the optical element can be determined.

With the above-described method, it is possible to avoid the very computation-intensive numerical calculation of a sufficient number of neighboring points, concomitant with a subsequent fit of the wavefront data by Zernike polynomials. Thus, it is possible to quickly and efficiently determine and assess the properties of complex optical elements, preferably in a plurality of evaluation points, in an exact manner.

The method for assessing at least one optical property can further comprise obtaining surface data of the at least one refractive base surface and of the phase-modifying optical element.

The surface data of the refractive base surface and the data of the phase-modifying optical element can be obtained on the basis of measurement data of the base surface with the at least one phase-modifying optical element. The measurement data can be obtained e.g. by measuring one or more microscope images. The obtained surface data and the data of the phase-modifying optical element can be interpolated e.g. by means of suitable functions (e.g. spline functions, polynomials, etc.). However, it is possible to specify the surface data of the refractive base surface and/or the phase function of the phase-modifying optical element on the basis of theoretical data. The theoretical data can be numerical data or data in functional form, for example. The surface data of the at least one refractive base surface and of the phase-modifying optical element can be stored in and read out from a suitable memory.

Preferably, the data of the phase-modifying optical element comprises data relating to the course of the grating lines of the phase-modifying optical element. Grating lines of the phase-modifying optical element are particularly understood to be lines of the same property, e.g. of the same transmission property of the phase-modifying optical element. Preferably, a phase function $\psi(\bar{x},\bar{y})$, where $\Psi(\bar{x},\bar{y},\lambda,m)=m\lambda\cdot\psi(\bar{x},\bar{y})$, is determined on the basis of the obtained data relating to the course of the grating lines of the phase-modifying optical element such that the isolines of the phase function or the curves with $\psi(\bar{x},\bar{y})$=const.=0, 1, 2, ... are parallel to the grating lines of the phase-modifying optical element. For the phase function $\Psi(\bar{x},\bar{y},\lambda,m)$ it holds that $\Psi(\bar{x},\bar{y},\lambda,m)$=0, m$\lambda$, 2m$\lambda$, . . . . For all points lying between the grating lines, the values of the phase function can be determined by a suitable interpolation, e.g. a linear, a quadratic, etc. interpolation.

The data relating to the course of the grating lines of the phase-modifying optical element can be obtained by measuring, e.g. microscopically measuring, the phase-modifying optical element. The obtained measurement data can be interpolated by means of suitable functions (e.g. by means of spline functions, polynomials, etc.). Alternatively, the data relating to the course of the grating lines of the phase-modifying optical element can be theoretical data.

Preferably, determining the phase function comprises the steps of:
- measuring a grating projection in a predetermined plane $(\bar{x}^0, \bar{y}^0)$;
- determining a phase function $\psi^0(\bar{x}^0, \bar{y}^0)$ in a global coordinate system $(\bar{x}^0, \bar{y}^0, \bar{z}^0)$ by means of regarding the grating lines projected in the plane $(\bar{x}^0, \bar{y}^0)$ as curves $\psi^0(\bar{x}^0, \bar{y}^0) = \text{const.} = 0, 1, 2 \ldots$, wherein for all points lying between the grating lines, the values of the phase function are obtained by interpolation;
- transforming the determined phase function $\psi^0(\bar{x}^0, \bar{y}^0)$ into a local coordinate system $(\bar{x}, \bar{y}, \bar{z})$, the $\bar{z}$ axis of which is perpendicular to the base surface in the evaluation point:

$$\psi(\bar{x}, \bar{y}) = \psi^0(\bar{x}^0(\bar{x}, \bar{y}), \bar{y}^0(\bar{x}, \bar{y}))$$

- specifying a wavelength and a diffraction order;
- determining the phase function $\Psi(\bar{x}, \bar{y})$ according to the equation $$\Psi(\bar{x}, \bar{y}) = \Psi(\bar{x}, \bar{y}; \lambda, m) = m\lambda \cdot \psi(\bar{x}, \bar{y}),$$

wherein the global coordinate system $(\bar{x}^0, \bar{y}^0, \bar{z}^0)$ is a coordinate system serving to describe the base surface by its vertex depth; and the local coordinate system $\bar{x}, \bar{y}, \bar{z}$ is a local coordinate system serving to describe the passage of a (main) ray through a boundary surface, wherein $(\bar{x}, \bar{y}, \bar{z}) = (0, 0, 0)$ holds at the penetration point of the main ray with the boundary surface, and wherein the $\bar{z}$ axis is perpendicular to the base surface at the penetration point.

The plane $(\bar{x}^0, \bar{y}^0)$ is the plane that is perpendicular to the direction $\bar{z}^0$ of the global coordinate system. The global coordinate system $(\bar{x}^0, \bar{y}^0, \bar{z}^0)$ can be an arbitrary coordinate system, e.g. a coordinate system where the origin thereof coincides with the vertex of the base surface, wherein the $(\bar{x}^0, \bar{y}^0)$ plane is tangential to the base surface at the vertex.

The method for assessing at least one optical property can further comprise comparing the optical property determined at the at least one evaluation point to a predetermined target value for the at least one optical property at the at least one evaluation point.

Based on the comparison, one can decide whether the optical element satisfies predetermined quality criteria. If the optical element is a spectacle lens, the predetermined target value for the at least one optical property at the at least one evaluation point can be determined on the basis of prescription data of a spectacles wearer, which has been determined by means of refraction determination.

The method for assessing at least one optical property of an optical element can further comprise outputting the optical property determined at the at least one evaluation point and/or the result of the comparison of the optical property determined at the at least one evaluation point to a predetermined target value. The output can take place by means of suitable graphical user interfaces (GUI), for example. The output can take place in the form of isoline plots of the distribution of the at least one optical property across the optical element, for example.

In particular, the method for assessing at least one optical property of an optical element comprising at least one phase-modifying optical element can be part of a quality assurance process. For example, if it is decided that the optical element does not satisfy the predetermined quality criteria, the optical element can be discarded remached.

The method for assessing at least one optical property of an optical element can also be part of an optimization and production process. For example, the optical element can be modified within the scope of an iterative optimization process until the decision whether the optical element satisfies the predetermined quality criteria is positive. Alternatively, the iterative optimization process can be stopped after a specified number of steps. Preferably, the optimization method comprises minimizing or maximizing a target function.

The at least one optical property can be a second-order image formation property, such as astigmatism and/or spherical power; and/or a third-order image formation property, such as coma and/or trefoil; and/or a fourth-order image formation property, such as spherical aberration. Of course, it is possible to also calculate and assess other optical properties, in particular other optical properties of higher order.

Preferably, the at least one optical property is assessed at a plurality of evaluation points, the plurality of evaluation points comprising at least 1000, preferably at least 2000, further preferably at least 5000, particularly preferably at least 10000 evaluation points. Basically, the number of evaluation points is not limited. Thus, the number of evaluation points can be more than 20000.

Preferably, the optical element is a spectacle lens. The boundary surface with the at least one phase-modifying optical element can be a front surface or a back surface of the spectacle lens. However, it is possible that the boundary surface with the at least one phase-modifying optical element is an inner surface of a compound system or a laminate system, which is composed e.g. of a first optical element (e.g. a main lens) and a second optical element (e.g. a cover lens).

Preferably, the determination of at least one optical property of the spectacle lens is performed taking a predetermined average or individual wearing position of the spectacle lens and/or a predetermined average or individual object distance model into consideration. The average or individual wearing position of the spectacle lens is particularly characterized by average or individual parameters of the eyes of the spectacles wearer and parameters of the arrangement of the spectacle lens in front of the eyes of the spectacles wearer. Parameters of the eyes of the spectacles wearer and/or of the arrangement of the spectacle lens in front of the eyes of the spectacles wearer comprise the corneal vertex distance, the face form angle, the forward inclination, or pantoscopic angle, the pupillary distance, and other average or individual parameters.

The object distance model can be a model that assigns an object distance to each main ray. The object distances can be specified depending on the visual tasks to be fulfilled, the wearing situation of the spectacle lens or the spectacles, and other individual wearer-specific parameters. It is also possible to use a standardized object distance model, for example the object distance model specified in DIN 58 208 part 2 (cf. image 6).

Thus, it is possible to precisely calculate and assess the optical properties in the actual wearing position of the optical element also if at least one phase-modifying optical element is present.

Preferably, the phase-modifying optical element is a diffraction grating. The term "diffraction grating" or "diffractive optical element" (DOE) means every phase-modifying optical element to which diffraction effects have relevance. The diffraction grating usually comprises a substantially regular, preferably periodic or quasi-periodic, line-like arrangement of structures or regions in which the light is influenced such that diffraction effects have relevance. The diffraction grating may be both a finely structured diffraction grating and a coarsely structured diffraction grating (such as an MOD=multi order diffraction grating). The diffraction grating may be a transmission grating, a mechanically separated grating, particularly a sawtooth grating or blazed grating, a holographic grating, a grating realized with a varying refractive index (gradient-index-material) by a thin film or layer, etc. The structures of the diffraction gratings used can be static or in particular electrically switchable.

Preferably, use is made of diffraction gratings in which the path difference between two neighboring grating lines typically corresponds to a diffraction order of $|m|=1$ to $|m|=4$. It is also possible to use an MOD grating in which the path difference is typically in the order of $|m|\approx20$. The diffraction grating can be used in the first diffraction order. However, it is possible to use the diffraction grating not in the first diffraction order, but in a higher order. The diffraction grating can have a boundary surface that is calculated against air. It is also possible to calculate a boundary surface of the diffraction grating not against air, but against a different material.

The profile of the diffraction grating can be suitably dimensioned and set. The profile of the diffraction grating is preferably set such that the diffraction efficiency for a specific diffraction order is at a maximum. Put differently, the profile of the grating can be set such that the intensity of the diffracted light concentrates in one diffraction order, if possible. Preferably, the grating profile is sawtooth-shaped or blazed. In particular, a blazed boundary surface can be inserted between a dispersing base material and air. The lateral scale of the grating, i.e. the grating constant, can be in the order of magnitude of the wavelength. However, it is also possible to use diffraction gratings where the grating constant is not in the order of magnitude of the wavelength, but up to a factor of 100 above. The diffraction grating can be overlaid/combined with another grating, e.g. with a Fresnel grating, which has a dioptric power other than zero. As will be explained in the following, the period of the grating can be suitably determined.

In the case of a spectacle lens, the diffraction grating can extend substantially across the entire viewing angle region or across the entire region of the base lens. The grating can be arranged around a predetermined reference point, particularly around the prism reference point, around the centration or fitting point, or around the geometric center of the raw-round spectacle lens in a centered manner. However, it is also possible to arrange the grating in a decentered manner. The grating can be applied to one or both refractive boundary surfaces of the spectacle lens. However, it is also possible to provide a compound system composed of a main lens and a cover lens, wherein the grating structures are applied to the protected inner sides of the main lens and/or of the cover lens (i.e. the mutually opposite sides of the main and cover lenses).

A further aspect of the invention relates to a computer program product, i.e. a computer program claimed in the patent category of a device, and to a storage medium with a computer program stored thereon, wherein the computer program is adapted, when loaded and executed on a computer, to perform a preferred exemplary method for assessing at least one optical property of an optical element.

Moreover, a device for (automatically) assessing at least one optical property of an optical element at at least one evaluation point is proposed, wherein the device comprises calculating means adapted to perform an exemplary method for assessing at least one optical property of an optical element.

The calculating means can be implemented by means of suitably configured or programmed computers, specialized hardware and/or computer networks or computer systems, etc. The device can further comprise:
  obtaining means for obtaining surface data of the at least one refractive base surface and the phase-modifying optical element;
  storage means for storing surface data of the at least one refractive base surface and the phase-modifying optical element and/or for storing the specific at least one optical property; and/or
  output means for outputting the optical property determined at the at least one evaluation point and/or the result of the comparison of the optical property determined at the at least one evaluation point to a predetermined target value.

Moreover, the device can comprise obtaining means adapted to obtain data relating to a power of the optical element to be achieved and/or data relating to an individual or average wearing position of the optical element (e.g. the spectacle lens).

The obtaining means, the storage means, and/or the output means can be in signal communication with each other and with the calculating means.

A further aspect of the invention relates to a method for producing an optical element comprising at least one phase-modifying optical element arranged on a refractive base surface, comprising the steps of
  specifying an optical element to be optimized;
  optimizing or modifying the specified optical element so as to minimize the deviation of the value of at least one optical property of the optical element from a target value at at least one evaluation point, wherein the at least one optical property is assessed according to an exemplary method for assessing at least one optical property of the optical element. Preferably, the deviations of the values of at least one optical property of the optical element from corresponding target values are minimized at several evaluation points (in the sense of a best possible compromise).

Preferably, the method is performed iteratively, wherein each step of modifying the optical element is followed by an assessment, at at least one evaluation point, of at least one optical property of the modified optical element, an evaluation of the modified optical element depending on the at least one optical property, and optionally a further modification of the optical element. The iterative method can be stopped after a specified step. Preferably, the method is stopped when the evaluation of the optical element is positive, i.e. when a specific quality criterion is satisfied.

The method for producing an optical element can further comprise providing processing data of the optical element, which has been optimized and optionally modified in several steps. The processing data can comprise surface data of the base surface and data of the phase-modifying optical element. Also, the processing data can comprise data relating to the further boundary surfaces of the optical element and/or the thickness of the optical element and/or the refractive index of the optical element. Moreover, the method for producing an optical element can comprise finishing the optical element on the basis of the provided processing data. Methods for producing optical elements with at least one phase-modifying optical element are known from the prior art.

Preferably, optimizing or modifying the specified optical element comprises calculating a target function, which depends on the at least one optical property (image formation property). Preferably, the optimization is performed such that at least second-order aberrations are minimized. If the optical element is a spectacle lens, the target function can be a monocular or binocular target function.

An exemplary monochromatic target function is a target function of the form:

$$F_{monochrom} = \sum_i g_Z(i)(Z_\Delta(i) - Z_{\Delta,target}(i))^2 + g_S(i)(S_\Delta(i) - S_{\Delta,target}(i))^2$$

where $S_\Delta$ and $Z_\Delta$ designate the corresponding refractive error of the spherical equivalent and the amount of the astigmatic deviation, $S_{\Delta,target}$, $Z_{\Delta,target}$ designate the corresponding target values, and $g_Z(i)$ and $g_S(i)$ designate the corresponding weightings.

The monochromatic target function can be evaluated for the predetermined wavelength. Preferably though, the target function is a polychromatic target function, which considers the wavelength dependency of the optical properties directly or indirectly (e.g. by considering the chromatic aberrations).

For example, the polychromatic target function can be a target function of the type:

Type 1) $F_1 = \sum_\lambda F_{monochrom}(\lambda)$,

Type 2) $F_2 = F_{monochrom}(\lambda_0) + \sum_i g_{FLF}(i) \times f\left(\dfrac{S_{SK}(i,\lambda_2) - }{S_{SK}(i,\lambda_1)}\right)^2$, Type 3) $F_3 = F_{monochrom}(\lambda_0) + \sum_i g_{FQF}(i) \times g(\Delta\varphi_{SK}(i,\lambda_2,\lambda_1))^2$.

In the above formula:
$F_{monochrom}(\lambda)$ is a monochromatic target function for the wavelength $\lambda$;
$g_{FLF}(i)$ is the weighting of the longitudinal chromatic aberration at the $i^{th}$ evaluation point of the optical element;
$g_{FQF}(i)$ is the weighting of the lateral chromatic aberration at the $i^{th}$ evaluation point of the spectacle lens;
$S_{SK}(i,\lambda_1)$ is the vergence matrix of the wavefront at the vertex sphere for the wavelength $\lambda_1$ and for the $i^{th}$ evaluation point;
$S_{SK}(i,\lambda_2)$ is the vergence matrix of the wavefront at the vertex sphere for the wavelength $\lambda_2$ and for the $i^{th}$ evaluation point; and
$f(S_{SK}(i,\lambda_2) - S_{SK}(i,\lambda_1))$ is a function of the difference of the vergence matrices of the wavefront at the vertex sphere for two different wavelengths $\lambda_1$ and $\lambda_2$;
$\Delta\varphi_{SK}(i,\lambda_2,\lambda_1)$ is the angle between the object-side main rays for the different wavelengths $\lambda_1$ and $\lambda_2$,
and $g(\Delta\varphi_{SK}(i,\lambda_2,\lambda_1))$ is a function of the angle between the object-side main rays for different wavelengths $\lambda_1$ and $\lambda_2$.

In the polychromatic target function of the first type, an arbitrary monochromatic target function is understood to be a function of the wavelength, is evaluated for at least two different wavelengths, and is summed up via the set of at least two different wavelengths. For example, the chromatic aberrations of the optical element can indirectly be taken into consideration due to the wavelength dependency of the variables taken into account in the target function.

In the polychromatic target function of the second type, an arbitrary monochromatic target function is evaluated at a predetermined wavelength $\lambda_0$ (operating wavelength). Another term is added to this function, which depends on the difference $(S_{SK}(i,\lambda_2) - S_{SK}(i,\lambda_1))$ of the vergence matrices for at least two different wavelengths $\lambda_1$ and $\lambda_2$. The type of dependence can be selected differently. In particular, the function $f$ can be the dioptric distance between the vergence matrices or the difference of the spherical equivalents. In the latter case, the function $f$ represents a penalty term for the longitudinal chromatic aberration. The function $f$ can be an arbitrary function for which $f(0)=0$ is satisfied. Preferably, $f$ is to be selected such that $f(S_{SK}(i,\lambda_2) - S_{SK}(i,\lambda_1))$ is the greater the greater the distance between $S_{SK}(i,\lambda_2)$ and $S_{SK}(i,\lambda_1)$ is. In a further preferred embodiment, $f(S_{SK}(i,\lambda_2) - S_{SK}(i,\lambda_1))$ is the greater the greater the distance between the spherical equivalents of $S_{SK}(i,\lambda_2)$ and $S_{SK}(i,\lambda_1)$ is.

In the polychromatic target function of the third type, an arbitrary monochromatic target function is evaluated at a predetermined wavelength $\lambda_0$ (operating wavelength). Another term is added to this function, which depends on the lateral chromatic aberration. Thus, the function $g(\Delta\varphi_{SK}(i,\lambda_2,\lambda_1))$ represents a penalty term for the lateral chromatic aberration, which is determined by the angle $\Delta\varphi_{SK}(i,\lambda_2,\lambda_1)$ between the object-side main rays for the different wavelengths $\lambda_1$ and $\lambda_2$. The function $g$ can be the identity, a trigonometric function, or any other suitable function.

Examples of target functions of the first to third types are:

1a) $F_1 = \sum_{i,\lambda} g_Z(i,\lambda)\left(\dfrac{Z_\Delta(i,\lambda) - }{Z_{\Delta,target}(i,\lambda)}\right)^2 + g_S(i,\lambda)\left(\dfrac{S_\Delta(i,\lambda) - }{S_{\Delta,target}(i,\lambda)}\right)^2$ 2a) $F_2 = \sum_i \begin{pmatrix} g_Z(i)(Z_\Delta(i,\lambda_0) - Z_{\Delta,target}(i,\lambda_0))^2 + \\ g_S(i)(S_\Delta(i,\lambda_0) - S_{\Delta,target}(i,\lambda_0))^2 + \\ g_{FLF}(i) \times f(S_{SK}(i,\lambda_2) - S_{SK}(i,\lambda_1))^2 \end{pmatrix}$ 3a) $F_3 = \sum_i \begin{pmatrix} g_Z(i)(Z_\Delta(i,\lambda_0) - Z_{\Delta,target}(i,\lambda_0))^2 + \\ g_S(i)(S_\Delta(i,\lambda_0) - S_{\Delta,target}(i,\lambda_0))^2 + \\ g_{FQF}(i) \times g(\Delta\varphi_{SK}(i,\lambda_2,\lambda_1))^2 \end{pmatrix}$.

In the above formula:
$Z_\Delta(i,\lambda)$ is the actual value of the amount of the astigmatic error at the $i^{th}$ evaluation point of the optical element for the wavelength $\lambda$;
$Z_{\Delta,targ}(i,\lambda)$ is the target value of the amount of the astigmatic error at the $i^{th}$ evaluation point of the optical element for the wavelength $\lambda$;
$S_\Delta(i,\lambda)$ is the actual value of the refractive error at the $i^{th}$ evaluation point of the optical element for the wavelength $\lambda$;
$S_{\Delta,targ}(i,\lambda)$ is the target value of the refractive error at the $i^{th}$ evaluation point of the optical element for the wavelength $\lambda$;
$g_Z(i,\lambda)$ is the weighting of the amount of the astigmatic deviation at the $i^{th}$ evaluation point of the optical element for the wavelength $\lambda$;
$g_S(i,\lambda)$ is the weighting of the refractive error at the $i^{th}$ evaluation point of the optical element for the wavelength $\lambda$.

However, it is also possible to use a different suitable polychromatic target function, e.g. a target function which is a combination of the above-described target functions. In particular, the target function can include terms that depend both on the longitudinal chromatic aberration and on the lateral chromatic aberration. By the simultaneous optimization of at least one of the refractive surfaces of the base lens and the base grating, optimum correction of the color fringe of the spectacle lens can be achieved, preferably for all viewing directions.

Optimizing or modifying the optical element can particularly comprise varying or optimizing the refractive base surface and/or the phase-modifying optical element. Put differently, the base surface and/or the at least one phase-modifying optical element can represent degrees of freedom in the optimization. Preferably, the refractive base surface and/or the at least one phase-modifying optical element and particularly the phase function thereof are therefore described by means of a flexible mathematical representation. The flexible mathematical representation may be a spline representation, a polynomial representation, or any other suitable representation with at least one degree of freedom or with at least one variable parameter/coefficient.

However, it is also possible to modify or optimize a different boundary surface of the optical element with the refractive base surface being maintained and with the diffraction grating being maintained.

A further aspect of the invention relates to a device for producing an optical element, in particular a spectacle lens, with at least one phase-modifying optical element, comprising specifying means for specifying an optical element to be optimized;

optimizing means adapted to perform an optimization or modification of the specified optical element so as to minimize the deviation of the value of at least one optical property of the optical element from a target value at at least one evaluation point, wherein the at least one optical property is assessed according to an exemplary method for assessing at least one optical property of the optical element.

In particular, the optimizing means are adapted so as to perform one of the above-described exemplary optimization methods.

Moreover, the device for producing an optical element can comprise storage means for storing processing data of the optimized or modified optical element. Further, the device can comprise processing means adapted to manufacture the optical element on the basis of the provided processing data.

DRAWINGS

Further objects, features, and advantages of the present invention will become apparent from the following description of exemplary embodiments with reference to the drawings, which show:

FIG. 1 a schematic illustration of the ray course for a ray tracing and wavefront tracing for an optical system;

FIG. 2 a schematic illustration of the ray course for a ray tracing and wavefront tracing for a spectacle lens;

FIG. 3 the ray course in the case of a plane boundary surface with a diffraction grating;

FIG. 3A the mutual position of the coordinate system of the incident wavefront and the coordinate system of the base surface;

FIG. 4 grating lines of a simple periodic diffraction grating on a plane boundary surface;

FIG. 5 grating lines of a diffraction grating on a plane boundary surface;

FIG. 6 grating lines of a diffraction grating on a curved boundary surface;

FIG. 7 a flow diagram illustrating the transition between the vector field $d(\bar{x}^0, \bar{y}^0)$ and the phase function $\psi^0(\bar{x}^0, \bar{y}^0)$;

FIG. 8 the longitudinal chromatic aberration (FIG. 8A) and the lateral chromatic aberration (FIG. 8B) of a lens according to first comparative example, which has been optimized according to a monochromatic target function;

FIG. 9 the longitudinal chromatic aberration (FIG. 9A) and the lateral chromatic aberration (FIG. 9B) of lenses optimized according to a polychromatic target function of a first type (first example) and of a second type (second example), respectively;

FIG. 10A the prescription power, the refractive power, the diffractive power, and the total power in the lens center as a function of the wavelength of the lens according to the first comparative example;

FIG. 10B the prescription power, the refractive power, the diffractive power, and the total power in the lens center as a function of the wavelength for two lenses according to the first and second examples;

FIG. 11 the longitudinal chromatic aberration (FIG. 11A) and the lateral chromatic aberration (FIG. 11B) of a lens according to a second comparative example, which has been optimized according to a monochromatic target function;

FIG. 12 the longitudinal chromatic aberration (FIG. 12A) and the lateral chromatic aberration (FIG. 12B) of a lens according to a third example, which has been optimized according to a polychromatic target function of a first type;

FIG. 13 the longitudinal chromatic aberration (FIG. 13A) and the lateral chromatic aberration (FIG. 13B) of a lens according to a fourth example, which has been optimized according to a polychromatic target function of a second type;

FIG. 14A the prescription power, the refractive power, the diffractive power, and the total power in the lens center as a function of the wavelength of the lens according to the second comparative example;

FIG. 14B the prescription power, the refractive power, the diffractive power, and the total power in the lens center as a function of the wavelength of the lens according to the third example;

FIG. 14C the prescription power, the refractive power, the diffractive power, and the total power in the lens center as a function of the wavelength of the lens according to the fourth example;

FIG. 15A the refractive error at the wavelength $\lambda_C$, the refractive error at the wavelength $\lambda_F$, and the longitudinal chromatic aberration in the lens according to the second comparative example;

FIG. 15B the refractive error at the wavelength $\lambda_C$, the refractive error at the wavelength $\lambda_F$, and the longitudinal chromatic aberration in the lens according to the third example;

FIG. 15C the refractive error at the wavelength $\lambda_C$, the refractive error at the wavelength $\lambda_F$, and the longitudinal chromatic aberration in the lens according to the fourth example;

FIGS. 16A-C the color fringe of a spectacle lens for different viewing angles a) 0° b) 10° c) 20° d) 30°, wherein FIG. 16A shows a non-corrected image formation through a monochromatically optimized spectacle lens;

Figure 17A:
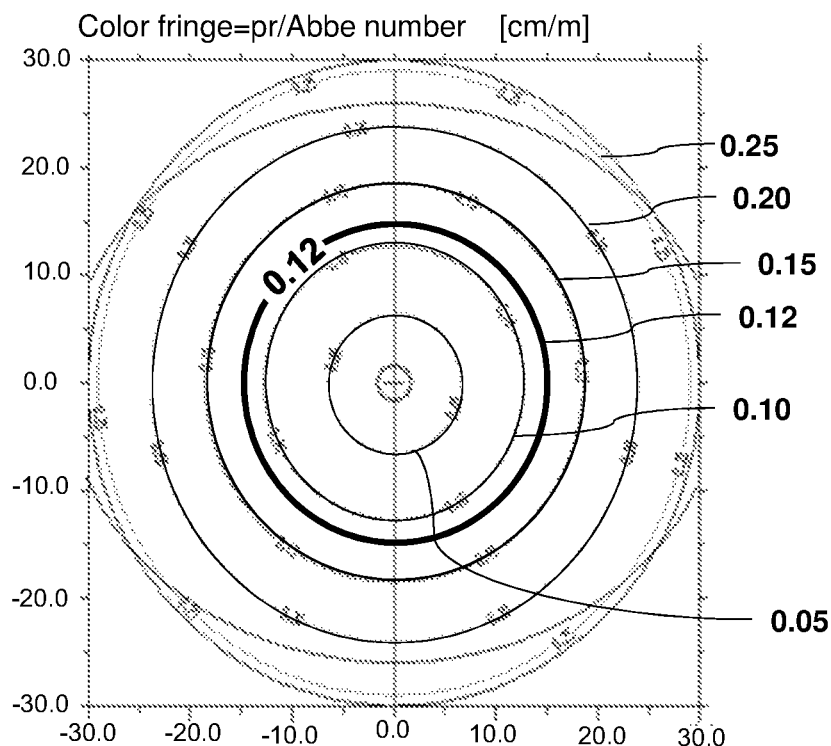
Figure 17B:
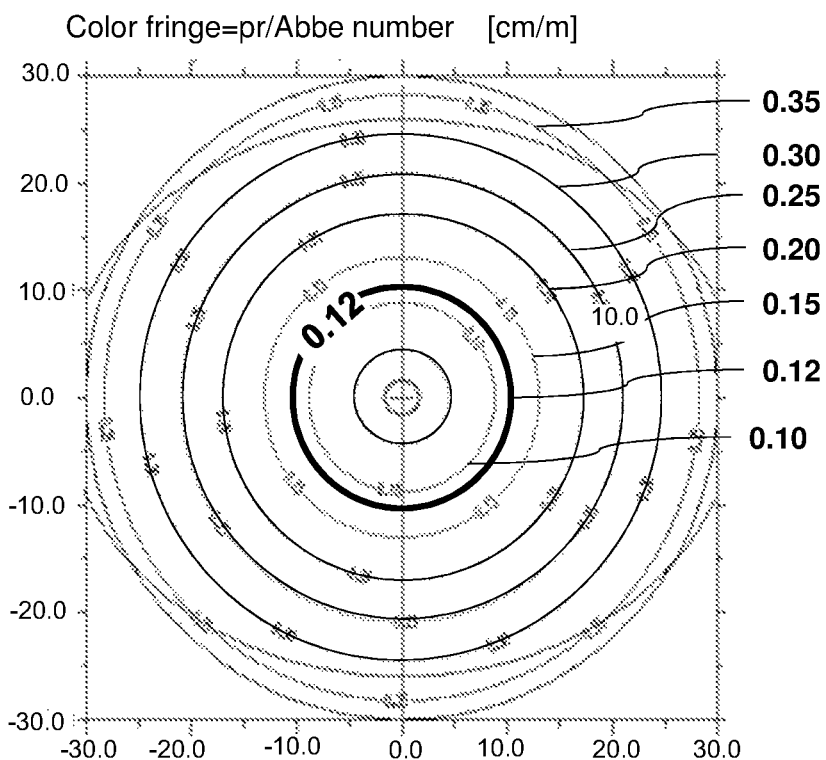

FIG. 17 an exemplary color fringe correction of a non-corrected single-vision lens, wherein FIG. 17A shows the color fringe of a non-corrected single-vision lens with an Abbe number of 58.5, FIG. 17B shows the color fringe of a single-vision lens with an Abbe number of 40.5, and FIG.

Figure 18A:
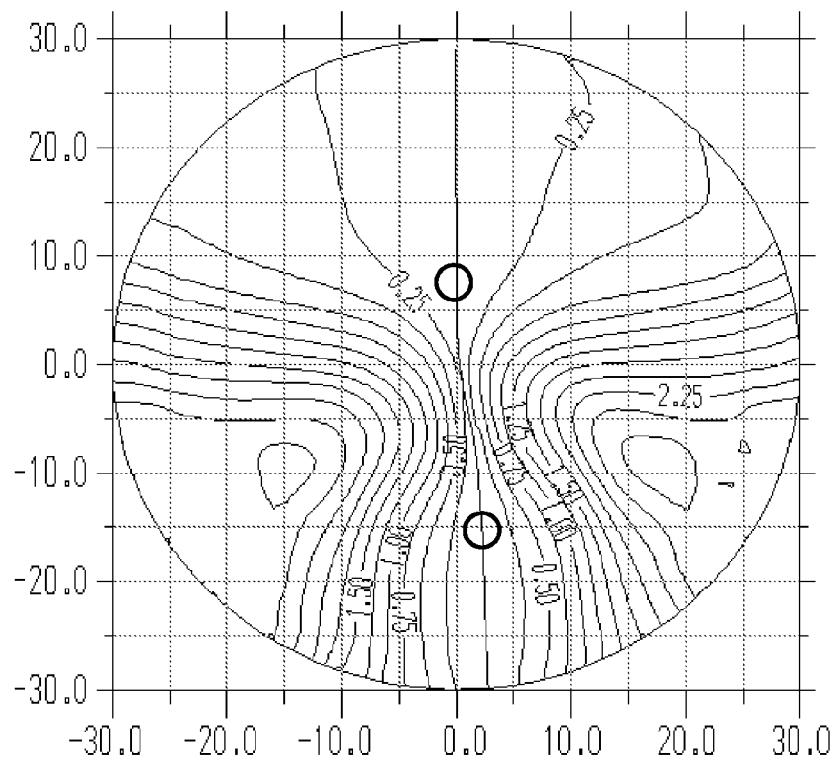
Figure 18B:
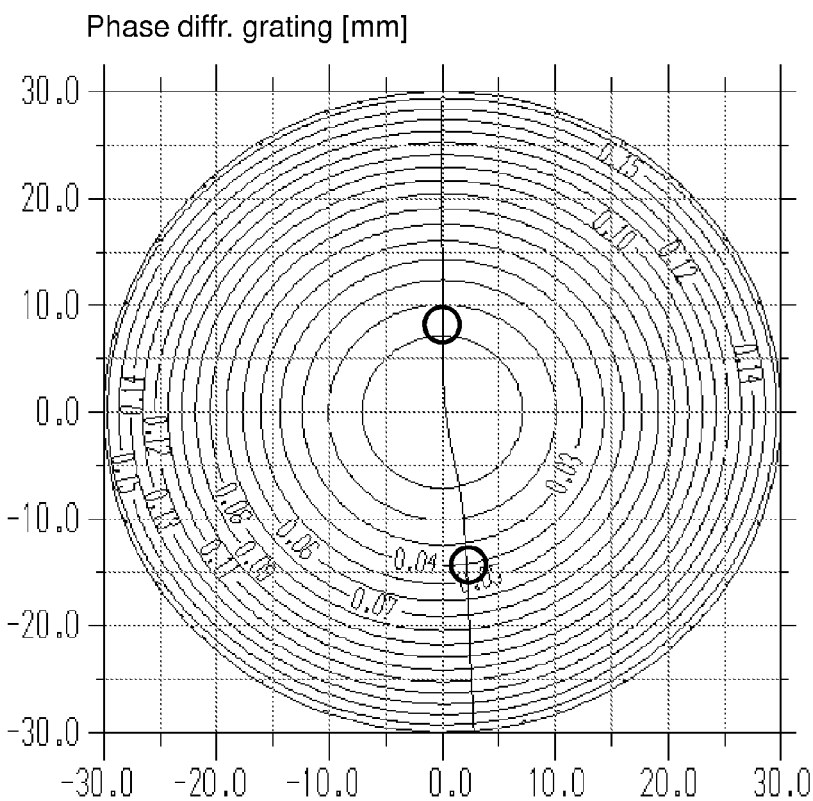
Figure 18C:
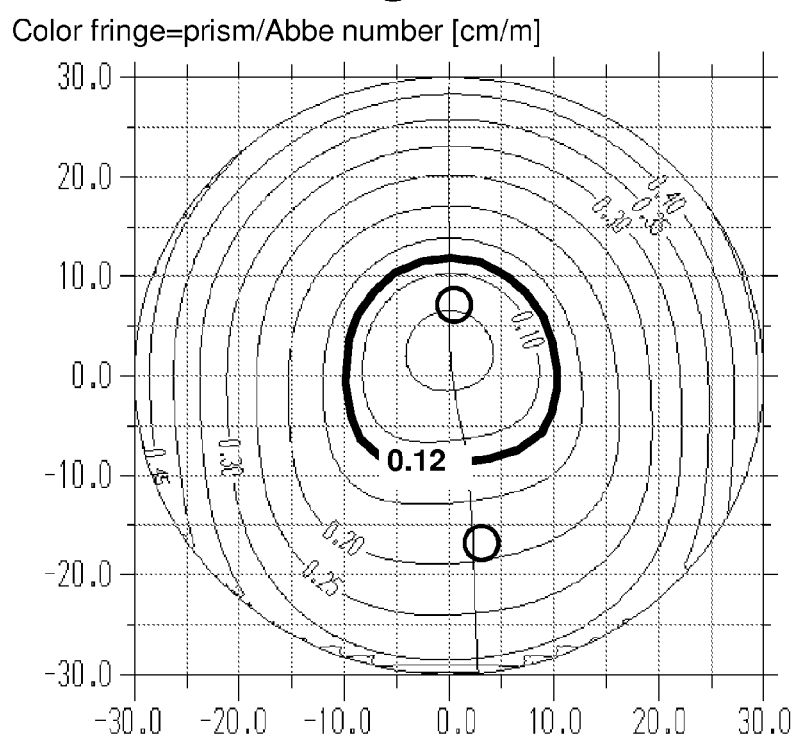
Figure 18D:
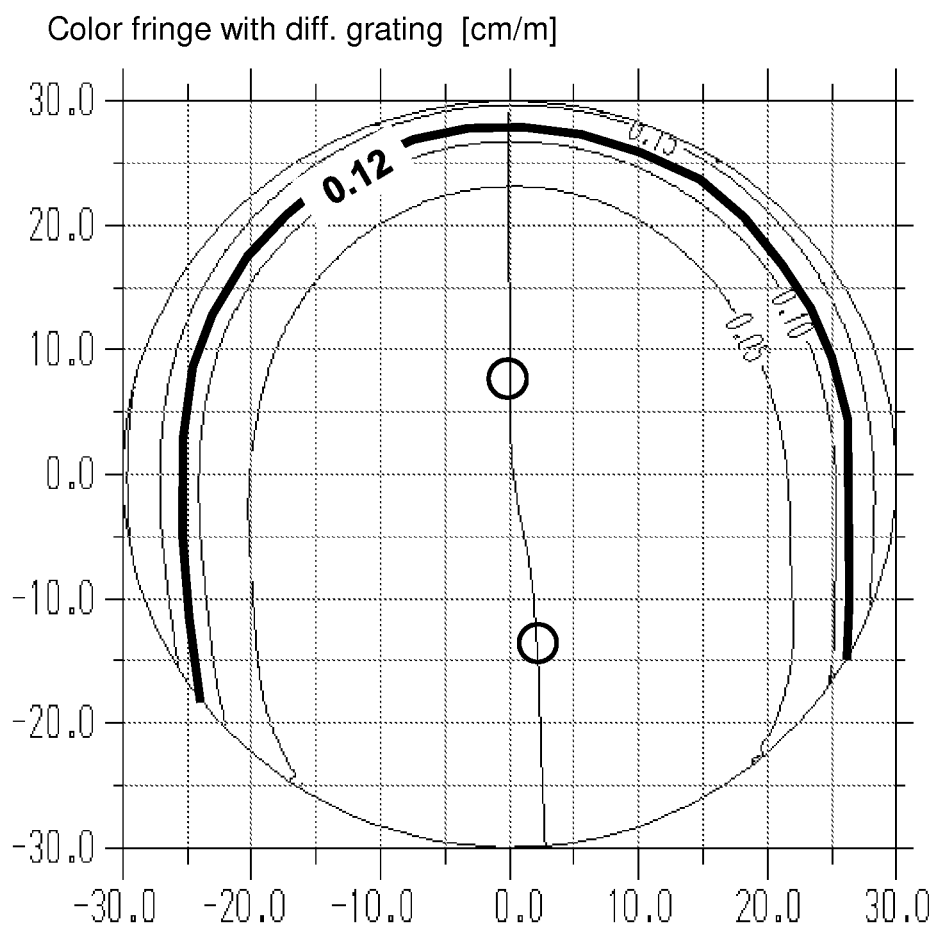

17C shows the color fringe of a color fringe-corrected single-vision lens with an effective Abbe number of approximately 130;

FIG. 18 an exemplary color fringe correction of a progressive spectacle lens, wherein FIG. 18A shows the astigmatism in the wearing position of the spectacle lens, FIG. 18B shows the diffractive phase or form of the grating lines of the diffraction grating, FIG. 18C shows the color fringe of the non-corrected spectacle lens, and FIG. 18D shows the color fringe of the corrected spectacle lens;

DETAILED DESCRIPTION

The following example relates to an optical element, wherein the phase-modifying optical element is a diffraction grating. Moreover, the optical element is a spectacle lens. However, all explanations analogously apply to arbitrary optical elements as well, which have a phase-modifying optical element instead of a diffraction grating.

Figure 1:
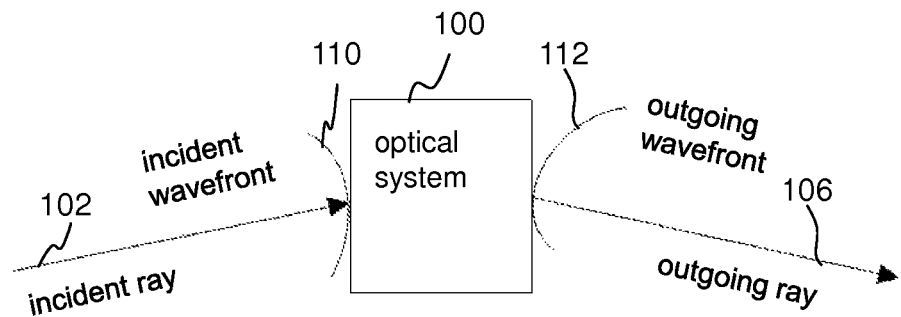

The passage of light through an arbitrary optical element, which can comprise several optical components, or through an arbitrary optical system 100 can be described on the basis of ray tracing and wavefront tracing, as is schematically shown in FIG. 1 and FIG. 12. Here, the object of ray tracing is to calculate, for a specified optical element/system 100, the outgoing ray 108 going out of the element/system at the exit surface 106 from an incident ray 102 existing up to the entrance surface 104 of the optical element/system. The object of wavefront tracing is to calculate, for a specified optical element/system 100, the outgoing wavefront 112 at the exit surface 106 of the element/system 100 from an incident wavefront 110 existing at the entrance surface 104 of the optical element/system 100. The object of local wavefront tracing is to calculate, for a specified optical element/system 100, the local properties of the outgoing wavefront 112 at the exit surface 112 of the element/system 100 from the local properties of an incident wavefront 112 existing at the entrance surface 104 of the optical element 100.

Figure 2:
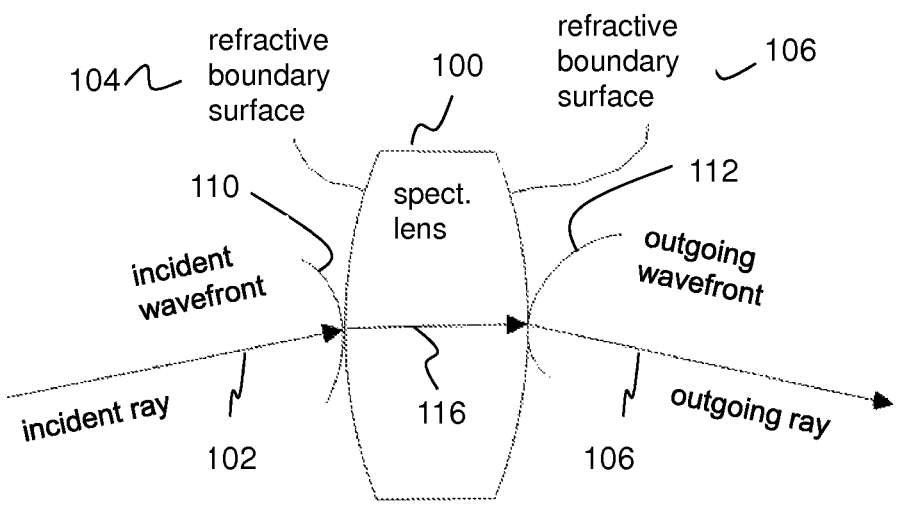

An optical element or optical system can be comprised of an arbitrary sequence of thin boundary surfaces, homogeneous materials, or inhomogeneous materials. In particular, an optical element (such as a spectacle lens, as shown in FIG. 2) can be comprised of the sequence of a curved refractive boundary surface 104 from air into a denser homogeneous material 114, the passage 116 through the material, and a second curved refractive boundary surface 106 back into air. FIG. 2 schematically shows the ray tracing and the wavefront tracing through such an optical element.

To improve optical elements or optical systems, in particular spectacle lenses, it may be advantageous to additionally introduce optical components into the ray path, which are based on other physical effects than a mere refraction at a curved boundary surface. For example, it has been suggested that diffractive optical elements be used, to which diffraction effects are of importance. In particular, such an element can be phase-delaying or phase-modulating, in fact such that by adding the element, the change of the optical path length depends on the penetration point of the ray.

However, methods allowing performing a precise tracing of the properties (in particular the image formation properties) of optical elements, which also comprise diffractive optical components, in particular taking a predetermined wearing position of the optical element into consideration, have not been known so far.

An extended wavefront tracing for the case of complex optical elements, which have at least one diffraction grating, will be described in detail in the following. The method can also be considered an extension of the wavefront tracing through purely refractive boundary surfaces, which is known from document WO 2008/089999A1, for the case of complex optical systems with at least one diffraction grating.

The most elementary description of a second-order wavefront tracing through a purely refractive boundary surface is known from the prior art (cf. e.g. the textbook "Optik und Technik der Brille" of H. Diepes and R. Blendowske, 2002 Optische Fachveröffentlichung GmbH, Heidelberg, pages 485 ff.) as the so-called BAD equation, or also vergence equation. In the case of a rotationally symmetric refractive surface and with a vertical, or perpendicular, incidence of rays, the BAD equation (vergence equation) reads as follow:

$$B=A+D. \quad (101)$$

Here, A is the vergence (i.e. a measure for the local wavefront curvature) of the incident wavefront, B is the vergence of the outgoing wavefront, and D is the surface power of the refractive surface.

If the requirements for rotational symmetry are not met, the BAD equation will be written vectorially for purely refractive surfaces according to the prior art (cf. e.g. the above-cited textbook "Optik und Technik der Brille"), i.e.

$$B=A+D \quad (102)$$

Here, A is the power vector form of the vergence matrix of the incident wavefront, B is the power vector form of the vergence matrix of the outgoing wavefront, and D is the power vector form of the surface power matrix of the refractive surface. Instead of a power vector, linear combinations of power vector components, which have been combined to form a new vector, can be used as well. In particular, the normal curvatures and the torsion, i.e. the second derivatives with respect to transverse coordinates and the mixed derivative, can be used.

Instead of the symbols A and A, B and B, as well as D and D, the following symbols are often used:

A and A→S and S

B and B→S' and S'

D and D→F and F.

Accordingly, the equations (101) and (102) then read S'=S+F and S'=S+F.

If the incidence of rays is not perpendicular, further modifications of the BAD equation can be introduced for purely refractive boundary surfaces according to the prior art, with which the wavefront passage can again be described precisely (cf. e.g. G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237). These modifications are the Coddington equation and the generalized Coddington equation for second and higher-order aberrations. In particular, the publication of G. Esser et al. describes the power vector form of the generalized Coddington equation for second and higher-order aberrations.

The equations (in power vector form) known from the prior art for second and higher-order wavefront tracings in the case of a passage through a purely refractive boundary surface are summarized in table 1:

TABLE 1

| | vertical incidence + rotational symmetry | vertical incidence without rotational symmetry | no symmetry |
|---|---|---|---|
| 2nd order | $S'^{(2)} = S^{(2)} + F^{(2)}$<br>alternative notation:<br>$S' = S + F$<br>$B = A + D$ | $S'^{(2)} = S^{(2)} + F^{(2)}$<br>alternative notation:<br>$S' = S + F$<br>$B = A + D$ | $T'_2 S'^{(2)} = T_2 S^{(2)} + vF^{(2)}$ |
| 3rd order | $S'^{(3)} = S^{(3)} + F^{(3)} + R_3(S^{(2)}, F^{(2)})$ | $S'^{(3)} = S^{(3)} + F^{(3)} + R_3(S^{(2)}, F^{(2)})$ | $T'_3 S'^{(3)} = T_3 S^{(3)} + vF^{(3)} + Q_3(S^{(2)}, F^{(2)})$ |
| 4th order | $S'^{(4)} = S^{(4)} + F^{(4)} + R_4(S^{(3)}, F^{(3)}, S^{(2)}, F^{(2)})$ | $S'^{(4)} = S^{(4)} + F^{(4)} + R_4(S^{(3)}, F^{(3)}, S^{(2)}, F^{(2)})$ | $T'_4 S'^{(4)} = T_4 S^{(4)} + vF^{(4)} + Q_4(S^{(3)}, F^{(3)}, S^{(2)}, F^{(2)})$ |
| etc. | | | |

Tables 1A to 1C include explanations on the above-listed equations for the second order (table 1A), for the third order (table 1B), and for the fourth order (table 1C).

TABLE 1A

| | |
|---|---|
| $S^{(2)} = nW_{In}^{(2)}(0)$ | vergence of the incident wavefront: refractive index on the incidence side multiplied by the second derivative of the vertex depth of the incident wavefront |
| $S'^{(2)} = n'W'_{Out}^{(2)}(0)$ | vergence of the outgoing wavefront: refractive index on the emergence side multiplied by the second derivative of the vertex depth of the outgoing wavefront |
| $F^{(2)} = (n' - n)\overline{S}^{(2)}(0)$ | surface power of the refractive surface: refractive index difference multiplied by the second derivative of the vertex depth of the refractive surface |
| S and A | vergence of the incident wavefront |
| S' and B | vergence of the outgoing wavefront |
| F and D | surface power of the refractive surface |
| $S^{(2)} = n \begin{pmatrix} W_{In}^{(2,0)}(0,0) \\ W_{In}^{(1,1)}(0,0) \\ W_{In}^{(0,2)}(0,0) \end{pmatrix}$ | refractive index on the incidence side multiplied by the power vector of the second derivative of the vertex depth of the incident wavefront |
| $S'^{(2)} = n' \begin{pmatrix} W'^{(2,0)}_{Out}(0,0) \\ W'^{(1,1)}_{Out}(0,0) \\ W'^{(0,2)}_{Out}(0,0) \end{pmatrix}$ | refractive index on the emergence side multiplied by the power vector of the second derivative of the vertex depth of the outgoing wavefront |
| $F^{(2)} = (n' - n) \begin{pmatrix} \overline{S}^{(2,0)}(0,0) \\ \overline{S}^{(1,1)}(0,0) \\ \overline{S}^{(0,2)}(0,0) \end{pmatrix}$ | refractive index difference multiplied by the power vector of the second derivative of the vertex depth of the refractive surface |
| S and A | power vector of the vergence of the incident wavefront |
| S' and B | power vector of the vergence of the outgoing wavefront |
| F and D | power vector of the surface power of the refractive surface |
| $T_2$ | incidence angle-dependent matrix for correction of oblique incidence |
| $T'_2$ | emergence angle-dependent matrix for correction of oblique incidence |
| $v = n' \cos \phi' - n \cos \phi$ | factor for correction of obliqe incidence |

TABLE 1B

| | |
|---|---|
| $S^{(3)} = nW_{In}^{(3)}(0)$ | refractive index on the incidence side multiplied by the third derivative of the vertex depth of the incident wavefront |
| $S'^{(3)} = n'W'_{Out}^{(3)}(0)$ | refractive index on the emergence side multiplied by the third derivative of the vertex depth of the outgoing wavefront |
| $F^{(3)} = (n' - n)\overline{S}^{(3)}(0)$ | refractive index difference multiplied by the third derivative of the vertex depth of the refractive surface |
| $S^{(3)} = n \begin{pmatrix} W_{In}^{(3,0)}(0,0) \\ W_{In}^{(2,1)}(0,0) \\ W_{In}^{(1,2)}(0,0) \\ W_{In}^{(0,3)}(0,0) \end{pmatrix}$ | refractive index on the incidence side multiplied by the power vector of the third derivative of the vertex depth of the incident wavefront |

TABLE 1B-continued $$S'^{(3)} = n'\begin{pmatrix} W'^{(3,0)}_{Out}(0,0) \\ W'^{(2,1)}_{Out}(0,0) \\ W'^{(1,2)}_{Out}(0,0) \\ W'^{(0,3)}_{Out}(0,0) \end{pmatrix}$$ refractive index on the emergence side multiplied by the power vector of the third derivative of the vertex depth of the outgoing wavefront $$F^{(3)} = (n'-n)\begin{pmatrix} \overline{S}^{(3,0)}(0,0) \\ \overline{S}^{(2,1)}(0,0) \\ \overline{S}^{(1,2)}(0,0) \\ \overline{S}^{(0,3)}(0,0) \end{pmatrix}$$ refractive index difference multiplied by the power vector of the third derivative of the vertex depth of the refractive surface

| | |
|---|---|
| $T_3$ | incidence angle-dependent matrix for correction of oblique incidence |
| $T'_3$ | emergence angle-dependent matrix for correction of oblique incidence |
| $v = n' \cos \phi' - n \cos \phi$ | factor for correction of oblique incidence |
| $R_3(S^{(2)}, F^{(2)})$ | additional term that only depends on the lower-order (here $2^{nd}$ order) variables |
| $\vec{R}_3(S^{(2)}, F^{(2)})$ | vectorial additional term that only depends on the lower-order (here $2^{nd}$ order) variables |
| $Q_3(S^{(2)}, F^{(2)})$ | vectorial additional term that considers the oblique incidence and only depends on the lower-order (here $2^{nd}$ order) variables |

TABLE 1C

| | |
|---|---|
| $R_4(S^{(3)}, F^{(3)}, S^{(2)}, F^{(2)})$ | additional term that only depends on the lower-order (here $2^{nd}$ and $3^{rd}$ order) variables |
| $\vec{R}_4(S^{(3)}, F^{(3)}, S^{(2)}, F^{(2)})$ | vectorial additional term that only depends on the lower-order (here $2^{nd}$ and $3^{rd}$ order) variables |
| $Q_4(S^{(3)}, F^{(3)}, S^{(2)}, F^{(2)})$ | vectorial additional term that considers the oblique incidence and only depends on the lower-order (here $2^{nd}$ and $3^{rd}$ order) variables |

The form of the additional terms $R_3(S^{(2)}, F^{(2)})$, $\vec{R}_3(S^{(2)}, F^{(2)})$, $Q_3(S^{(2)}, F^{(2)})$ is further described in the publication [G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237]. These terms disappear as soon as the lower-order terms $S^{(2)}, F^{(2)}$ and $S^{(2)}, F^{(2)}$ disappear or are equal to zero.

The further explanations on the $4^{th}$ order, etc., are analogous to the explanations on the $2^{nd}$ and $3^{rd}$ orders.

Surprisingly, it has been shown that the equations describing the second and higher-order wavefront tracing by ordinary refractive boundary surfaces can be modified in a comparatively simple way, so that also diffractive optical elements or diffraction gratings can be taken into account. Here, either the passage of light through an isolated diffraction grating or the passage through a directly consecutive combination of a diffraction grating or a refractive boundary surface can be described.

Moreover, it has turned out that a generally vectorial variable $PK^{(k)}$, $k=2, 3, 4, \ldots$, hereinafter referred to as a phase curvature (for $k=2$) or as phase derivatives (for $k>2$), can be assigned to any arbitrary, non-rotationally symmetric diffraction grating even under arbitrary, oblique-angled ray incidence conditions, so that the corresponding BAD equation and the higher-order equations for refractive surfaces substantially only have to extended additively by the additional term $PK^{(k)}$, $k=2, 3, 4, \ldots$ in order to correctly describe the vergences for the wavefront passage in the presence of a non-rotationally symmetric diffraction grating.

In other words, however asymmetric a situation may be for which the wavefront tracing could be described precisely for purely refractive surfaces, it is sufficient to extend the corresponding equation substantially only by an additive additional term PK in order to also describe the diffraction grating correctly.

Further, it has been found that the vergence of the outgoing wavefront is independent of the order in which the refractive surface and the diffraction grating succeed one another.

In the case of a second-order wavefront tracing (i.e. for $k=2$) for a rotationally symmetric diffraction grating and with a vertical, or perpendicular, incidence of rays, equation (101) is extended additively by the additional term $PK^{(2)}$ in order to correctly describe the vergences for the wavefront passage also in the presence of a diffraction grating:

$$B = A + D + PK^{(2)}. \tag{103}$$

However, equation (101) is only valid exactly for the case that the ray impinges vertically, or perpendicularly, on the refractive surface and that the incident wavefront and the refractive surface are rotationally symmetric. But equation (101) is still a good approximation also for deviations from these prerequisites. Analogously, equation (103) is a good approximation in the presence of a diffraction grating.

In the case of a second-order wavefront tracing (i.e. for $k=2$) for a non-rotationally symmetric diffraction grating and with a vertical, or perpendicular, incidence of rays, the diffraction grating can be assigned a vectorial variable $PK^{(2)}$, so that the corresponding vectorial BAD equation only has to be extended additively by the vectorial additional term $PK^{(2)}$ in order to correctly describe the vergences for the wavefront passage in the presence of a non-rotationally symmetric diffraction grating. In this case, it holds that $$B = A + D + PK^{(2)}. \tag{104}$$

As will be explained in detail in the following, a generally vectorial variable $PK^{(k)}$ can be assigned to any arbitrary, non-rotationally symmetric diffraction grating even under arbitrary, oblique-angled ray incidence conditions, so that the corresponding general BAD equation and the higher-order equations for the wavefront tracing through refractive surfaces substantially only have to be extended additively by the additional term $PK^{(k)}$ ($PK^{(2)}$, $PK^{(3)}$ $PK^{(4)}$, . . . ) in order to correctly describe the vergences for the wavefront passage in the presence of a non-rotationally symmetric diffraction grating.

Moreover, is has been shown that the components of the additive additional term $PK^{(k)}$ can be described by the vector of the second or higher-order derivatives of a phase function $\Psi(\bar{x},\bar{y})$ with respect to the coordinates $\bar{x},\bar{y}$ tangentially to the refractive surface (base surface). It holds for the additive second-order additional term that:

$$PK^{(2)} = -\begin{pmatrix} \Psi^{(2,0)}(0,0) \\ \Psi^{(1,1)}(0,0) \\ \Psi^{(0,2)}(0,0) \end{pmatrix} = -\begin{pmatrix} \partial^2 \Psi(\bar{x},\bar{y})/\partial \bar{x}^2 \\ \partial^2 \Psi(\bar{x},\bar{y})/\partial \bar{x}\partial \bar{y} \\ \partial^2 \Psi(\bar{x},\bar{y})/\partial \bar{y}^2 \end{pmatrix}\Bigg|_{(\bar{x},\bar{y})=(0,0)} \quad (105)$$

For this reason, the additive second-order additional term $PK^{(2)}$ is also referred to as a "phase curvature".

The phase function $\Psi(\bar{x},\bar{y})$ represents the optical path length difference (optical path difference or OPD), which is introduced by the diffraction grating, as a function of the coordinates $\bar{x},\bar{y}$ tangentially to the refractive surface. The description of a diffraction grating by the phase function $\Psi(\bar{x},\bar{y})$ allows determining the additive additional term $PK^{(k)}$ ($PK^{(2)}$, $PK^{(3)}$, $PK^{(4)}$, . . . ) constructively. Put differently, it is suggested that a phase function $\Psi(\bar{x},\bar{y})$ be used to describe an arbitrary diffraction grating, the additive additional term $PK^{(k)}$ ($PK^{(2)}$, $PK^{(3)}$, $PK^{(4)}$, . . . ) being determined by the vector of the second and higher-order derivatives of the phase function with respect to the coordinates $\bar{x},\bar{y}$ tangentially to the refractive surface (cf. equation (105) for k=2).

Table 2 summarizes the equations and wavefront equations (in power vector form) for the wavefront tracing in the case of a passage through a refractive boundary surface (base surface), to which a phase-modifying optical element is applied in addition. Tables 2A and 2B include explanations on the $2^{nd}$ order (table 2A) and $3^{rd}$ order (table 2B) equations listed in table 1.

TABLE 2

| | vertical incidence + rotational symmetry | vertical incidence without rotational symmetry | no symmetry |
|---|---|---|---|
| 2nd order | $S'^{(2)} = S^{(2)} + F^{(2)} - \Psi^{(2)}$ alternative notation: $S' = S + F + PK^{(2)}$ $B = A + D + PK^{(2)}$ | $S'^{(2)} = S^{(2)} + F^{(2)} - \Psi^{(2)}$ alternative notation: $S' = S + F + PK^{(2)}$ $B = A + D + PK^{(2)}$ | $T'_2 S'^{(2)} = T_2 S^{(2)} + vF^{(2)} - \Psi^{(2)}$ alternative notation: $T'_2 S'^{(2)} = T_2 S^{(2)} + vF^{(2)} + PK^{(2)}$ |
| 3rd order | $S'^{(3)} = S^{(3)} + F^{(3)} - \Psi^{(3)} + R_3(S^{(2)}, F^{(2)})$ alternative notation: $PK^{(3)} = -\Psi^{(3)}$ | $S'^{(3)} = S^{(3)} + F^{(3)} - \Psi^{(3)} + R_3(S^{(2)}, F^{(2)})$ alternative notation: $PK^{(3)} = -\Psi^{(3)}$ | $T'_3 S'^{(3)} = T_3 S^{(3)} + vF^{(3)} - \Psi^{(3)} + Q_3(S^{(2)}, F^{(2)})$ alternative notation: $PK^{(3)} = -\Psi^{(3)}$ |
| 4th order | $S'^{(4)} = S^{(4)} + F^{(4)} - \Psi^{(4)} + R_4(S^{(3)}, F^{(3)}, S^{(2)}, F^{(2)})$ alternative notation: $PK^{(4)} = -\Psi^{(4)}$ | $S'^{(4)} = S^{(4)} + F^{(4)} - \Psi^{(4)} + R_4(S^{(3)}, F^{(3)}, S^{(2)}, F^{(2)})$ alternative notation: $PK^{(4)} = -\Psi^{(4)}$ | $T'_4 S'^{(4)} = T_4 S^{(4)} + vF^{(4)} - \Psi^{(4)} + Q_4(S^{(3)}, F^{(3)}, S^{(2)}, F^{(2)})$ alternative notation $PK^{(4)} = -\Psi^{(4)}$ |
| etc. | | | |

TABLE 2A

| | |
|---|---|
| $\Psi^{(2)} = \Psi^{(2)}(0)$ | second derivative of the phase function |
| $PK^{(2)} = -\Psi^{(2)}(0)$ | phase curvature, i.e. negative second derivative of the phase function |

TABLE 2A-continued

| | |
|---|---|
| $\Psi^{(2)} = \begin{pmatrix} \Psi^{(2,0)}(0,0) \\ \Psi^{(1,1)}(0,0) \\ \Psi^{(0,2)}(0,0) \end{pmatrix}$ | power vector of the second derivatives of the phase function |
| $PK^{(2)} = -\Psi^{(2)}(0,0)$ | power vector of the phase curvature, i.e. the negative second derivatives of the phase function |

TABLE 2B

| | |
|---|---|
| $\Psi^{(3)} = \Psi^{(3)}(0)$ $PK^{(3)} = -\Psi^{(3)}(0)$ | third derivative of the phase function additional term according to the invention, determined by negative third derivative of the phase function |
| $\Psi^{(3)} = \begin{pmatrix} \Psi^{(3,0)}(0,0) \\ \Psi^{(2,1)}(0,0) \\ \Psi^{(1,2)}(0,0) \\ \Psi^{(0,3)}(0,0) \end{pmatrix}$ | power vector of the third derivatives of the phase function |
| $PK^{(3)} = -\Psi^{(3)}(0,0)$ | vectorial additional term according to the invention, determined by the power vector of the negative third derivatives of the phase function |

The equations for the 4th order and all higher orders are made up analogously.

The coordinate system $\bar{x},\bar{y},\bar{z}$ is a local coordinate system, which serves to describe the passage of a ray through a boundary surface, wherein it holds at the penetration point of the main ray with the boundary surface that $(\bar{x},\bar{y},\bar{z})=(0,0,0)$, and wherein the $\bar{z}$ axis is perpendicular to the base surface. A special possible choice of such a local system is to require that the incident ray be e.g. in the $\bar{x}$-$\bar{z}$ plane or in the $\bar{y}$-$\bar{z}$ plane. In general, however, this condition does not necessarily have to be satisfied. The use of local coordinate systems is known from WO 2008/089999 A1, for example, and is used in second-order wavefront tracing through surfaces without diffraction gratings. Typically, use is made of as many local systems as main rays are to be calculated. Further, a global coordinate system can be used.

Moreover, it has been found that a connection can be established between the grating lines of the diffractive optical element or the diffraction grating and the phase function $\Psi(\bar{x},\bar{y})$, which is based on the fact that the grating lines lie on curves with $\Psi(\bar{x},\bar{y})$=const. The determination of the phase function $\Psi(\bar{x},\bar{y})$ on the basis of parameters of the diffraction grating will be described in detail in the following.

Moreover, it has been found that different from a refraction at a purely refractive boundary surface (such as described in WO 2008 089999 A1), the incident main ray, the outgoing main ray, and the normal vector of the refractive surface generally will not have to be in one and the same plane any more if a diffraction grating is present.

In the simplest case of a refractive, homogeneous boundary surface between two media with the refractive indices n and n' without diffractive optical elements or diffraction gratings, the ray deviation is described by the law of refraction n' sin $\phi'$−n sin $\phi$=0, where $\phi$ is the angle of incidence and $\phi'$ is the angle of emergence.

Figure 3A:
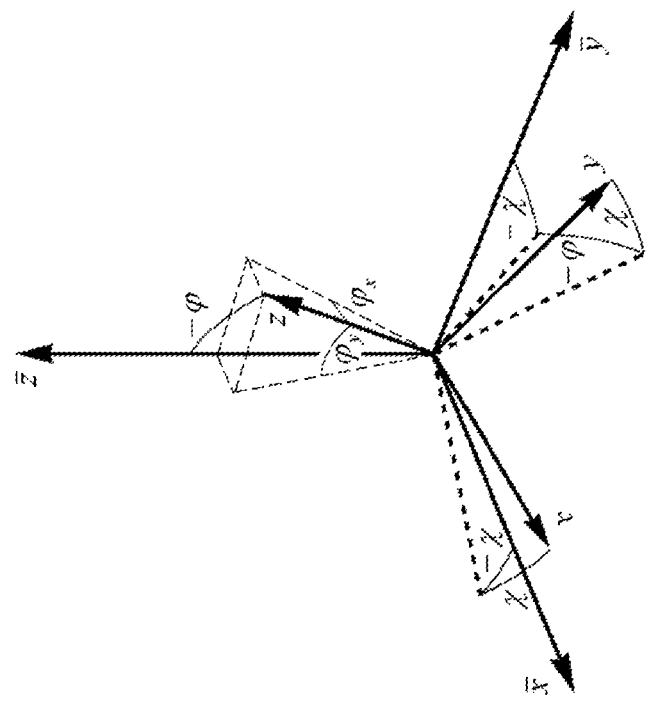
Figure 3:
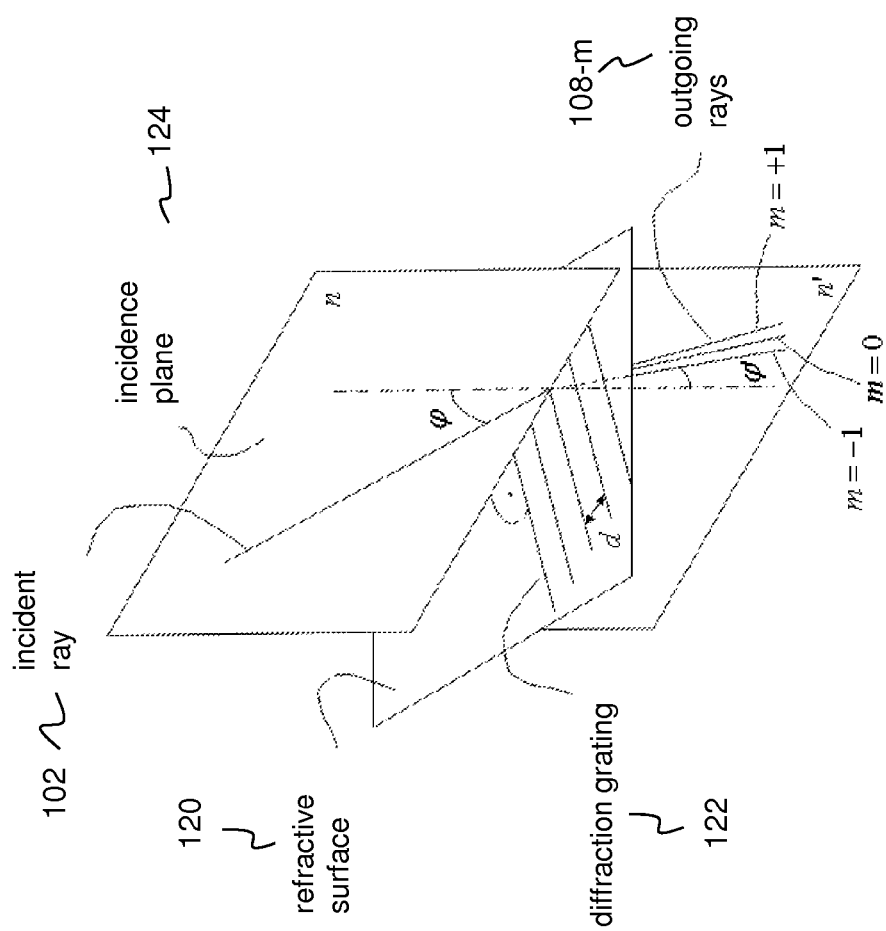

FIG. 3 schematically illustrates the ray path upon diffraction on a boundary surface 120 with a diffraction grating 122 in a special simple case in which it is possible to describe the ray deviation by a closed law. This law can be understood to be a modification of this law of refraction. This case is characterized in that the refractive surface 120 is a plane and that the diffraction grating 122 is an irregularity of this surface 120, which is translation-invariant perpendicular to the plane of incidence 124 and equidistant with period d in the direction of the plane of refraction (the plane of the refractive surface 120) (cf. FIG. 3). The irregularity can be a blazed grating, a rectangular grating, an alternation of translucent and opaque zones, or any other deviation from the homogeneous, plane, translucent, refractive surface. In this simple case, an incident monochromatic ray 102, which belongs to light with the wavelength $\lambda$, is split into many individual rays 108-$m$, which belong to the different diffraction order m, m= . . . , −2, −1, 0, 1, 2, . . . , by diffraction. The diffraction order m can be selected arbitrarily, but fixedly, and the situation for the ray pertaining to the diffraction order m can be described in an isolated manner, i.e. irrespective of the possible other diffraction orders, in the following. For a ray pertaining to the diffraction order m, the modified law of refraction applies n' sin $\phi'$−n sin $\phi$=m$\lambda$/d, where n and n' designate the refractive index of the material in front of and behind the boundary surface 120, $\phi$ is the angle of incidence, and $\phi'$ is the angle of emergence.

For every more general case, e.g. for rays being incident obliquely to the grating lines, for a non-equidistant grating and/or for a grating with curved grating lines and/or for a curved surface, no comprehensive laws on ray deviation and wavefront calculation have been known so far. In order to be able to calculate or optimize an optical element with arbitrary, in particular aspherical surfaces and at least one diffraction grating in the wearing position taking the second-order aberrations (e.g. refractive power and astigmatism) and optionally higher-order aberrations (e.g. coma or spherical aberration) into consideration, it is advantageous to also be able to perform exact wavefront tracing also for the general case.

In the following, the principles of ray and wavefront tracing in the general case of an optical element or an optical system (e.g. a spectacle lens) with a diffraction grating will be described in more detail.

Coordinate Systems

First of all, variables capable of describing a boundary surface including at least one diffraction grating as generally as possible will be introduced. To this end, by analogy with the case of purely refractive surfaces, two types of coordinates or coordinate systems are used in principle.

One type is global coordinates $\bar{x}^0, \bar{y}^0, \bar{z}^0$, which serve to describe the base surface (i.e. the purely refractive surface without the diffraction grating by its vertex depth $\bar{z}^0(\bar{x}^0, \bar{y}^0)$. Here, the possibly existing vertex depth of the diffraction grating is not added to the vertex depth of the base surface. Instead, the diffraction grating itself is described by a separate property $h(\bar{x}^0, \bar{y}^0)$. Here, $h(\bar{x}^0, \bar{y}^0)$ can play the role of an additional vertex depth, so that the real (microscopic) physical vertex depth of the base surface is determined by $\bar{z}_m^0(\bar{x}^0, \bar{y}^0) = \bar{z}^0(\bar{x}^0, \bar{y}^0) + h(\bar{x}^0, \bar{y}^0)$. However, it is possible for $h(\bar{x}^0, \bar{y}^0)$ to play the role of a transmission property or another property of the POE.

The other type of coordinates is—as described above—local coordinates $\bar{x}, \bar{y}, \bar{z}$, which serve to describe the passage of a ray through the boundary surface such that $(\bar{x}, \bar{y}, \bar{z}) = (0,0,0)$ applies at the penetration point and that the z axis is perpendicular to the base surface there. A special possible choice of such a local system is to require that the incident ray be e.g. in the $\bar{x}$-$\bar{z}$ plane or in the $\bar{y}$-$\bar{z}$ plane, for example. In general, however, this condition does not necessarily have to be satisfied. The use of local systems is known from WO 2008/089999 A1, for example, and is used in second-order wavefront tracing through surfaces without a diffraction grating. Typically, use is made of only a global coordinate system, but of as many local systems as main rays are to be calculated.

FIG. 3A illustrates the position of the coordinate system x,y,z of the incident wavefront with respect to the coordinate system $\bar{x}, \bar{y}, \bar{z}$ of the refractive surface (base surface), expressed by the angles $\phi_x$, $\phi_y$, $\phi$, and $\chi$.

For the sake of simplicity, FIG. 3A only shows the coordinate system of the incident wavefront and the coordinate system of the refractive surface. The coordinate system x',y',z' of the outgoing wavefront can be specified by analogy with the coordinate system of the incident wavefront. Moreover, reference is made to FIG. 1 of the publication [G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237], which shows a two-dimensional representation of the corresponding mutual position for all three coordinate systems.

Description of a Diffraction Grating by the Phase Function $\Psi(\bar{x},\bar{y})$ The phase function $\Psi(\bar{x},\bar{y})$ represents the optical path length difference (optical path difference or OPD), which is introduced by the diffraction grating, as a function of the coordinates $\bar{x}, \bar{y}$ tangentially to the refractive surface (base surface). The phase function $\Psi(\bar{x},\bar{y})$ can be determined by means of the grating lines. Conversely, with a predetermined phase function, it is possible to determine the grating lines of the corresponding diffraction grating.

In the simplest case of a constant, equidistant diffraction grating 122 on a plane surface 120 (cf. e.g. FIG. 3 and FIG. 4), which is described in global coordinates by $\bar{z}^0(\bar{x}^0, \bar{y}^0) = a_x \bar{x}^0 + a_y \bar{y}^0 + t$, it is possible to differentiate between a single-periodic and a double-periodic grating.

In a single-periodic grating, a period vector $d_1$ exists, so that $$h(\bar{r}^0 + d_1) = h(\bar{r}^0) \quad (106a)$$

holds for all points $\bar{r}^0 = (\bar{x}^0, \bar{y}^0)$. Moreover, there exists a direction with translation invariance, i.e. a vector v with $$h(\bar{r}^0 + \alpha v) = h(\bar{r}^0) \quad (106b)$$

for all $\alpha$.

In such a case, the grating lines 112a face toward v, whereas $d_1$ does not necessarily have to describe the distance between the grating lines 122a, since $d_1$ does not necessarily have to be perpendicular to v. In such a case, the vector $d_1$ can be replaced by the vector with the components $$d = \begin{pmatrix} d_x \\ d_y \end{pmatrix},$$

which is defined by $$d = d_1 - (d_1 \cdot v)v \tag{107}$$

This vector d is perpendicular to v and it further holds that $$\begin{aligned} h(\bar{r}^0 + d) &= h(\bar{r}^0 + d_1 - (d_1 \cdot v)v) \\ &= h(\bar{r}^0 + d_1 - \alpha v) \\ &= h(\bar{r}^0 + d_1) \\ &= h(\bar{r}^0) \end{aligned} \tag{108}$$

so that the vector d is also a period vector. However, in contrast to $d_1$, the vector d also indicates the distance between two grating lines (cf. FIG. 4). The grating period is determined by the amount d=|d|.

Figure 4:
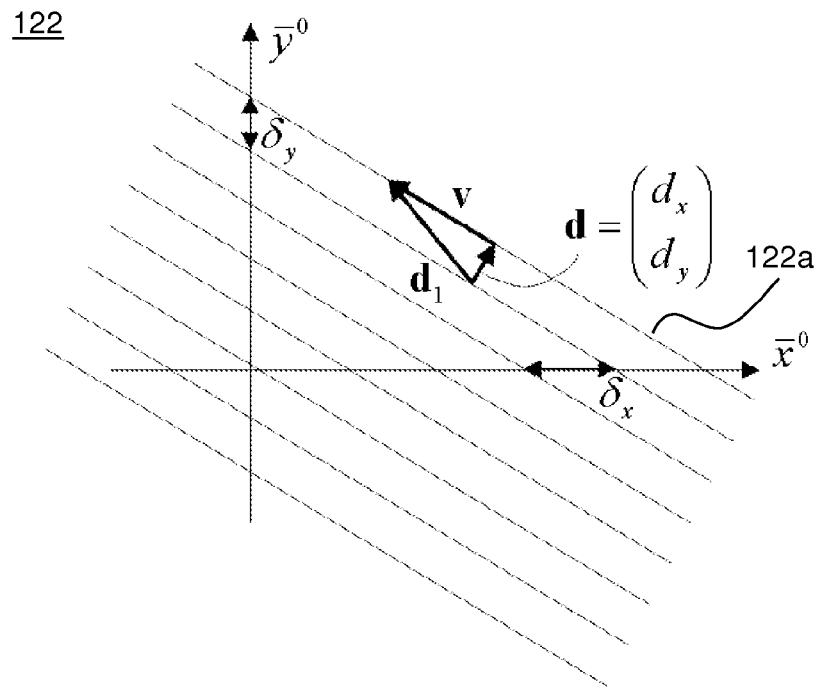

In a single-periodic grating 122, as shown in FIG. 4, for example, two further period vectors of practical importance exist in addition. They depend on the coordinate system and are determined by the vectors $$\delta_x = \begin{pmatrix} \delta_x \\ 0 \end{pmatrix}, \delta_y = \begin{pmatrix} 0 \\ \delta_y \end{pmatrix}, \tag{109}$$

which face toward the coordinate axes (cf. FIG. 4). The connection between d and the vectors $\delta_x, \delta_y$ is determined by:

$$\delta_x = \frac{|d|^2}{d_x}, \delta_y = \frac{|d|^2}{d_y}, \tag{110a}$$

and $$d_x = \frac{\delta_x \delta_y^2}{\delta_x^2 + \delta_y^2}, d_y = \frac{\delta_y \delta_x^2}{\delta_x^2 + \delta_y^2} \tag{110b}$$

In a double-periodic grating 122, two period vectors $d_1, d_2$ with $$h(\bar{r}^0 + d_1) = h(\bar{r}_S)$$

$$h(\bar{r}^0 + d_2) = h(\bar{r}_S). \tag{111}$$

exist. Double-periodic within this scope means that there is no translation invariance in any direction, i.e. there is no vector v with $h(\bar{r}^0 + \alpha v) = h(\bar{r}_S)$ for all $\alpha$.

From an inspection of the wave optics, one can say that a plane monochromatic wave of the wavelength $\lambda$, which is incident on a single- or double-periodic grating in an oblique manner, leads to a direction-dependent intensity distribution on the side of emergence due to interference. This distribution can be represented as a product of two direction-dependent factors, wherein said one factor (the form factor) is only determined by the form of the diffraction grating within the grating period, and the second factor (the grating or diffraction factor) is determined only by the grating periodicity. The second factor takes on a maximum in each of such directions in which the path difference between two points of the wave field on the boundary surface, which are displaced by one grating period, is an integer multiple of the wavelength of the light on the side of emergence.

If, in the image of the geometric ray optics, the incident wave field is assigned the directional vector $$N = \begin{pmatrix} \sin\varphi_x \\ \sin\varphi_y \\ \sqrt{1 - \sin^2\varphi_x - \sin^2\varphi_y} \end{pmatrix} \tag{112a}$$

and, on the side of emergence of each direction in which a maximum of the grating factor exists, a directional vector of the form $$N' = \begin{pmatrix} \sin\varphi'_x \\ \sin\varphi'_y \\ \sqrt{1 - \sin^2\varphi'_x - \sin^2\varphi'_y} \end{pmatrix} \tag{112b}$$

then the rays will be described by the laws $$n'\sin\varphi'_x - n\sin\varphi_x = \frac{m_x \lambda}{\delta_x} \tag{113}$$

$$n'\sin\varphi'_y - n\sin\varphi_y = \frac{m_y \lambda}{\delta_y}$$

where $m_x = \ldots, -3, -2, -1, 0, 1, 2, 3, \ldots$ and $m_y = \ldots, -3, -2, -1, 0, 1, 2, 3, \ldots$ are integers. The laws (113) can be considered to be the extended laws of refraction in the presence of a diffraction grating. In particular, the case $m_x = 0$, $m_y = 0$, i.e. the zeroth diffraction order, describes the situation without diffraction elements.

In a double-periodic diffraction element, all integers $m_x, m_y$ can be found independent of each other. In a single-periodic grating, only diffraction orders $m_x = \sigma \cdot m_y$ of the same amount can be found, where $\sigma = +1$ applies to the case that the grating lines decrease for increasing values of $\bar{x}^0$ (such as in FIG. 4, $\partial \bar{y}^0 / \partial \bar{x}^0 < 0$) and $\sigma = -1$ applies in the case of increasing grating lines ($\partial \bar{y}^0 / \partial \bar{x}^0 > 0$).

In the following, single-periodic diffraction gratings ($m := m_x = \sigma \cdot m_y$) will be discussed. However, all calculations can be modified accordingly for the case of double-periodic diffraction gratings.

The equation (113) with $m := m_x = \sigma \cdot m_y$ on the right side can be interpreted such that two rays, which are refracted at two neighboring grating lines, have a non-vanishing path difference, i.e. a phase difference proportional to m and proportional to $\lambda$. Thus, there is the possibility of characterizing the course of the grating lines, namely on the one hand by grating properties that can be measured (e.g. with a microscope) and are based on the vector d, and on the other hand by the abstract property of introducing an additional location-dependent path difference into the ray path. In the second case, the course of the grating lines is determined by the difference between the values of a phase function $\Psi^0(\bar{x}^0, \bar{y}^0; \lambda, m)$, which in addition to the coordinates $\bar{x}^0, \bar{y}^0$ also depends on the wavelength $\lambda$ and on the diffraction order m.

Since this phase function is in any case proportional to λ and m these factors can be split off. Instead of the phase function $\Psi^0(\bar{x}^0,\bar{y}^0;\lambda,m)$, the phase function $\psi^0(\bar{x}^0,\bar{y}^0)$ can be used, where $$\Psi^0(\bar{x}^0,\bar{y}^0;\lambda,m) = m\lambda \cdot \psi^0(\bar{x}^0,\bar{y}^0). \quad (114)$$

Figure 5:
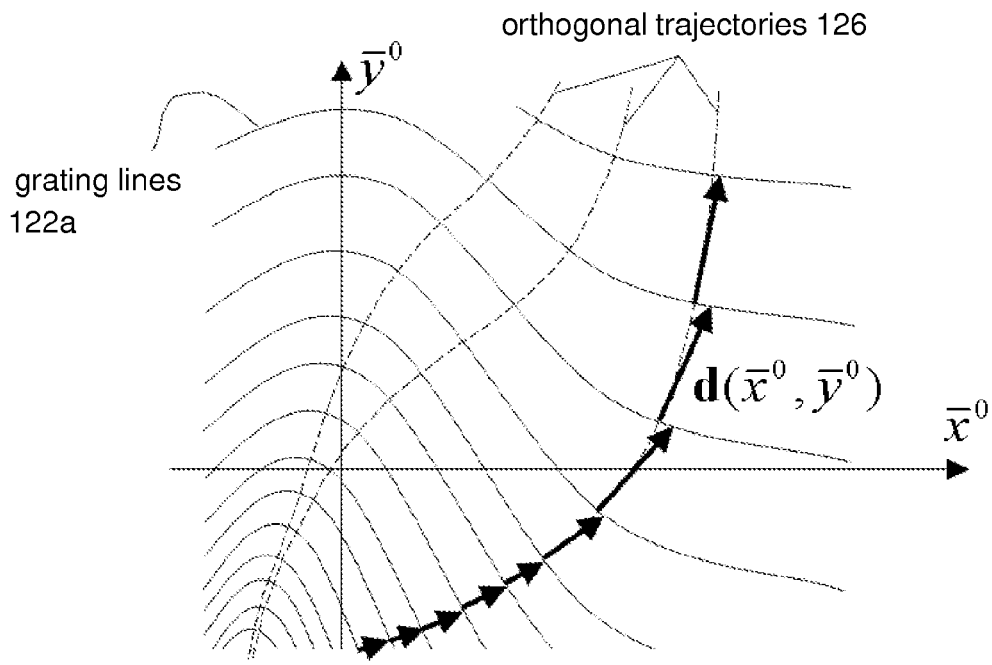
Figure 6:
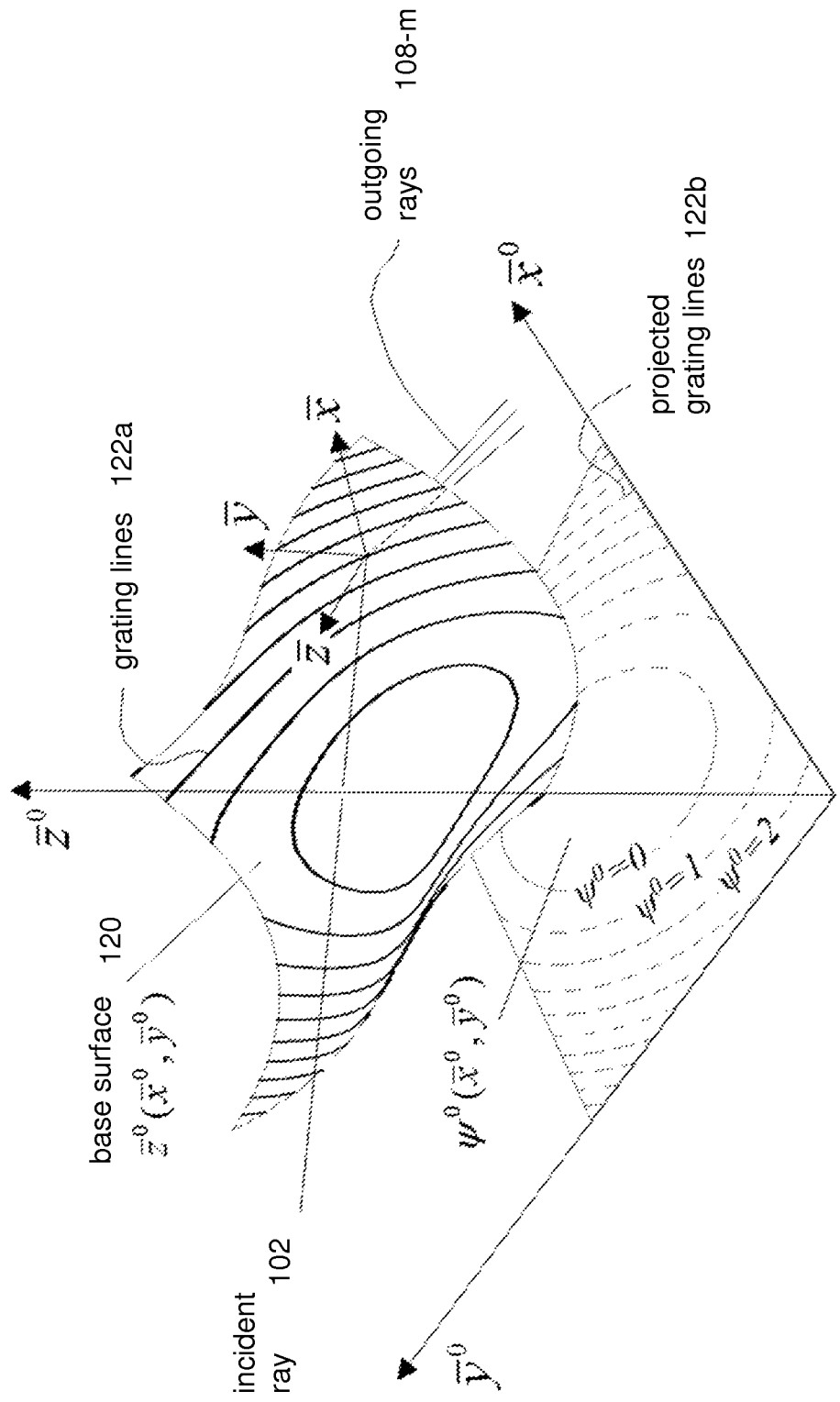

FIG. 5 shows grating lines of a diffraction grating 122 on a plane boundary surface 120, and FIG. 6 shows grating lines of a diffraction grating 122 on a curved boundary surface 122.

Except for the simplest case of a constant, equidistant grating on a plane surface, the grating lines extend in a different direction at each point of an optical element in the general case, as is shown in FIG. 5 and FIG. 6, for example. Moreover, their distance is generally different at each point (cf. e.g. FIG. 5). Strict periodicity is not present any more in principle. Consequently, the period vector d cannot be defined any more. Therefore, it is suggested replacing the period vector d by a coordinate-dependent function $d(\bar{x}^0,\bar{y}^0)$ or, put differently, by a vector field) $d(\bar{x}^0,\bar{y}^0)$ defined as the tangential vector field with respect to the trajectories 126, which are orthogonal to the grating lines 122a.

In addition, in the general case of a curved base surface 120, as shown in FIG. 6, it has be to taken into account that the grating 122 is specified in global coordinates $\bar{x}^0$, $\bar{y}^0$ on the one hand, but local properties are relevant for an effect on the ray passage on the other hand, such as the local grating distance the grating 122 has along the tilted axes of a local coordinate system $\bar{x},\bar{y}$.

Instead of $d(\bar{x}^0,\bar{y}^0)$, the effect of the grating 122 can be described by the phase function $\psi(\bar{x}^0,\bar{y}^0)$ in this general case as well.

Figure 7:
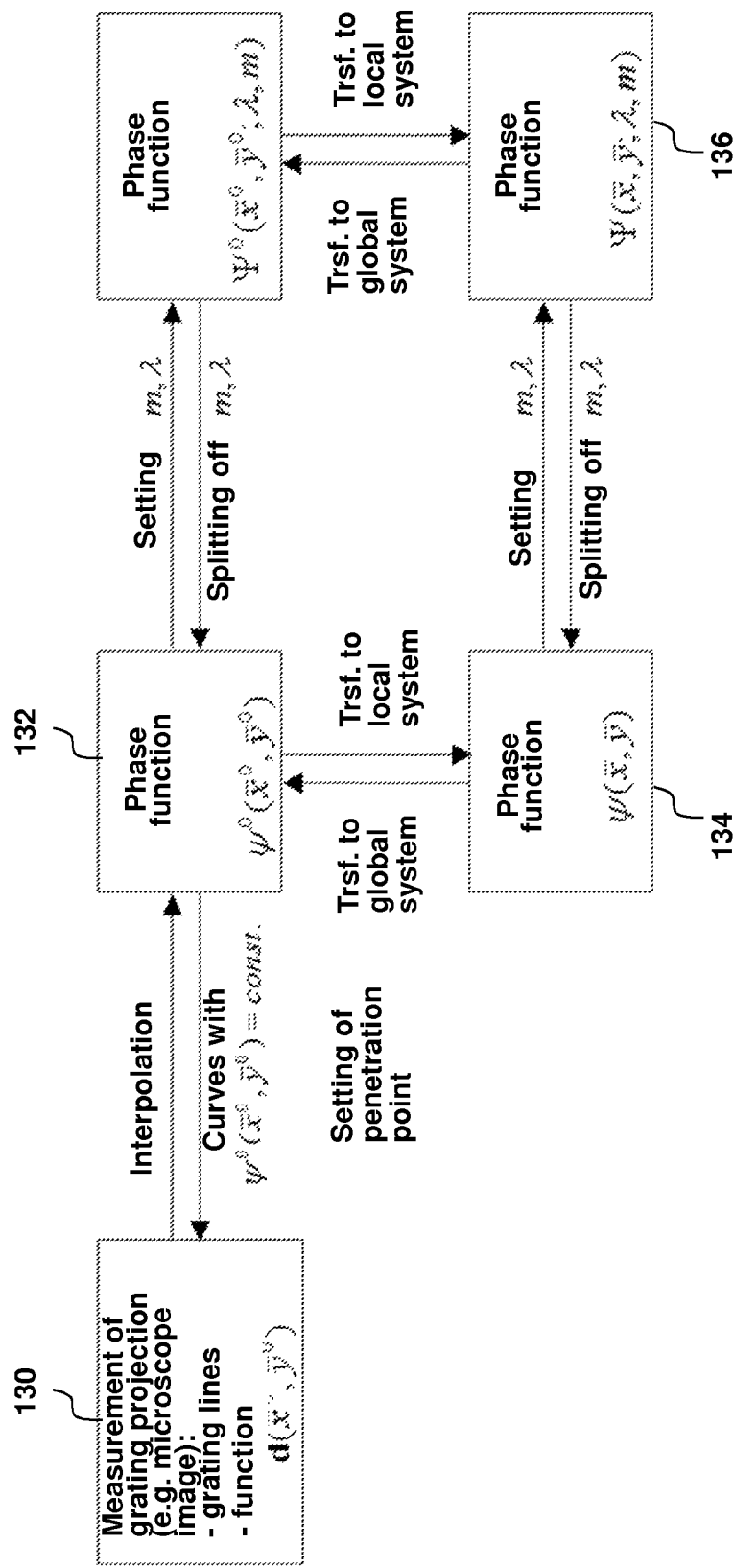

The phase function of a diffraction grating $\psi^0(\bar{x}^0,\bar{y}^0)$ is more suitable for wavefront tracing than the vector field $d(\bar{x}^0,\bar{y}^0)$, but it cannot be measured directly. In order to perform a wavefront tracing based on the phase function) $\psi^0(\bar{x}^0,\bar{y}^0)$, a method for determining the transition between the functions $d(\bar{x}^0,\bar{y}^0)$ and $\psi^0(\bar{x}^0,\bar{y}^0)$ in both directions (i.e. $d(\bar{x}^0,\bar{y}^0) \leftrightarrow \psi^0(\bar{x}^0,\bar{y}^0)$) is proposed. The flow diagram shown in FIG. 7 illustrates the transition between the vector field $d(\bar{x}^0,\bar{y}^0)$ and the phase function $\psi^0(\bar{x}^0,\bar{y}^0)$.

In particular, in a predetermined grating, which can be known e.g. by measuring (cf. block 130 in FIG. 7) the microscope image of a grating projection or by a projection of another measurable property of the grating (e.g. a transmission property), the phase function $\psi^0(\bar{x}^0,\bar{y}^0)$ can be obtained in the global coordinate system (cf. block 132 in FIG. 7) by counting the grating lines and interpreting them as curves $\psi^0(\bar{x}^0,\bar{y}^0)=$const. For the curves, the values $\psi^0(\bar{x}^0,\bar{y}^0)=0$, $\psi^0(\bar{x}^0,\bar{y}^0)=1$, $\psi^0(\bar{x}^0,\bar{y}^0)=2$, etc., are assumed successively (cf. FIG. 7). For all points $(\bar{x}^0,\bar{y}^0)$ not on but between the grating lines, the values of the phase function can be determined by suitable interpolation. Conversely, if the phase function $\psi^0(\bar{x}^0,\bar{y}^0)$ is known, the grating lines can be determined by calculating the curves $\psi^0(\bar{x}^0,\bar{y}^0)=$const. with $\psi^0(\bar{x}^0,\bar{y}^0)=0$, $\psi^0(\bar{x}^0,\bar{y}^0)=1$, $\psi^0(\bar{x}^0,\bar{y}^0)=2$, etc.

After a local coordinate system $(\bar{x},\bar{y},\bar{z})$ has been set, the phase function relevant for local ray tracing is the function $$\psi(\bar{x},\bar{y}) = \psi^0(\bar{x}^0(\bar{x},\bar{y}),\bar{y}^0(\bar{x},\bar{y})), \quad (115)$$

(cf. block 134 in FIG. 7), where the connections $\bar{x}^0(\bar{x},\bar{y})$, $\bar{y}^0(\bar{x},\bar{y})$ result from the transformation from the global coordinate system to the local coordinate system (for the respective penetration point). By setting (cf. block 136 in FIG. 7)

$$\Psi(\bar{x},\bar{y};\lambda,m) = m\lambda \cdot \psi(\bar{x},\bar{y}) \quad (116)$$

analogously to equation (114), the local phase function can be obtained taking the diffraction order and the wavelength into account.

Wavefront Tracing in the Case of an Optical Element/System Comprising at Least One Diffraction Grating
First-Order Properties (Ray Deviation)

For the tracing of rays described by the vectors N,N' in the local system (cf. equations (112a) and (112b)), the wavefront tracing yields the laws for the ray deviation $$n' \sin\varphi'_x - n\sin\varphi_x = \frac{\partial}{\partial \bar{x}} \Psi(\bar{x},\bar{y};\lambda,m) \quad (117)$$

$$n' \sin\varphi'_y - n\sin\varphi_y = \frac{\partial}{\partial \bar{y}} \Psi(\bar{x},\bar{y};\lambda,m).$$

Example 1

In the simplest case of a constant equidistant grating on a plane surface, which corresponds e.g. to FIG. 4, the phase function in the global system is determined by $$\psi^0(\bar{x}^0,\bar{y}^0) = \frac{\bar{x}^0}{\delta_x} + \frac{\bar{y}^0}{\delta_y} + \psi_0 \quad (118)$$

where $\psi_0$ is a constant. Since the base surface is plane, the local system can be selected identically with the global system, so that $\psi(\bar{x},\bar{y})=\psi^0(\bar{x},\bar{y})$. Since in this case it holds that $$\frac{\partial}{\partial \bar{x}} \Psi(\bar{x},\bar{y};\lambda,m) = \frac{m\lambda}{\delta_x} \quad (119)$$

$$\frac{\partial}{\partial \bar{y}} \Psi(\bar{x},\bar{y};\lambda,m) = \frac{m\lambda}{\delta_y}$$

equation (117) leads exactly to the special case of equation (113).

Example 2

If, for an arbitrary grating, the local system $\bar{x},\bar{y},\bar{z}$ is selected at the penetration point such that the incident ray is in the $\bar{y}$-$\bar{z}$ plane, then $\phi_x=0$. If the phase function in this local system is determined by $\Psi(\bar{x},\bar{y};\lambda,m)$, then the laws for ray deviation according to equation (117) will read $$n' \sin\varphi'_x = \frac{\partial}{\partial \bar{x}} \Psi(\bar{x},\bar{y};\lambda,m) \quad (120)$$

$$n' \sin\varphi'_y - n\sin\varphi_y = \frac{\partial}{\partial \bar{y}} \Psi(\bar{x},\bar{y};\lambda,m).$$

If $\delta\Psi(\bar{x},\bar{y};\lambda,m)/\neq\bar{x}\neq 0$, then $\phi'_x \neq 0$. This means that—if the grating lines are not perpendicular to the plane of incidence—a ray deviation to the side will take place and the plane of emergence will not coincide with the plane of incidence (other than in the case of a mere refraction). If, conversely, $\neq\Psi(\bar{x},\bar{y};\lambda,m)/\neq\bar{x}=0$, then $\phi'_x=0$ and the ray deviation will take place only in the $\bar{y}$-$\bar{z}$ plane.

In order to describe wavefront properties, it is suggested that the ray tracing of a main ray passing through an evaluation point of the optical element be performed first. Thus, the main ray differs from possible neighboring rays that pass off the evaluation point. In the exemplary case of a spectacle lens, a main ray is particularly a light ray that, starting from the object point, passes through the center of the entrance pupil. Upon eye movements, the entrance pupil coincides with the ocular center of rotation, and not necessarily with the physical pupil of the eye. The angles $\phi_x$, $\phi_y$, $\phi'_x$, $\phi'_y$, and thus the vectors N,N' in equations (112a) and (112b) are known after this step.

In addition, it is suggested that except for a local coordinate system, which serves to describe the base surface and in which also the incident and the outgoing rays are described, yet further coordinate systems be introduced as well.

The coordinate system (x,y,z) serves to describe the incident wavefront and is directed such that the z axis is directed in the direction of light along the incident ray direction N and that the origin (x,y,z)=(0,0,0) coincides with the point $(\bar{x},\bar{y},\bar{z})=(0,0,0)$.

The coordinate system (x',y',z') serves to describe the outgoing wavefront and is directed such that the z' axis is directed in the direction of light along the outgoing ray direction N' and that the origin (x',y',z')=(0,0,0) also coincides with the point $(\bar{x},\bar{y},\bar{z})=(0,0,0)$.

The coordinates of a spatial vector can be described either by the variable $v=(v_x,v_y,v_z)$ in the coordinate system (x,y,z), by the variable $v'=(v'_x,v'_y,v'_z)$ in the coordinate system (x',y',z'), or by the variable $\bar{v}=(\bar{v}_x,\bar{v}_y,\bar{v}_z)$ in the coordinate system $(\bar{x},\bar{y},\bar{z})$. The mutual position of the coordinate systems depends on the rays and is only set except for the degrees of freedom, which corresponds to a rotation of the system (x,y,z) about the incident ray and to a second independent rotation of the system (x',y',z') about the outgoing ray.

Preferably, the mutual position of the coordinate systems is set by $$v = R \cdot \bar{v} \quad (121)$$
$$R = R_z(\chi)R_x(\varphi)R_z(-\chi)$$
$$v' = R' \cdot \bar{v}$$
$$R' = R_z(\chi')R_x(\varphi')R_z(-\chi')$$

where $$R_x(\varepsilon) = \begin{pmatrix} 1 & 0 & 0 \\ 0 & \cos\varepsilon & -\sin\varepsilon \\ 0 & \sin\varepsilon & \cos\varepsilon \end{pmatrix}, \quad (122)$$

$$R_y(\varepsilon) = \begin{pmatrix} \cos\varepsilon & 0 & \sin\varepsilon \\ 0 & 1 & 0 \\ -\sin\varepsilon & 0 & \cos\varepsilon \end{pmatrix},$$

$$R_z(\varepsilon) = \begin{pmatrix} \cos\varepsilon & -\sin\varepsilon & 0 \\ \sin\varepsilon & \cos\varepsilon & 0 \\ 0 & 0 & 1 \end{pmatrix}.$$

The auxiliary angles $\phi$, $\phi'$, $\chi$, $\chi'$ in equation (121) must be expressed by the variables $\phi_x$, $\phi_y$, $\phi'_x$, $\phi'_y$ known before the wavefront tracing. The matrices R, R' are constructed such that $\phi$, $\phi'$ are the angles of incidence and emergence with respect to the surface normal, and it holds that $$\cos\varphi = \sqrt{1 - \sin^2\varphi_x - \sin^2\varphi_y} \quad (123)$$
$$\sin\varphi = \sqrt{\sin^2\varphi_x + \sin^2\varphi_y},$$
$$\cos\varphi' = \sqrt{1 - \sin^2\varphi'_x - \sin^2\varphi'_y}$$
$$\sin\varphi' = \sqrt{\sin^2\varphi'_x + \sin^2\varphi'_y},$$

and $$\sin\chi = \frac{-\sin\varphi_x}{\sqrt{\sin^2\varphi_x + \sin^2\varphi_y}} \quad (124)$$

$$\cos\chi = \frac{\sin\varphi_y}{\sqrt{\sin^2\varphi_x + \sin^2\varphi_y}},$$

$$\sin\chi' = \frac{-\sin\varphi'_x}{\sqrt{\sin^2\varphi'_x + \sin^2\varphi'_y}}$$

$$\cos\chi' = \frac{\sin\varphi'_y}{\sqrt{\sin^2\varphi'_x + \sin^2\varphi'_y}}.$$

From the above equations (123) and (124), it follows that $$\tan\chi = -\frac{\sin\varphi_x}{\sin\varphi_y}, \quad \tan\chi' = -\frac{\sin\varphi'_x}{\sin\varphi'_y}. \quad (126)$$

If the incident wavefront in the local coordinate system (x,y,z) is determined by $W_{In}(x,y)$, the refractive base surface in the system $(\bar{x},\bar{y},\bar{z})$ will be determined by $\bar{S}(\bar{x},\bar{y})$, and the sought-for outgoing wavefront in the system (x',y',z') is determined by $W'_{Out}(x',y')$ then the following formulae (127) and (128) will describe the dependence of the second local derivatives of the wavefronts (i.e. the incident and outgoing wavefronts), of the base surface, and of the phase $\Psi(\bar{x},\bar{y};\lambda,m)$.

$$n'R_2(\chi')C'_2R_2(-\chi')\begin{pmatrix} W'^{(2,0)}_{Out}(0,0) \\ W'^{(1,1)}_{Out}(0,0) \\ W'^{(0,2)}_{Out}(0,0) \end{pmatrix} - \quad (127)$$

$$nR_2(\chi)C_2R_2(-\chi)\begin{pmatrix} W^{(2,0)}_{In}(0,0) \\ W^{(1,1)}_{In}(0,0) \\ W^{(0,2)}_{In}(0,0) \end{pmatrix} ==$$

$$v\begin{pmatrix} \bar{S}^{(2,0)}(0,0) \\ \bar{S}^{(1,1)}(0,0) \\ \bar{S}^{(0,2)}(0,0) \end{pmatrix} - \begin{pmatrix} \Psi^{(2,0)}(0,0) \\ \Psi^{(1,1)}(0,0) \\ \Psi^{(0,2)}(0,0) \end{pmatrix},$$

where $$v = n'\cos\varphi' - n\cos\varphi \quad (128)$$
$$= n'\sqrt{1 - \sin^2\varphi'_x - \sin^2\varphi'_y} - n\sqrt{1 - \sin^2\varphi_x - \sin^2\varphi_y}$$

is satisfied. The phase $\Psi(\bar{x},\bar{y};\lambda,m)$ is the phase defined in equation (116).

The individual terms of equation (127) correspond to the terms of the BAD equation B−A=D+PK$^{(2)}$.

In equation (127), the superscript symbols represent derivatives. It holds for an arbitrary function h(x,y) that:

$$h^{(k-m,m)}(0,0) := \partial^k/\partial x^{k-m}\partial y^m h(x,y)|_{x=0,y=0}. \quad (129)$$

The function h(x,y) in the formula (129) optionally plays the role of the functions $W_{In}(x,y)$, $W'_{Out}(x',y')$, $\bar{S}(\bar{x},\bar{y})$ and $\Psi(\bar{x},\bar{y};\lambda,m)$, wherein in the case of $\Psi(\bar{x},\bar{y};\lambda,m)$, the derivatives refer to $\bar{x},\bar{y}$. The matrices $C_2$ and $C'_2$ are defined as in the purely refractive case (cf. e.g. G. Esser, W. Becken, W. Müller, P. Baumbach, J. Arasa and D. Uttenweiler, "*Derivation of the refraction equations for higher-order aberra-* tions of local wavefronts at oblique incidence", J. Opt. Soc. Am. A/Vol. 27, No. 2/February 2010):

$$C_2 = \begin{pmatrix} 1 & 0 & 0 \\ 0 & \cos\varphi & 0 \\ 0 & 0 & \cos^2\varphi \end{pmatrix}, C'_2 = \begin{pmatrix} 1 & 0 & 0 \\ 0 & \cos\varphi' & 0 \\ 0 & 0 & \cos^2\varphi' \end{pmatrix}. \quad (130)$$

In addition, the matrix $R_2(\chi)$ is taken into account in equation (127), which describes the rotation of the wavefront. If, generally, a wavefront is determined by the function w(x,y), it will be described in rotated coordinates $$\begin{pmatrix} \tilde{x} \\ \tilde{y} \end{pmatrix} = Rot(\alpha)\begin{pmatrix} x \\ y \end{pmatrix} \text{ with } Rot(\alpha) = \begin{pmatrix} \cos\alpha & -\sin\alpha \\ \sin\alpha & \cos\alpha \end{pmatrix} \quad (132)$$

by the transformed function $$\tilde{w}(\tilde{x},\tilde{y}) = w(x(\tilde{x},\tilde{y}), y(\tilde{x},\tilde{y})) \quad (133)$$

The $k^{th}$-order derivative $$\frac{\partial^k}{\partial \tilde{x}^m \partial \tilde{y}^{k-m}} \tilde{w}(\tilde{x}, \tilde{y})$$

with respect to the rotated coordinates can be expressed as a linear combination of the derivatives $$\frac{\partial^k}{\partial x^l \partial y^{k-l}} w(x, y)$$

with respect to the original coordinates. The $(k+1) \times (k+1)$ matrix $R_k(\chi)$ describes the transition between the $k^{th}$-order derivative in the coordinate system (x,y) and the $k^{th}$-order derivative in the coordinate system $(\tilde{x}, \tilde{y})$.

$$\frac{\partial^k}{\partial \tilde{x}^m \partial \tilde{y}^{k-m}} \tilde{w}(\tilde{x}, \tilde{y}) = \sum_{l=0}^{k} (R_k(\chi))_{(m+1),(l+1)} \frac{\partial^k}{\partial x^l \partial y^{k-l}} w(x, y), \quad (134)$$

$$m = 0, \ldots k, \quad l = 0, \ldots, k$$

It explicitly holds for the first three orders that $$R_1(\alpha) = \begin{pmatrix} \cos\alpha & -\sin\alpha \\ \sin\alpha & \cos\alpha \end{pmatrix} = Rot(\alpha)$$

$$R_2(\alpha) = \begin{pmatrix} \cos^2\alpha & -2\cos\alpha\sin\alpha & \sin^2\alpha \\ \cos\alpha\sin\alpha & \cos^2\alpha - \sin^2\alpha & -\cos\alpha\sin\alpha \\ \sin^2\alpha & 2\cos\alpha\sin\alpha & \cos^2\alpha \end{pmatrix}$$

$$R_3(\alpha) = \begin{pmatrix} \cos^3\alpha & -3\cos^2\alpha\sin\alpha & 3\cos\alpha\sin^2\alpha & -\sin^3\alpha \\ \cos^2\alpha\sin\alpha & \cos^3\alpha - 2\cos\alpha\sin^2\alpha & \sin^3\alpha - 2\cos^2\alpha\sin\alpha & \cos\alpha\sin^2\alpha \\ \cos\alpha\sin^2\alpha & -(\sin^3\alpha - 2\cos^2\alpha\sin\alpha) & \cos^3\alpha - 2\cos\alpha\sin^2\alpha & -\cos^2\alpha\sin\alpha \\ \sin^3\alpha & 3\cos\alpha\sin^2\alpha & 3\cos^2\alpha\sin\alpha & \cos^3\alpha \end{pmatrix}$$

In the following, some special cases of optical systems, in particular spectacle lenses with POE, will be discussed. In the case of a perpendicular incidence of light, it holds that:

$$v = n' - n;$$

$$R_2 = 1;$$

$$C_2 = 1;$$

$$C'_2 = 1.$$

It yields for equation (127):

$$n'\begin{pmatrix} W'^{(2,0)}_{Out}(0,0) \\ W'^{(1,1)}_{Out}(0,0) \\ W'^{(0,2)}_{Out}(0,0) \end{pmatrix} - n\begin{pmatrix} W^{(2,0)}_{In}(0,0) \\ W^{(1,1)}_{In}(0,0) \\ W^{(0,2)}_{In}(0,0) \end{pmatrix} = \quad (127a)$$

$$(n'-n)\begin{pmatrix} \bar{S}^{(2,0)}(0,0) \\ \bar{S}^{(1,1)}(0,0) \\ \bar{S}^{(0,2)}(0,0) \end{pmatrix} - \begin{pmatrix} \Psi^{(2,0)}(0,0) \\ \Psi^{(1,1)}(0,0) \\ \Psi^{(0,2)}(0,0) \end{pmatrix}$$

With a one-dimensional problem (meridional plane), instead of mixed derivatives with respect to $\bar{x}, \bar{y}$, only derivatives with respect to one coordinate (e.g. $\bar{y}$) occur. Moreover, it holds that $$R_2 = \bar{R}_2 = 1;$$

$$C_2 = \bar{C}_2 = \cos^2\varphi;$$

$$C'_2 = \bar{C}'_2 = \cos^2\varphi'.$$

Consequently, equation (127) can be written as $$n'\cos^2\varphi' W'^{(2)}_{Out}(0) - n\cos^2\varphi W^{(2)}_{In}(0) = v\bar{S}^{(2)}(0) - \Psi^{(2)}(0) \quad (127b)$$

With a perpendicular incidence of light and a one-dimensional problem, instead of mixed derivatives with respect to $\bar{x}, \bar{y}$, only derivatives with respect to one coordinate (e.g. $\bar{y}$) occur. Moreover, it holds that $$v = n' - n$$

$$R_2 = \bar{R}_2 = 1$$

$$C_2 = \bar{C}_2 = 1$$

$$C'_2 = \bar{C}'_2 = 1$$

Consequently, equation (127) can be written as $$n' W^{(2)}_{Out}(0) - n W^{(2)}_{In}(0) = (n'-n)\bar{S}^{(2)}(0) - \Psi^{(2)}(0) \quad (127c)$$

(135)

Higher-Order Properties of the Wavefront ($3^{rd}$, $4^{th}$, . . . -Order Properties)

By analogy with equation (127), it holds for $3^{rd}$-order derivatives that $$n'R_3(\chi')C'_3R_3(-\chi')\begin{pmatrix} W'^{(3,0)}_{Out}(0,0) \\ W'^{(2,1)}_{Out}(0,0) \\ W'^{(1,2)}_{Out}(0,0) \\ W'^{(0,3)}_{Out}(0,0) \end{pmatrix} - \tag{136}$$

$$nR_3(\chi)C_3R_3(-\chi)\begin{pmatrix} W^{(3,0)}_{In}(0,0) \\ W^{(2,1)}_{In}(0,0) \\ W^{(1,2)}_{In}(0,0) \\ W^{(0,3)}_{In}(0,0) \end{pmatrix} ==$$

$$v\begin{pmatrix} \overline{S}^{(3,0)}(0,0) \\ \overline{S}^{(2,1)}(0,0) \\ \overline{S}^{(1,2)}(0,0) \\ \overline{S}^{(0,3)}(0,0) \end{pmatrix} - \begin{pmatrix} \Psi^{(3,0)}(0,0) \\ \Psi^{(2,1)}(0,0) \\ \Psi^{(1,2)}(0,0) \\ \Psi^{(0,3)}(0,0) \end{pmatrix} + Q_3(S^{(2)}, F^{(2)})$$

wherein analogously to equation (130), it holds that:

$$C_3 = \begin{pmatrix} 1 & 0 & 0 & 0 \\ 0 & \cos\varphi & 0 & 0 \\ 0 & 0 & \cos^2\varphi & 0 \\ 0 & 0 & 0 & \cos^3\varphi \end{pmatrix}, \tag{137}$$

$$C'_3 = \begin{pmatrix} 1 & 0 & 0 & 0 \\ 0 & \cos\varphi' & 0 & 0 \\ 0 & 0 & \cos^2\varphi' & 0 \\ 0 & 0 & 0 & \cos^3\varphi' \end{pmatrix}.$$

Equations for even higher orders k=4, 5, . . . can be formed analogously.

With the above-described procedure, it is possible to describe an optical system (e.g. a spectacle lens) with at least one diffraction grating in an exact manner. In particular, it is possible to describe the second and higher-order properties of the wavefront exiting the optical system in an exact manner. On the basis of the second and higher-order properties of the wavefront, the aberrations of the optical element (e.g. of the spectacle lens) can be determined in a manner per se known. In this respect, special reference is made to document WO 2008/089999 A1, to the article by W. Becken et al. "Brillengläser im Sport: Optimierung der Abbildungseigenschaften unter physiologischen Aspekten", Z. Med. Phys., 17 (2007), pages 56-66, or to the article by G. Esser "Derivation of the refraction equations for higher-order aberrations of local wavefronts at oblique incidence", JOSA A, vol. 27, no. 2, February 2010, pages 218-237. These documents are explicitly referred to with regard to the technical terminology used as well as the symbols used in equations (121) to (137) and the connection of sphere, cylinder, axis (SZA values) to wavefront properties. Thus, the corresponding explanations constitute an integral part of disclosure of the present application.

As explained above, the method for assessing at least one optical property at at least one evaluation point of an optical element can be part of an optimization and a production process. In the following examples, the optical element is a spectacle lens and the at least one phase-modifying optical element is a diffraction grating. However, the optical element can also be an arbitrary optical element, such as a lens, a lens system, etc. The phase-modifying optical element can also be an arbitrary phase-delaying or phase-modulating element. The optical properties of the optical element (astigmatism and refractive error) are calculated or assessed by means of a method for assessing the at least one optical property according to one of the above-described preferred examples.

Different procedures for performing a preferred optimization method according to the invention exist.

Iterative Method

In this method, at least one of the refractive surfaces of the spectacle lens, which contribute to the refraction, and the at least one diffraction grating are successively optimized or modified.

In a first step, a monochromatic optimization of at least one of the surfaces (hereinafter referred to as lens surfaces), which contribute to the refraction, of a predetermined spectacle lens not having a diffraction grating is performed. In particular, at least one of the lens surfaces is modified and optimized until the refractive error and/or the astigmatic error is/are minimized. The monochromatic optimization is performed such that the refractive power in at least one reference point of the spectacle lens takes on the prescription value $S_{prescription}$ ($S_{ref,0}(\lambda_d) = S_{prescription}$). The prescription value is the value that is determined for a spectacles wearer e.g. by refraction determination and that is required for correcting a visual defect of the spectacles wearer. The reference point can be the distance reference point, the centration or fitting point, the optical or geometric center of the spectacle lens, or any other suitable point on the spectacle lens. The monochromatic optimization can be performed for an arbitrary, suitable wavelength; preferably, the monochromatic optimization is performed for the wavelength $\lambda_d$, which is also taken into account in the definition of the Abbe number. The spectacle lens is preferably optimized in the wearing position. Methods for the monochromatic optimization of spectacle lenses are known from the prior art (e.g. WO 2008/089999 A1).

In a third step, a diffraction grating is added with lens surfaces being maintained. The diffraction grating is determined or calculated so as to optimally correct the color fringe of the spectacle lens optimized in the preceding step. However, by adding the diffraction grating, a refractive error is introduced.

In a fourth step, with the grating being maintained, at least one of the lens surfaces contributing to the refraction can be optimized again until the refractive error, which has been introduced by the grating, is compensated for. In a next step, the grating is adjusted in order to compensate for the color fringe that formed due to the surface modification in the fourth step.

Since for ordinary Abbe numbers the refractive power of a grating, which is to compensate for the color fringe of a spectacle lens, is in the order of 5% to 10% of the refractive power of the spectacle lens, the modifications in the iterative method become increasingly less, so that the method generally converges and can be discontinued after a suitably selected step.

In this method, both the color fringe and the refractive error take on their conceivable minima only approximately, since the method is discontinued after a finite number of steps.

Provision of Refractive Power

As explained above, a diffraction grating also exhibits refractive power. The actual refractive power of a spectacle lens having a diffraction grating can be represented as the sum of the refractive power of the spectacle lens formed by purely refractive surfaces and of the refractive power of the diffraction grating. In particular, the actual refractive power $S_0(\lambda_d)$ of a color fringe-corrected lens with a refractive power $S_{ref,0}(\lambda_d)$ is determined by $$S_0(\lambda_d) = S_{ref,0}(\lambda_d)\left(1 - \frac{1}{v_d} \cdot \frac{\lambda_d}{\lambda_F - \lambda_C}\right), \quad (138)$$

where $v_d=(n_d-1)/(n_F-n_C)$ is the (alternative) Abbe number of the optical material of the spectacle lens, and $n_d$, $n_F$ and $n_C$ are the refractive indices of the optical material at the wavelengths $\lambda_d$, $\lambda_F$, and $\lambda_C$. Preferably, $\lambda_d=587.562$ nm, $\lambda_F=486.134$ nm, and $\lambda_C=656.281$ nm.

Instead of optimizing at least one of the lens surfaces in an iterative process such that the refractive power of the spectacle lens in at least one reference point takes on the prescription value $S_{prescription}$ ($S_{ref,0}(\lambda_d)=S_{prescription}$), the modification of the refractive power can be provided by a predetermined diffraction grating. This means that the optimization of the at least one lens surface in a first step is categorically organized such that the later total refractive power of the spectacle lens with the grating in at least one reference point takes on the prescription value, so that $S_0(\lambda_d)=S_{prescription}$ is satisfied. Consequently, the refractive, monochromatic optimization of the lens surfaces is performed such that for the refractive power of the spectacle lens in the predetermined reference point the condition $$S_{ref,0}(\lambda_d) = \frac{S_{prescription}}{\left(1 - \frac{1}{v_d} \cdot \frac{\lambda_d}{\lambda_F - \lambda_C}\right)} \quad (139)$$

is satisfied.

In a second step, a diffraction grating is calculated and introduced such that it compensates for the color fringe of the spectacle lens of the first step. The thus added refractive error of the spectacle lens is exactly such that the total refractive power of the lens is $S_0(\lambda_d)=S_{prescription}$.

The method has the advantage that the color fringe is always optimally compensated for (within the possibilities of the grating). The refractive error, however, is only corrected approximately, since after introducing the diffraction grating, the lens surfaces of the spectacle lens cannot again be optimized in the wearing position.

Provision of Diffractive Power

Instead of determining the required grating at a later point by means of provision of the refractive power in the above-described method, the grating can categorically, i.e. right in a first step, be determined as the grating to compensate for the color fringe of a lens with refractive power $S_{ref,0}(\lambda_d)$ (cf. equation (139)). In a second step, the refractive error of the spectacle lens is optimized, wherein with the grating being maintained, an optimization of at least one of the refractive lens surfaces is performed. Preferably, the optimization of at least one of the refractive lens surfaces is performed taking the wavefront tracing with the presence of a diffraction grating into consideration.

The method according to the third example has the advantage that the refractive error is minimized in the wearing position in the best possible way, since the wavefront optimization in the wearing position is the last step to be performed. In this step, all other variables, such as the grating, are already known. A disadvantage might be that the color fringe might not be compensated for in the best possible way, since the grating is determined generally and not depending on the current surfaces in advance.

Simultaneous Optimization of Surfaces and Grating

With regard to a simultaneous optimization of the refractive portions and the diffractive portions of a lens, a preferred embodiment suggests minimizing both the refractive aberrations and the chromatic aberrations or the color fringe by minimizing a target function.

It is known from WO 2008/089999 A1 to perform a monochromatic optimization of a spectacle lens by minimizing the following monochromatic target function:

$$F_{monochrom} = \sum_i g_Z(i)(Z_\Delta(i) - Z_{\Delta,target}(i))^2 + g_S(i)(S_\Delta(i) - S_{\Delta,target}(i))^2, \quad (140)$$

where $S_\Delta$ and $Z_\Delta$ are the refractive error of the spherical equivalent or the amount of the astigmatic deviation, $S_{\Delta,target}$, $Z_{\Delta,target}$ the corresponding target values, and $g_Z(i)$ and $g_S(i)$ the respective weightings.

The image formation properties are evaluated at a predetermined wavelength. The sum over the index i goes over different evaluation points of the spectacle lens. A degree of freedom in the minimization of the target function in equation (140) is usually a vertex depth of at least one refractive surface, which is described by a function $z(x,y)$. The degree of freedom in the optimization can e.g. be the vertex depth $z_1(x,y)$ of the front surface or the vertex depth $z_2(x,y)$ of the back surface of a spectacle lens. It is also possible that both the vertex depth of the front surface and that of the back surface are degrees of freedom in the optimization, as may be the case in a double progressive spectacle lens. The monochromatic target function can be a monocular or a binocular target function. A monochromatic binocular target function is described e.g. in WO 2008 089999 A1 or in the article of W. Becken, et al. "Brillengläser im Sport: Optimierung der Abbildungseigenschaften unter physiologischen Aspekten", Z. Med. Phys., 17 (2007), pages 56-66. Reference is made to these documents with respect to the technical terms used, and in particular the symbols used in equation (140), as well as to the connection of sphere, cylinder, axis (SZA values) with wavefront properties. Thus, the corresponding explanations constitute an integral part of the disclosure or the present application.

According to one embodiment of the invention, it is suggest that the monochromatic target function be expanded to take the wavelength dependency of the lens with a grating into consideration. In particular, the following three types of target functions are suggested:

Type1) (141)
$$F_1 = \sum_\lambda F_{monochrom}(\lambda)$$

Type2) (142)
$$F_2 = F_{monochrom}(\lambda_0) + \sum_i g_{FLF}(i) \times f(S_{SK}(i, \lambda_2) - S_{SK}(i, \lambda_1))^2$$

-continued

Type3)
$$F_3 = F_{monochrom}(\lambda_0) + \sum_i g_{FQF}(i) \times g(\Delta\varphi_{SK}(i, \lambda_2, \lambda_1))^2. \quad (143)$$

An example of a target function of type 1 is the target function $$F_1 = \sum_{i,\lambda} g_Z(i, \lambda)(Z_\Delta(i, \lambda) - Z_{\Delta,target}(i, \lambda))^2 + \quad (141a)$$

$$g_s(i, \lambda)(S_\Delta(i, \lambda) - S_{\Delta,target}(i, \lambda))^2.$$

An example of a target function of type 2 is the target function $$F_2 = \sum_i (g_Z(i)(Z_\Delta(i, \lambda_0) - Z_{\Delta,target}(i, \lambda_0))^2 + \quad (142a)$$

$$g_s(i)(S_\Delta(i, \lambda_0) - S_{\Delta,target}(i, \lambda_0))^2 +$$

$$g_{FLF}(i) \times f(S_{SK}(i, \lambda_2) - S_{SK}(i, \lambda_1))^2).$$

An example of a target function of type 3 is the target function $$F_3 = \sum_i (g_Z(i)(Z_\Delta(i, \lambda_0) - Z_{\Delta,target}(i, \lambda_0))^2 + \quad (143a)$$

$$g_s(i)(S_\Delta(i, \lambda_0) - S_{\Delta,target}(i, \lambda_0))^2 +$$

$$g_{FQF}(i) \times g(\Delta\varphi_{SK}(i, \lambda_2, \lambda_1))^2).$$

In the above equations (141a) to (142a):

$Z_\Delta(i,\lambda)$ is the actual value of the astigmatic error or the amount of the astigmatic deviation at the i$^{th}$ evaluation point of the spectacle lens for the wavelength $\lambda$;

$Z_{\Delta,target}(i,\lambda)$ is the target value of the astigmatic error or the amount of the astigmatic deviation at the i$^{th}$ evaluation point of the spectacle lens for the wavelength $\lambda$;

$S_\Delta(i,\lambda)$ is the actual value of the refractive error or the deviation of the spherical equivalent at the i$^{th}$ evaluation point of the spectacle lens for the wavelength $\lambda$;

$S_{\Delta,target}(i,\lambda)$ is the target value of the refractive error or the deviation of the spherical equivalent at the i$^{th}$ evaluation point of the spectacle lens for the wavelength $\lambda$;

$g_Z(i,\lambda)$ is the weighting of the astigmatic error/of the amount of the astigmatic deviation at the i$^{th}$ evaluation point of the spectacle lens for the wavelength $\lambda$;

$g_S(i,\lambda)$ is the weighting of the refractive error or the deviation of the spherical equivalent at the i$^{th}$ evaluation point of the spectacle lens for the wavelength $\lambda$;

$g_{FLF}(i)$ is the weighting of the longitudinal chromatic aberration at the i$^{th}$ evaluation point of the spectacle lens;

$g_{FQF}(i)$ is the weighting of the lateral chromatic aberration at the i$^{th}$ evaluation point of the spectacle lens;

$S_{SK}(i,\lambda_1)$ is the vergence matrix of the wavefront at the vertex sphere for the wavelength $\lambda_1$ and for the i$^{th}$ evaluation point;

$S_{SK}(i,\lambda_2)$ is the vergence matrix of the wavefront at the vertex sphere for the wavelength $\lambda_2$ and for the i$^{th}$ evaluation point; and $\Delta\varphi_{SK}(i,\lambda_2,\lambda_1)$ is the angle between the object-side main rays for two different wavelengths $\lambda_1$ and $\lambda_2$.

In the target function of type 1, the common monochromatic target function is understood to be a function of the wavelength, i.e. $F_{monochrom}=F_{monochrom}(\lambda)$. Subsequently, this target function is repeatedly evaluated for several wavelengths and summed via a predetermined set of wavelengths. The set of wavelengths comprises at least two wavelengths, e.g. $\lambda_1=\lambda_F=486.134$ nm and $\lambda_2=\lambda_C=656.281$ nm. In addition to the index i, the sum also goes over the wavelength $\lambda$ correspondingly.

The target function of type 2 is particularly obtained since a common monochromatic target function is evaluated at an operating wavelength $\lambda_0$ and since another term is added to this function, which depends on the difference $S_{SK}(i,\lambda_2)-S_{SK}(i,\lambda_1)$ of the vergence matrices $S_{SK}$ for two different wavelengths $\lambda_1$, $\lambda_2$. The type of dependence $f(S_{SK}(i,\lambda_2)-S_{SK}(i,\lambda_1))$ can be selected differently. In particular, $f(S_{SK}(i,\lambda_2)-S_{SK}(i,\lambda_1))$ can be the dioptric distance between the vergence matrices or the difference of the spherical equivalents. In the latter case, the term $f(S_{SK}(i,\lambda_2)-S_{SK}(i,\lambda_1))$ represents a penalty term for the longitudinal chromatic aberration.

The target function of type 3 is obtained by analogy with the target function of type 2, with the difference that the additional term $g(\Delta\varphi_{SK}(i,\lambda_2,\lambda_1))$ is a penalty term for the lateral chromatic aberration determined by the angle $\Delta\varphi_{SK}(i,\lambda_2,\lambda_1)$ between the object-side main rays at the i$^{th}$ evaluation point. Here, g is a suitable function, e.g. the identity, a trigonometric function, or any other function.

Irrespective of the type of target function (target function of type 1, type 2, or type 3), a function describing the diffraction grating is a degree of freedom of the optimization. In addition, the vertex depth z(x,y) of at least one of the surfaces of the spectacle lens is a degree of freedom in the optimization. The vertex depth can be described parametrically. A suitable representation of the vertex depth is a polynomial representation or a representation by means of splines, for example.

Preferably, the function describing the diffraction grating is a phase function $\Psi(x,y)$. The phase function $\Psi(x,y)$ represents the optical path length difference (optical path difference or OPD), which is introduced by the diffraction grating, as a function of the coordinates x,y of a suitably selected coordinate system. Preferably, the phase function $\Psi(\overline{x},\overline{y})$ is plotted in a local coordinate system $(\overline{x},\overline{y},\overline{z})$, where $\overline{x},\overline{y}$ are the coordinates tangentially to the refracting surface. The description of a diffraction grating by a phase function will be described in detail in the following.

The phase function can preferably be described parametrically, with the number of parameters being equal to the number of degrees of freedom of the phase function. Such a description is particularly suitable in the case that the phase function is to have certain symmetries. Generally, the phase function can be described by splines, like a free-form surface, wherein in the optimization, optionally up to several thousands of spline coefficients are available for variation then.

The calculation of the wearing properties in equations (141) to (143) is performed in the presence of the diffraction grating, described by the current phase function $\Psi(\overline{x},\overline{y})$. The refractive index relevant for the calculations is determined by its value $n(\lambda)$ at the respective wavelength $\lambda$. The determined grating can generally be asymmetric, since the function $\Psi(x,y)$ is freely optimized and does not or does not have to include any symmetries a priori.

Instead of only one or two refractive surfaces, a higher number of refractive surfaces can be taken into consideration in the equations (141) to (143). For example, several refractive surfaces are present with compound systems. In equations (141) to (143), a higher number (two or more) of gratings can be taken into consideration as well. The several gratings can each be arranged on the boundary surfaces of a compound system, for example.

The target function can also comprise terms that depend on the higher-order aberrations, such a coma, trefoil, spherical aberration. Moreover, instead of the monocular target function in equation (140), a binocular target function can be used as well. A monochromatic binocular target function is described e.g. in WO 2008/089999 A1 or in the publications of W. Becken, et al. "Brillengläser im Sport: Optimierung der Abbildungseigenschaften unter physiologischen Aspekten", Z. Med. Phys., 17 (2007), pages 56-66.

By introducing a target function in the method for optimizing a spectacle lens with at least one diffraction grating, the problem of meeting the refraction requirements on the spectacle lens and achieving the reduction of chromatic aberrations in the best possible way can be solved to a large extent. In particular, by means of the target function, a compromise between all requirements for a plurality of viewing directions can be sought. The target function can be based on common monochromatic target functions of the prior art; wherein according to a preferred example, it is suggested that additional terms be introduced, which directly include the lateral chromatic aberrations (type 3) and/or directly the longitudinal chromatic aberrations (type 2). Alternatively, the chromatic aberrations can be corrected indirectly by evaluating a monochromatic target function for several different wavelengths and summing it over all wavelengths (type 1). In order to meet the increasing requirements, it is suggested that additional degrees of freedom (parameters) be introduced and varied, namely the degrees of freedom of at least one diffraction grating, which is preferably taken into account in the target function via a modified wavefront tracing.

It depends on the performance of the optimization steps how well the quality of the above-described iterative method, of the method including provision of refractive power, and of the method including provision of diffractive power comes near the quality of the method including a simultaneous optimization of the lens surfaces and of the grating by means of a target function. For example, if also a target function of type 1 is used in the iterative method, the quality of the iterative method including a sequential optimization of the lens surfaces and of the grating can come close to the quality of the method including a simultaneous optimization of the lens surfaces and of the grating by means of a target function, depending on the length of the iteration. An advantage of the iterative method including a sequential optimization of the lens surfaces and of the grating can be that also simpler target functions of the prior art can be used, as long as the wearing position optimization of the surface is performed in the last step. Moreover, if a complete compensation of the color fringe is not intended, but a certain residual color fringe error is admissible, then a relatively general selection of the grating will usually be sufficient, so that it does not have to be determined by optimization or by a target function. The same applies to the method including provision of diffractive power, since also in this case the last step is the wearing position optimization of the surface.

In contrast, the method including provision of refractive power is mainly suitable for the optimization of single-vision lenses with gratings, since due to the grating being added at a later point, the ray path changes such that the lens in the wearing position does generally not meet the vision needs fully any more. However, in single-vision lenses, existing symmetries can be advantageously used such that due to the provision of right power in the optical center, sufficient quality can also be expected in the periphery.

EMBODIMENTS

The following embodiments relate to rotationally symmetric single-vision lenses with a diffraction grating, wherein the astigmatism is disregarded and only one-dimensional problems are considered for the sake of simplicity. The single-vision lenses have a prescription power of $S_{prescription}$+6.0 dpt and are made of an optical material having a refractive index of $n_d$=1.597 with an Abbe number of $v_d$=42.0. All spectacle lenses according to the examples of the invention are optimized according to the method for simultaneously optimizing lens surfaces and gratings with a target function. The optimization methods specifically used in embodiment 1 and embodiment 2 differ in some optimization objectives though.

Other than most of the optimization problems, embodiment 1 is not an overdetermined problem and can therefore be solved exactly. It leads to a lens fully corrected within the scope of the model assumptions. Embodiment 2 is selected such that also within the scope of the one-dimensional treatment without astigmatism, a compromise for several viewing directions has to be found, which depends on the type of target function. This situation corresponds to the general case of a spectacle lens with a diffraction grating. For example, in progressive lenses, already without taking chromatic aberrations into account, the Minkwitz theorem causes the optimization problem to be overdetermined and therefore a compromise has to be found.

It can be seen in both embodiments that the introduced grating can significantly improve the chromatic aberrations of the lens and at the same time also optimize the refractive error of the lens. Of course, the method is not limited to one-dimensional problems, but can also be applied to the tracing of a spectacle lens in the wearing position. In this more general case, an oblique-angled ray incidence is taken into consideration in the wavefront tracing.

In the following, the optimization of a rotationally symmetric spectacle lens by means of a target function will be explained in more detail. As explained above, the astigmatism of the spectacle lens will be neglected for the sake of simplicity.

An exemplary target function of type 1 in this case is a target function of the form:

$$F_1 = \sum_{i,\lambda} g_S(i, \lambda)(S_\Delta(i, \lambda) - S_{\Delta,target}(i, \lambda))^2. \quad (141b)$$

An exemplary target function of type 2 in this case is the target function of the form:

$$F_2 = \sum_i g_S(i)(S_\Delta(i, \lambda_0) - S_{\Delta,target}(i, \lambda_0))^2 + \quad (142b)$$
$$g_{FLF}(i) \times f(S_{SK}(i, \lambda_2) - S_{SK}(i, \lambda_1))^2.$$

An exemplary target function of type 3 in this case is the target function of the form:

$$F_3 = \tag{143b}$$
$$\sum_i g_S(i)(S_\Delta(i,\lambda_0) - S_{\Delta,target}(i,\lambda_0))^2 + g_{FQF}(i) \times f(\Delta\varphi_{SK}(i,\lambda_2,\lambda_1))^2.$$

The calculation of the values taken into account in equations (141b) to (143b) can be performed by means of wavefront tracing. Other than the wavefront tracing in the above-mentioned article of W. Becken, et, al. "Brillengläser im Sport: Optimierung der Abbildungseigenschaften unter physiologischen Aspekten", Z. Med. Phys., 17 (2007), pages 56-66, the generalized Coddington equation described in the article, for the purely refractive case, is further extended by an additional term for the diffractive phase $\Psi$. The extension of the Coddington equation for an optical element with at least one diffraction grating will be described in detail in the following.

In the case of a vertical, or perpendicular, light incidence on the individual boundary surface i(i=1,2) for the then one-dimensional problem, it holds for the wavefront tracing that $$n'_i W'^{(2)}_{Out,i}(0) - n_i W^{(2)}_{In,i}(0) = (n'_i - n_i)\overline{S}^{(2)}_i(0) - \Psi^{(2)}_i(0). \tag{144}$$

In equation (144):
$n'_i$ is the refractive index of the material behind the $i^{th}$ surface;
$n_i$ is the refractive index of the material in front of the $i^{th}$ surface;
$\overline{S}_i$ is the refractive power of the $i^{th}$ surface;
$W'^{(2)}_{Out,i}(0)$ is the curvature of the outgoing wavefront at the $i^{th}$ surface;
$W^{(2)}_{In,i}(0)$ is the curvature of the incident wavefront at the $i^{th}$ surface;
$\Psi^{(2)}_i(0)$ is the phase of the $t^{th}$ diffraction grating.

As can be seen from equation (144), the refractive portion of the refractive power is determined by $(n'_i - n_i)\overline{S}^{(2)}_i(0)$, and the diffractive portion of the refractive power is determined by $-\Psi^{(2)}_i(0)$. In the present example, two refractive surfaces $\overline{S}_1$ and $\overline{S}_2$ and two diffraction gratings $\Psi_1$ and $\Psi_2$, which limit a spectacle lens with a refractive index n in air, are contemplated. In this case, $n_1=1$, $n'_1=n$, $n_2=n$, $n'_2=1$.

The change of the wavefront in the propagation through the spectacle lens and from the spectacle lens to the vertex sphere can be neglected. If the incident waveform is plane (i.e. $W^{(2)}_{In,1}(0)=0$), then the curvature $W'^{(2)}_{Out,2}(0)$ of the outgoing wavefront can be equated directly with the refractive power of the lens. Accordingly, it holds for the refractive and diffractive portions of the refractive power that:

$$S(\overline{x},\lambda) = S_{ref}(\overline{x},\lambda) + S_{diff}(\overline{x},\lambda), \tag{145}$$
where
$$S_{ref}(\overline{x},\lambda) = (n(\lambda)-1)\overline{S}^{(2)}(\overline{x}) \tag{146}$$
$$= (n(\lambda)-1)(\overline{S}^{(2)}_1(\overline{x}) + \overline{S}^{(2)}_2(\overline{x}))$$
$$S_{diff}(\overline{x},\lambda) = -\Psi^{(2)}(\overline{x},\lambda)$$
$$= -(\Psi^{(2)}_1(\overline{x},\lambda) + \Psi^{(2)}_2(\overline{x},\lambda)).$$

If one assumes that $n(\lambda)$ depends linearly on the wavelength, it will hold that $$n(\lambda) - 1 = (n_0 - 1) + \frac{\partial n}{\partial \lambda}(\lambda - \lambda_0) \tag{147}$$
$$= (n_0 - 1) + \frac{n_C - n_F}{\lambda_C - \lambda_F}(\lambda - \lambda_0)$$
$$= (n_0 - 1)\left(1 + \frac{n_C - n_F}{n_0 - 1}\left(\frac{\lambda - \lambda_0}{\lambda_C - \lambda_F}\right)\right).$$

In the above equation, $\lambda_F$=486.1 nm and $\lambda_C$=656.3 nm. The wavelength $\lambda_0$ in the expression $n_0 = n(\lambda_0)$ is a suitably selected wavelength.

Preferably, $\lambda_0 = \lambda_d$=587.1 nm is the wavelength in which the Abbe number $$v_d = -\frac{n_d - 1}{n_C - n_F}$$

is defined, so that $$n(\lambda) - 1 = (n_d - 1)\left(1 - \frac{1}{v_d}\left(\frac{\lambda - \lambda_d}{\lambda_C - \lambda_F}\right)\right) \tag{147a}$$

The phase $\Psi$ is proportional to the wavelength and reads in a spatial dimension:

$$\Psi(\overline{x};\lambda,m) m \lambda \cdot \psi(\overline{x}). \tag{148}$$

The total refractive power can be expressed by the sought functions $\overline{S}^{(2)}(\overline{x})$ of the surface curvature and $\psi^{(2)}(\overline{x})$ of the phase curvature:

$$S(\overline{x},\lambda) = (n_d - 1)\left(1 - \frac{1}{v_d}\left(\frac{\lambda - \lambda_d}{\lambda_C - \lambda_F}\right)\right)\overline{S}^{(2)}(\overline{x}) - m\lambda \cdot \psi^{(2)}(\overline{x}). \tag{149}$$

In the following examples, the target function of type 1 will be evaluated for 2 wavelengths. For the weighting function, it holds that $g_S(i,\lambda)=1$, $g_{FLF}(i)=1$ and $g_{FQF}(i)=1$. The target objectives for the refractive error are set to $S_{\Delta,target}(i,\lambda)=0$. Here, the variable $S_\Delta(i,\lambda)$ is the difference of the existing refractive power $S(\overline{x},\lambda)$ and the required prescription power of the lens $S_{prescription}$.

Under these conditions, the target functions of different types have the respective following formulae:

$$\text{Type 1)} \quad F_1 = \sum_i (S(\overline{x}_i,\lambda_1) - S_{prescription})^2 + \sum_i (S(\overline{x}_i,\lambda_2) - S_{prescription})^2 \tag{150}$$

$$\text{Type 2)} \quad F_2 = \sum_i (S(\overline{x}_i,\lambda_0) - S_{prescription})^2 + f(S_{SK}(i,\lambda_2) - S_{SK}(i,\lambda_1))^2$$

$$\text{Type 3)} \quad F_3 = \sum_i (S(\overline{x}_i,\lambda_0) - S_{prescription})^2 + g(\Delta\varphi_{SK}(i,\lambda_2,\lambda_1))^2.$$

Embodiment 1

The spectacle lens according to the first comparative example has been optimized according to a conventional method by means of minimization of a monochromatic target function. The single-vision lenses of example 1 or example 2 are optimized according to one of the above-described methods by means of target functions of type 1 (example 1) or type 2 (example 2). The wavelengths decisive for the polychromatic optimization are $\lambda_1=\lambda_F=486.1$ nm and $\lambda_2=\lambda_C=656.3$ nm. The following table 1 summarizes the objectives for the optimization methods.

TABLE 1

| | Target function | Degrees of freedom | Evaluation points |
|---|---|---|---|
| Comparative example 1 | monochromatic | 1 (refractive) | 1 ($\bar{x}_i = 0$) |
| Example 1 | type 1 | 1 (refractive) + 1 (diffractive) = 2 | 1 ($\bar{x}_i = 0$) |
| Example 2 | type 2 | 1 (refractive) + 1 (diffractive) = 2 | 1 ($\bar{x}_i = 0$) |

The lens surfaces to be optimized and the gratings used can be described by a parameter representation or by splines or by another suitable form. In the spectacle lenses of the comparative example 1 as well as of the first and second examples, the refractive surface to be optimized is described as follows by the one degree of freedom of the curvature k $$\bar{S}(k) = \frac{k}{2}\bar{x}^2. \tag{151a}$$

The grating phase is described by the function $$\psi(\bar{x}) = \frac{\alpha_2}{2}\bar{x}^2 \tag{151b}$$

where $\alpha_2$ is a variable parameter.

Comparative Example 1

On the assumptions of the present example, the monochromatic target function of equation (140) reads as follows $$F_{monochrom}=(a_d u+c)^2, \tag{152}$$

where $a_d=(n_d-1)$ and $c=-S_{prescription}$. Here, $u=\bar{S}^{(2)}(0)=k$ plays the role of the only degree of freedom, since the grating is not present in the monochromatic target function.

An optimization of the spectacle lens according to the comparative example 1 on the basis of the monochromatic target function of equation (140) due to a wavefront tracing without diffractive addition term furnishes the result $u=-c/a_d$, as can be seen e.g. by differentiating equation (152) for u and by a subsequent zeroing.

This is equivalent to $$\bar{S}^{(2)}(0) = \frac{S_{prescription}}{n_d - 1} \approx 10.05 \; dpt. \tag{153}$$

After substitution of equation (153) into equations (147), (148), (149), the refractive power of such a lens will be $$S(\bar{x}, \lambda) = (n(\lambda) - 1)\bar{S}^{(2)}(\bar{x}) = \left(1 - \frac{1}{v_d}\left(\frac{\lambda - \lambda_d}{\lambda_C - \lambda_F}\right)\right)S_{prescription}. \tag{154}$$

In this case, $S(\bar{x},\lambda)$ of the spectacle lens is equal to $S_{prescription}$ only for $\lambda=\lambda_d$. For other wavelengths, the spectacle lens according to the comparative example 1 exhibits a refractive error.

Therefore, the longitudinal chromatic aberration (FLF) of a spectacle lens according to comparative example 1, which is defined by $$FLF(\bar{x}):=S(\bar{x},\lambda_1)-S(\bar{x},\lambda_2) \tag{155}$$

does not disappear, but is determined by $$FLF(\bar{x}) = \frac{S_{prescription}}{v_d} = 0.14 \; dpt \tag{155a}$$

Under the conditions of the present example, in particular when the corrections for an oblique-angled ray incidence are neglected, the lateral chromatic aberration (FQF) of a spectacle lens can be determined from the longitudinal chromatic aberration (FLF) by integration of Prentice's rule. In the differential form, Prentice's rule reads $$S(r) = \frac{\partial Pr}{\partial r} \Rightarrow Pr(r) = Pr(0) + \int_0^r S(r')dr', \tag{156}$$

where Pr is the prismatic power. Since $Pr(0)=0$, it holds for the lateral chromatic aberration that:

$$FQF(\bar{x}) := |Pr(\bar{x}, \lambda_1) - Pr(\bar{x}, \lambda_2)| = \left|\int_0^r FLF(r')dr'\right| \tag{157}$$

In the present case, it holds that $$FQF(\bar{x}) = \left|\int_0^r \frac{S_{prescription}}{v_d}dr'\right| = 0.14 \; dpt \times |r|. \tag{157a}$$

First Example

In the first example, the spectacle lens is optimized polychromatically by means of minimization of a target function of type 1. An exemplary target function is a target function of the form $$F_1=(a_1u+b_1v+c)^2+(a_2u+b_2v+c)^2, \tag{158}$$

where $$a_i = (n_d - 1)\left(1 - \frac{1}{v_d}\left(\frac{\lambda_i - \lambda_d}{\lambda_C - \lambda_F}\right)\right), \; i = 1, 2; \tag{159}$$

$$b_i = -m\lambda_i, \; i = 1, 2;$$

$$c = -S_{prescription};$$

$$u = \bar{S}^{(2)}(0) = k;$$

$$v = \psi^{(2)}(0) = \alpha_2$$

Directly deriving F with respect to u and v and zeroing lead to the results $$u = \frac{(b_2 - b_1)c}{a_2 b_1 - a_1 b_2} \quad v = \frac{(a_2 - a_1)c}{a_1 b_2 - a_2 b_1}. \tag{160}$$

This is equivalent to $$\overline{S}^{(2)}(0) = \frac{S_{prescription}}{n_d - 1} \times \left(1 + \frac{1}{v_d} \frac{\lambda_d}{\lambda_C - \lambda_F}\right)^{-1} \tag{161}$$

$$\psi^{(2)}(0) = \frac{1}{m} \times \frac{S_{prescription}}{-v_d(\lambda_C - \lambda_F)} \times \left(1 + \frac{1}{v_d} \frac{\lambda_d}{\lambda_C - \lambda_F}\right)^{-1}.$$

The following numerical values result for the first example:

$$\overline{S}^{(2)}(0) \approx 9.29 \text{ dpt}$$

$$\psi^{(2)}(0) \approx 7.76 \times 10^5 \text{ m}^{-2}. \tag{161a}$$

After substitution of equation (159) into equations (147), (148), (149), the refractive power of such a lens will be $$S(\overline{x}, \lambda) = S_{ref}(\overline{x}, \lambda) + S_{diff}(\overline{x}, \lambda) \tag{162}$$

$$= (n(\lambda) - 1)\overline{S}^{(2)}(\overline{x}) - \Psi^{(2)}(\overline{x}, \lambda)$$

$$= (n_d - 1)\left(1 - \frac{1}{v_d}\left(\frac{\lambda - \lambda_d}{\lambda_C - \lambda_F}\right)\right) \frac{S_{prescription}}{n_d - 1} \times \left(1 + \frac{1}{v_d} \frac{\lambda_d}{\lambda_C - \lambda_F}\right)^{-1}$$

$$-m\lambda \frac{1}{m} \times \frac{S_{prescription}}{-v_d(\lambda_C - \lambda_F)} \times \left(1 + \frac{1}{v_d} \frac{\lambda_d}{\lambda_C - \lambda_F}\right)^{-1}$$

$$= S_{prescription}.$$

The longitudinal chromatic aberration (FLF) of such a lens is $$FLF(\overline{x}) = S_{prescription} - S_{prescription} = 0. \tag{163}$$

The same applies to the lateral chromatic aberration $$FLF(\overline{x}) = 0. \tag{164}$$

Consequently, the minimization of the target function of type 1 results in a lens that exactly meets the prescription objectives and that is fully corrected with respect to the longitudinal chromatic aberration and the lateral chromatic aberration.

Second Example

In the second example, the spectacle lens is optimized polychromatically by minimizing a target function of type 2 (cf. equation (142b)). An exemplary target function is a target function of the form $$F = (a_d u + b_d v + c)^2 + (a_2 u + b_2 v + a_1 u - b_1 v)^2, \tag{165}$$

where $$a_d = (n_d - 1); \tag{166}$$

$$a_i = (n_d - 1)\left(1 - \frac{1}{v_d}\left(\frac{\lambda_i - \lambda_d}{\lambda_C - \lambda_F}\right)\right), i = 1, 2;$$

$$b_i = -m\lambda_i, i = 0, 1, 2;$$

$$c = -S_{prescription};$$

$$u = \overline{S}^{(2)}(0);$$

$$v = \psi^{(2)}(0).$$

Directly deriving F with respect to u and v and zeroing lead to the results $$u = \frac{(b_2 - b_1)c}{(a_2 - a_1)b_0 - (b_2 - b_1)a_0} \quad v = \frac{(a_2 - a_1)c}{(b_2 - b_1)a_0 - (a_2 - a_1)b_0}, \tag{167}$$

which is equivalent to $$\overline{S}^{(2)}(0) = \frac{S_{prescription}}{n_d - 1} \times \left(1 + \frac{1}{v_d} \frac{\lambda_d}{\lambda_C - \lambda_F}\right)^{-1} \tag{168}$$

$$\psi^{(2)}(0) = \frac{1}{m} \times \frac{S_{prescription}}{-v_d(\lambda_C - \lambda_F)} \times \left(1 + \frac{1}{v_d} \frac{\lambda_d}{\lambda_C - \lambda_F}\right)^{-1}$$

Thus, the solution according to equation (168) is identical to the solution according to equation (160), which is obtained by minimization of the target function of type 1.

Figure 8A:
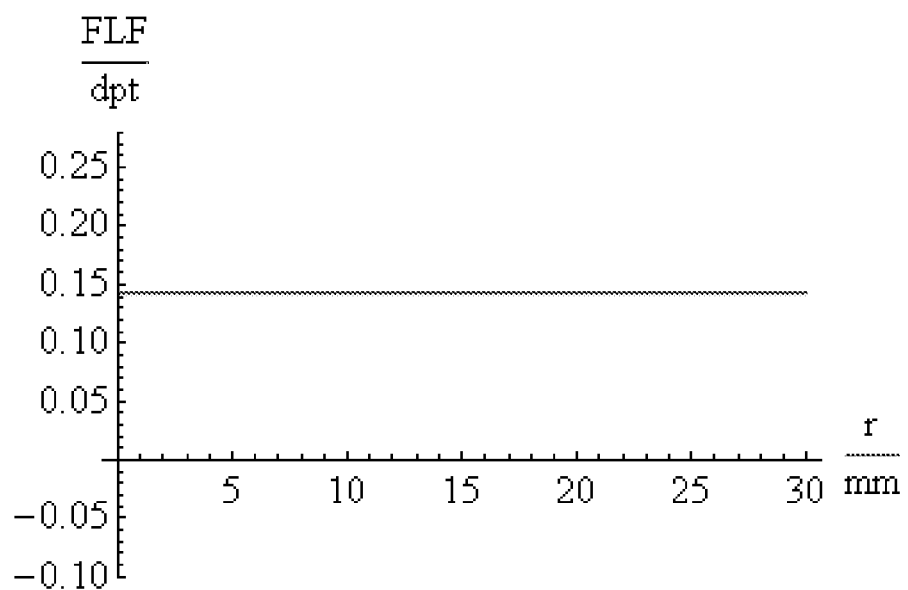
Figure 8B:
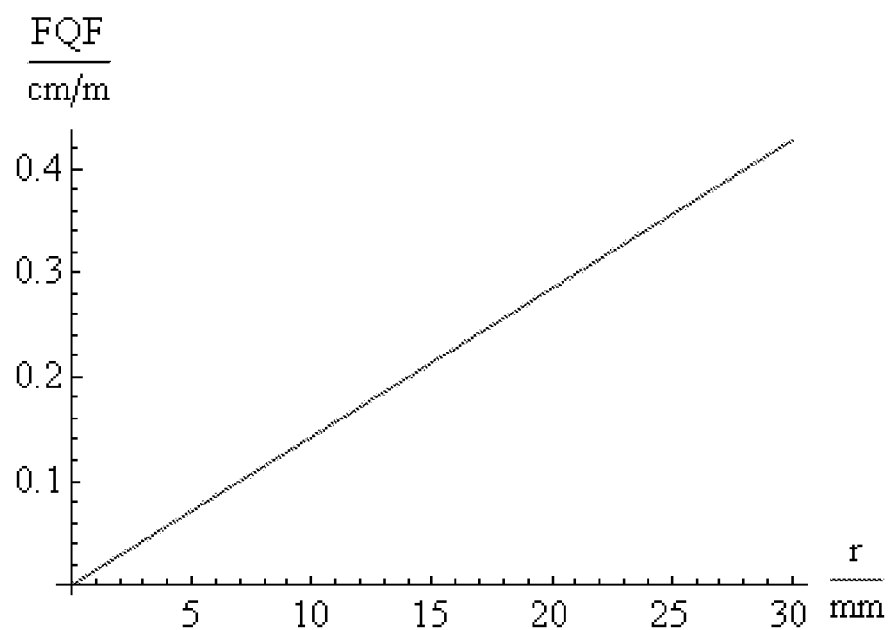

FIG. 8 shows the longitudinal chromatic aberration (FIG. 8A) and the lateral chromatic aberration (FIG. 8B) of the exemplary lens according to the comparative example 1. As can be seen from FIG. 8, a clear longitudinal chromatic aberration (FLF) of 0.14 dpt occurs, so that the lateral chromatic aberration (FQF) outside a radius of r≈8 mm is below the perception threshold for the color fringe of 0.12 cm/m, which is common in the physiology.

Figure 9A:
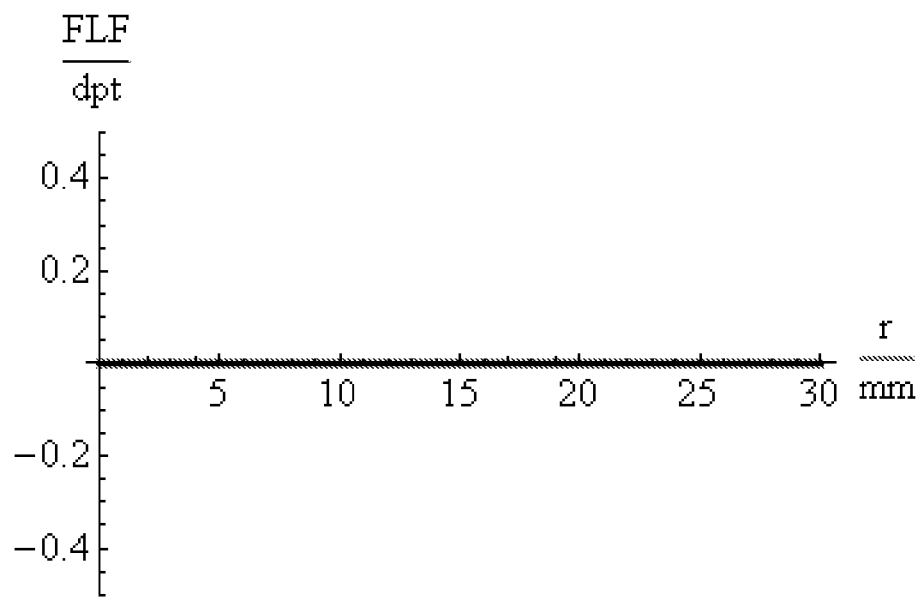
Figure 9B:
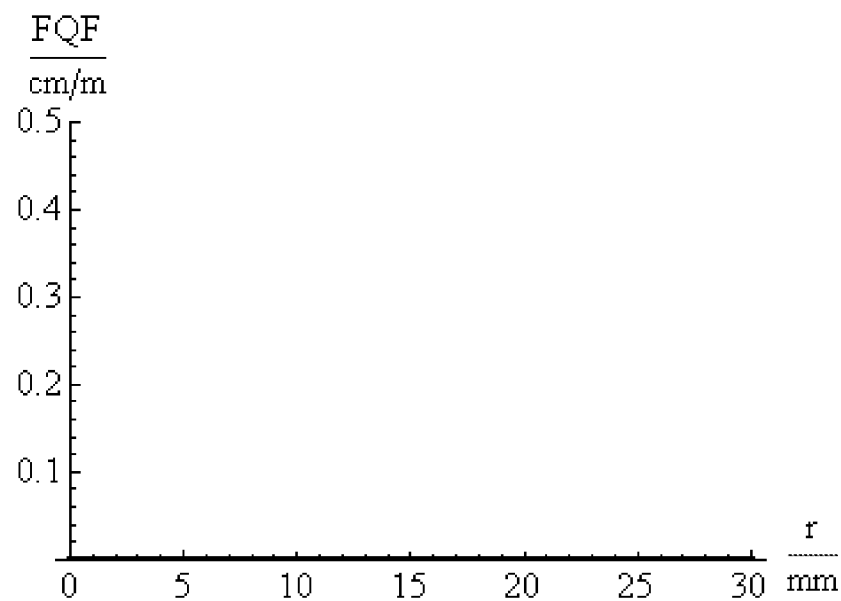

FIG. 9 shows the longitudinal chromatic aberration (FIG. 9A) and the lateral chromatic aberration (FIG. 9B) of the exemplary lens optimized according to a target function of type 1 (example 1) or of type 2 (example 2). In contrast to the comparative example 1, it is possible to bring the longitudinal chromatic aberration (FLF) and the lateral chromatic aberration (FQF) to zero across the entire lens by optimization according to a target function of type 1 or of type 2.

Figure 10A:
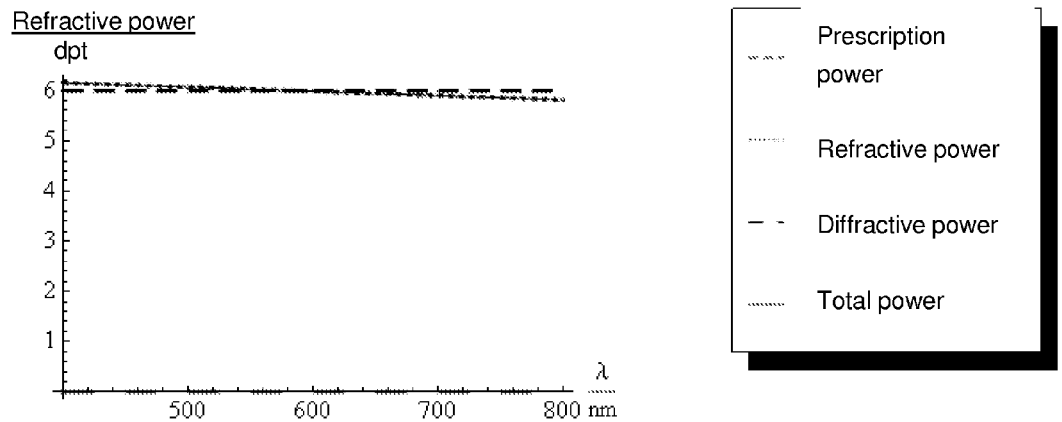
Figure 10B:
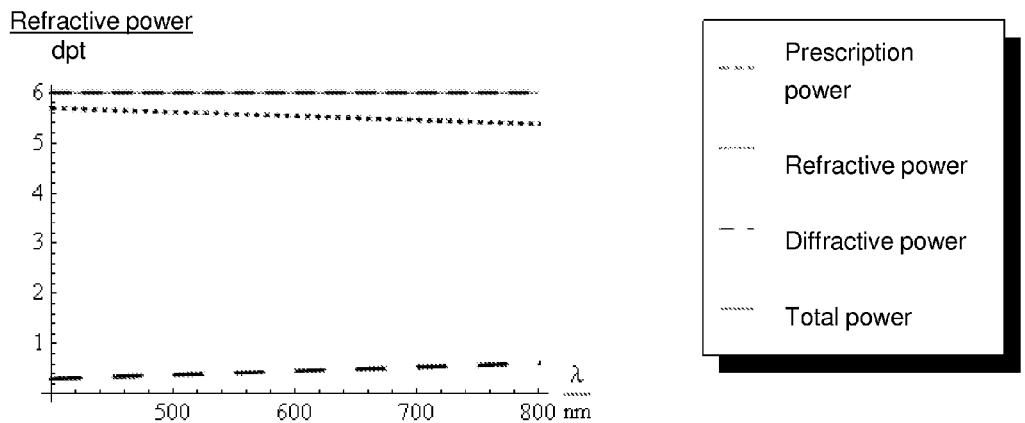

FIG. 10A shows the prescription power, the refractive power, the diffractive power, and the total power in the lens center as a function of the wavelength for the spectacle lens according to the comparative example 1, which has been optimized according to the monochromatic target function. FIG. 10B shows the prescription power, the refractive power, the diffractive power, and the total power in the lens center as a function of the wavelength for the spectacle lens optimized according to a target function of type 1 (example 1) or of type 2 (example 2).

The refractive error of the lens according to the comparative example 1 is shown in FIG. 10A by the slightly sloping, solid curve for the total power. The refractive error is exclusively determined by the refractive portion (short-dashed), which decreases for great wavelengths due to the dispersion. In contrast, in examples 1 and 2, only slightly more than 90% of the total power are attributed to the refractive portion (FIG. 10B). In addition, there is a diffractive portion (long-dashed), which slightly increases as the wavelength increases and thereby compensates for the decreasing behavior of the refractive portion. The result is a refraction-correct lens for all wavelengths.

Embodiment 2

A second comparative example relates to a spectacle lens optimized according to a method of the prior art by means of minimization of a monochromatic target function. The single-vision lenses of example 3 or example 4 are optimized according to one of the above-described methods by means of target functions of type 1 (example 3) or type 2 (example 4). As in the embodiment 1, the wavelengths decisive for the polychromatic optimization in embodiment 2 are $\lambda_1 = \lambda_F = 486.134$ nm and $\lambda_2 = \lambda_C = 656.281$ nm. The following table 2 summarizes the objectives for the optimization.

TABLE 2

|  | Target function | Degrees of freedom | Evaluation points |
|---|---|---|---|
| Comparative example 2 | monochromatic | 1 (refractive) | 11 |
| Example 3 | type 1 | 1 (refractive) + 3 (diffractive) = 4 | 11 |
| Example 4 | type 2 | 1 (refractive) + 3 (diffractive) = 4 | 11 |

In this embodiment, the refractive surface to be optimized is specified by an exact sphere described by the one degree of freedom of the curvature k:

$$\overline{S}(\overline{x}) = \frac{1}{k} - \sqrt{\frac{1}{k^2} - \overline{x}^2}. \tag{169}$$

The grating phase is specified by the function $$\psi(\overline{x}) = \frac{\alpha_2}{2}\overline{x}^2 + \frac{\alpha_3}{3!}\overline{x}^3 + \frac{\alpha_4}{4!}\overline{x}^4 \tag{170}$$

with the three parameters $\alpha_2, \alpha_3, \alpha_4$ as degrees of freedom. For all evaluation points, it holds that $$\overline{x}_i = -30 \text{ mm} + (i-1) \times 6 \text{ mm}, \, i = 1, 2, \ldots, x. \tag{171}$$

Thus, the 11 evaluation points are the evaluation points $\overline{x}_1 = -30$ mm, $\overline{x}_2 = -24$ mm, ..., $\overline{x}_{11} = +30$ mm.

Second Comparative Example

For the optimization according to the second comparative example, a monochromatic target function according to equation (140) is used. On the assumptions of embodiment 2, the target function has the form $$F_{monochrom} = \sum_{i=1}^{11} (a_d u_i + c)^2 \tag{172}$$

where $u_i = S^{(2)}(\overline{x}_i)$.

A minimum search of equation (172) for the degree of freedom k can be performed e.g. by differentiating and zeroing, or by a numerical method for minimum search. A suitable numerical method for minimum search is e.g. the method of conjugate gradients, the method by means of main axis determination, the Levenberg-Marquardt method, Newton's method, or a quasi-Newton's method.

As a result of this minimum determination, the value $$k \approx 9.49 \text{ dpt} \tag{173}$$

is determined for the parameter k.

This value is slightly smaller than the value determined in one of the monochromatic optimizations with only one single evaluation point according to the comparative example 1 (cf. equation (153)).

Third Example

In comparison with the second comparative example, the target function of type 1 used in the third example is of the form $$F_1 = \sum_{i=1}^{11} (a_1 u_i + b_1 v_i + c)^2 + (a_2 u_i + b_2 v_i + c)^2, \tag{174}$$

where $u_i = S^{(2)}(\overline{x}_i)$, $v_i = \psi^{(2)}(\overline{x}_i)$.

A minimum search of equation (174) with respect to the degrees of freedom k, $\alpha_2, \alpha_3, \alpha_4$ leads to the following results:

$k \approx 8.846$ dpt;

$\alpha_2 \approx 1.24 \times 10^6$ m$^{-2}$;

$\alpha_3 \approx 4.04 \times 10^{-9}$ m$^{-3}$;

$\alpha_4 \approx -2.33 \times 10^9$ m$^{-4}$. \quad (175)

Particularly, this results in $\overline{S}^{(2)}(0) \approx 8.846$ dpt $\psi^{(2)}(0) = 1.24 \times 10^6$ m$^{-2}$ \quad (175a)

and $\overline{S}^{(2)}(30 \text{ mm}) \approx 9.86$ dpt $\psi^{(2)}(30 \text{ mm}) = 1.91 \times 10^5$ m$^{-2}$. \quad (175b)

In a comparison of equation (161a) with equations (175a) and (175b), it can be seen that the equation (161a), which is based on an optimization with only one evaluation point, substantially provides average values of equations (175a) and (175b), which are each based on an optimization with 11 evaluation points.

Fourth Example

The target function used in the optimization of the spectacle lens according to the fourth example is of the form $$F_1 = \sum_{i=1}^{11} (a_d u_i + b_d v_i + c)^2 + (a_2 u_i + b_2 v_i - a_1 u_i - b_1 v_i)^2. \tag{176}$$

A minimum search of equation (176) for the degrees of freedom k, $\alpha_2, \alpha_3, \alpha_4$ leads to the following results:

$k \approx 8.847$ dpt;

$\alpha_2 \approx 1.19 \times 10^6$ m$^{-2}$;

$\alpha_3 \approx 2.34 \times 10^{-9}$ m$^{-3}$;

$\alpha_4 \approx -2.12 \times 10^9$ m$^{-4}$. (177)

Particularly, this results in $\bar{S}^{(2)}(0) \approx 8.846$ dpt $\psi^{(2)}(0) = 1.19 \times 10^6$ m$^{-2}$ (177a)

and $\bar{S}^{(2)}(30 \text{ mm}) \approx 9.87$ dpt $\psi^{(2)}(30 \text{ mm}) = 2.42 \times 10^5$ m$^{-2}$. (177b)

The above values are comparable to, but slightly deviate from the corresponding values obtained by means of a minimum search of the target function of type 1. The results of the spectacle lens optimization according to the target function of type 1 (third example) and of type 2 (fourth example), in comparison with the optimization according to the monochromatic target function (second comparative example), are illustrated in FIGS. 11 to 15.

Figure 11A:
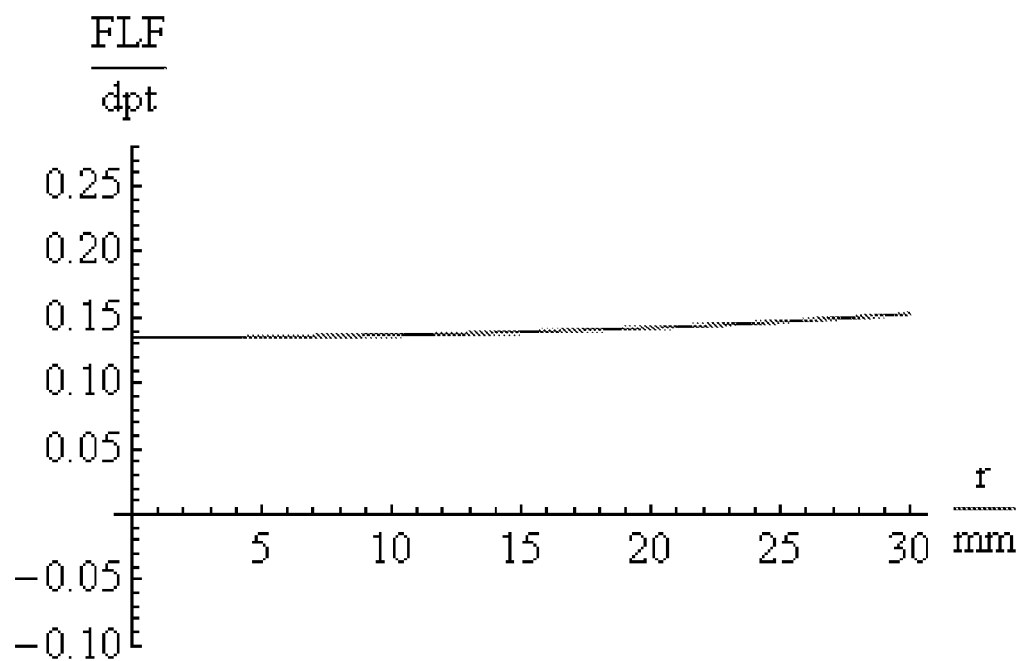
Figure 11B:
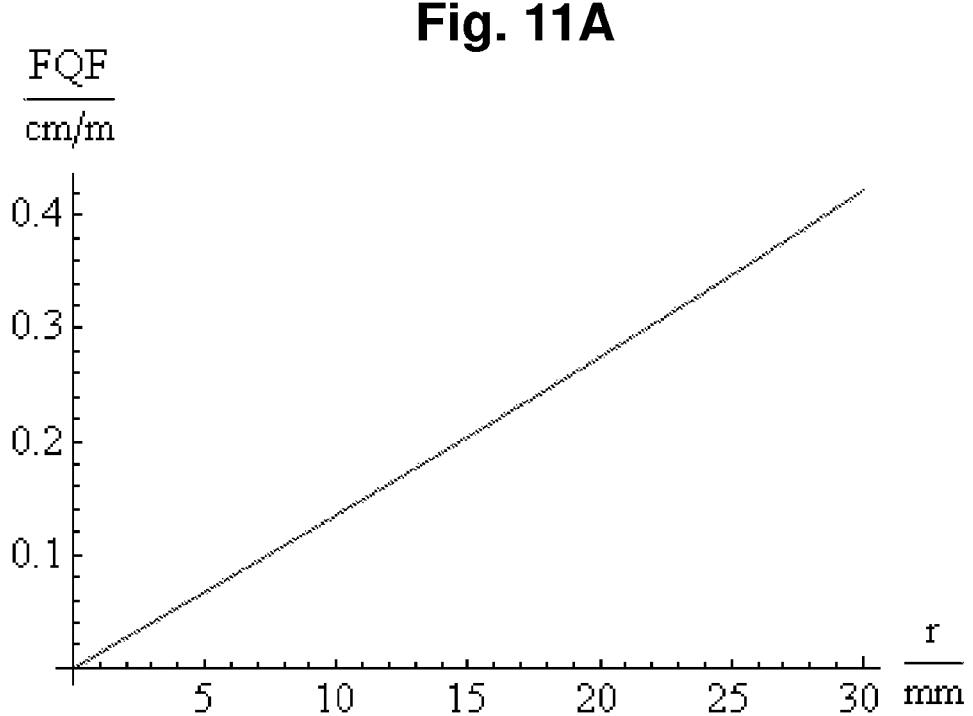

FIG. 11 illustrates the longitudinal chromatic aberration (FIG. 11A) and the lateral chromatic aberration (FIG. 11B) of the spectacle lens according to the second example as a function of the radial coordinate. Similar to the first comparative example (cf. FIGS. 8A and 8B) with only one evaluation point, the longitudinal chromatic aberration is above 0.12 dpt across the entire lens also in this case. In contrast to the first comparative example, it slightly increases toward the outside though. The lateral chromatic aberration has practically a similar course as in FIG. 8B.

Figure 12A:
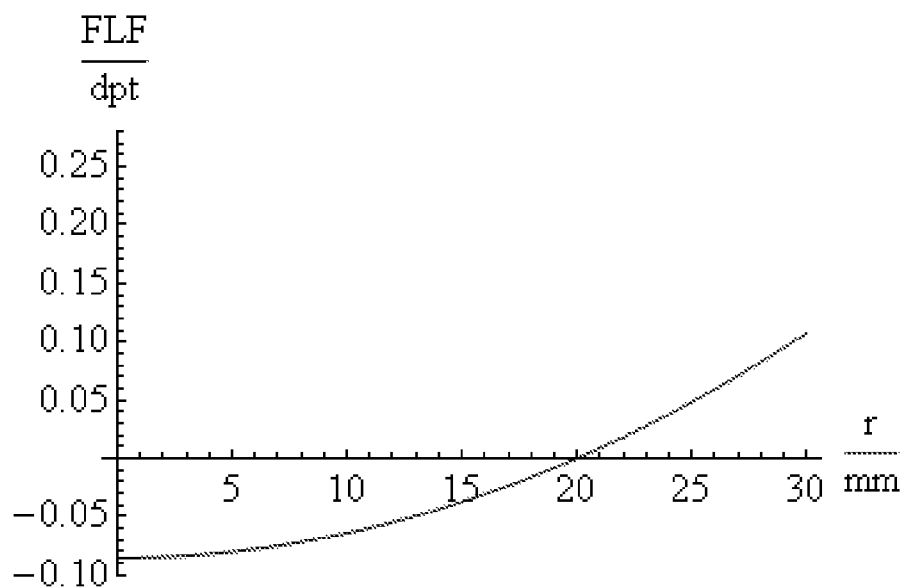
Figure 12B:
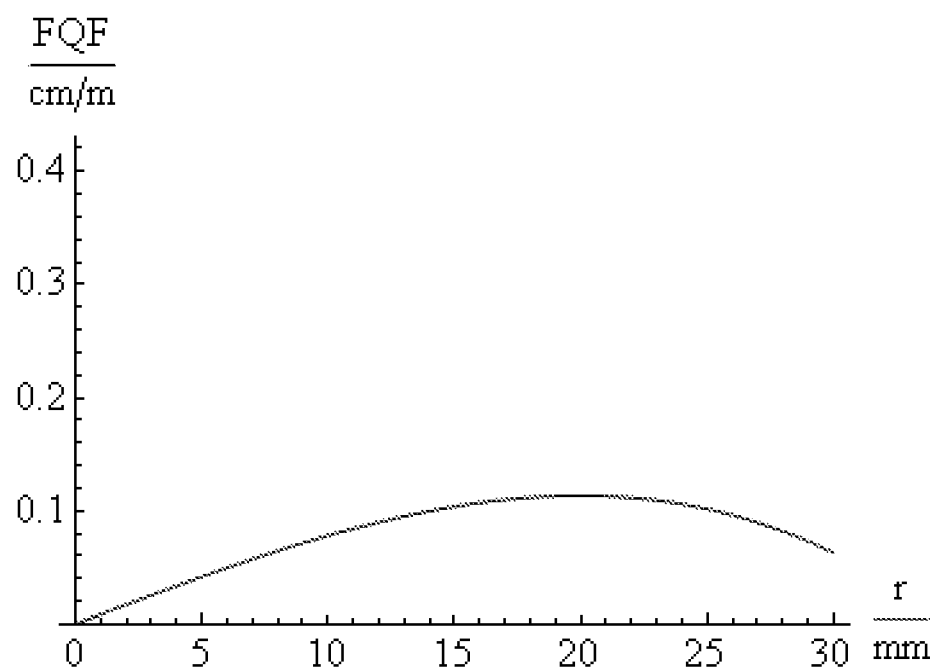

FIG. 12 shows the longitudinal chromatic aberration (FIG. 12A) and the lateral chromatic aberration (FIG. 12B) of a spectacle lens optimized according to the third example according to a target function of type 1. The optimization of a target function of type 1 results in a spectacle lens having a longitudinal chromatic aberration in an amount of below 0.1 dpt everywhere (FIG. 12A). The corresponding lateral chromatic aberration is below the perception threshold of 0.12 cm/m everywhere in the lens (FIG. 12B).

Figure 13A:
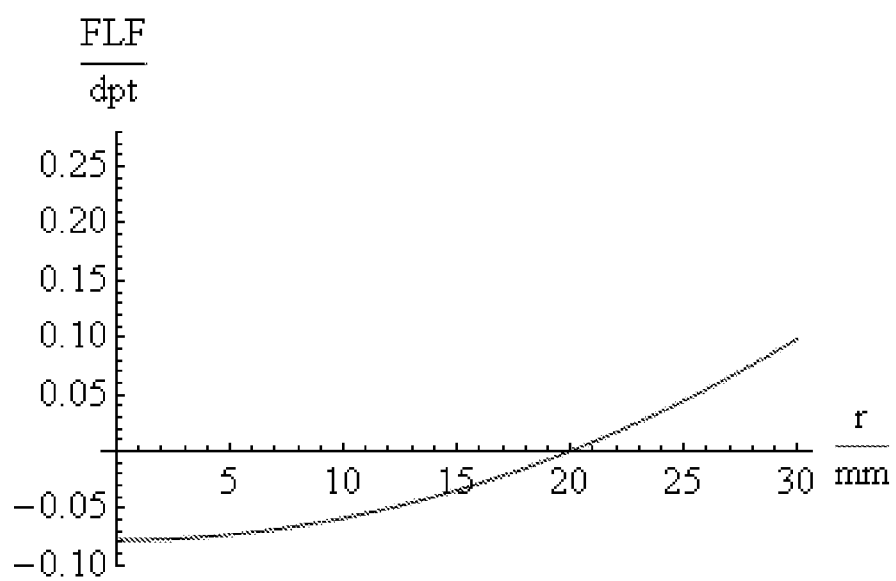
Figure 13B:
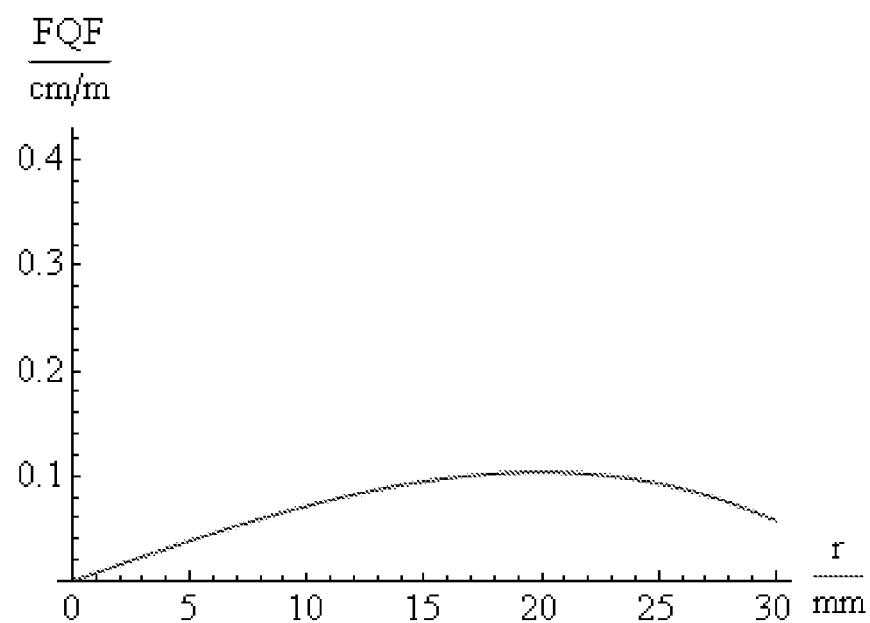

FIG. 13 shows the longitudinal chromatic aberration (FIG. 13A) and the lateral chromatic aberration (FIG. 13B) of a spectacle lens optimized according to the fourth example according to a target function of type 2. If a target function of type 2 is optimized, as in the fourth example, the results will slightly differ numerically from those of a target function of type 1. In terms of quality, the improvement with respect to the prior art (cf. comparative example 2) is very similar.

Figure 14A:
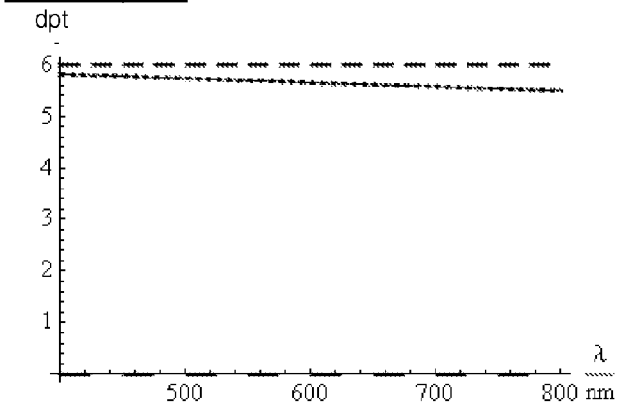
Figure 14B:
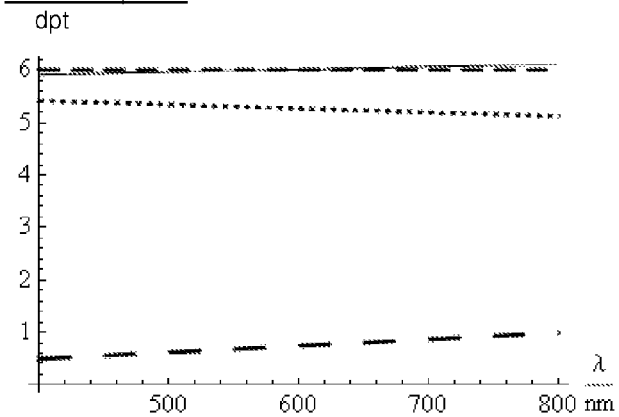
Figure 14C:
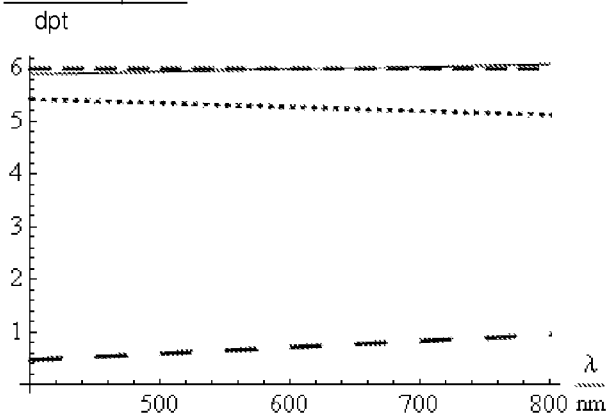

By analogy with FIGS. 10A-B, FIGS. 14A-C illustrate the wavelength dependencies different variables (prescription power, refractive power, diffractive power, and the total power in the lens center). FIG. 14A shows the courses for the monochromatic optimization according to a second comparative example, FIG. 14B shows the results of an optimization according to the third example using a target function of type 1, and FIG. 14C shows the results of an optimization according to the fourth example using a target function of type 2. As can be seen from FIGS. 14A-C, in contrast to embodiment 1, no noticeable changes by the addition of evaluation points are visible. Moreover, there are only marginal differences between the optimizations according to type 1 and type 2.

Figure 15A:
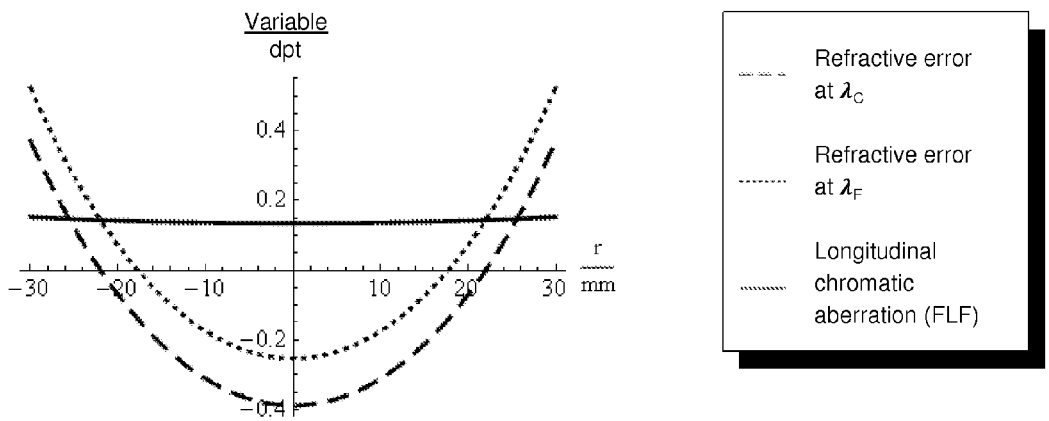
Figure 15B:
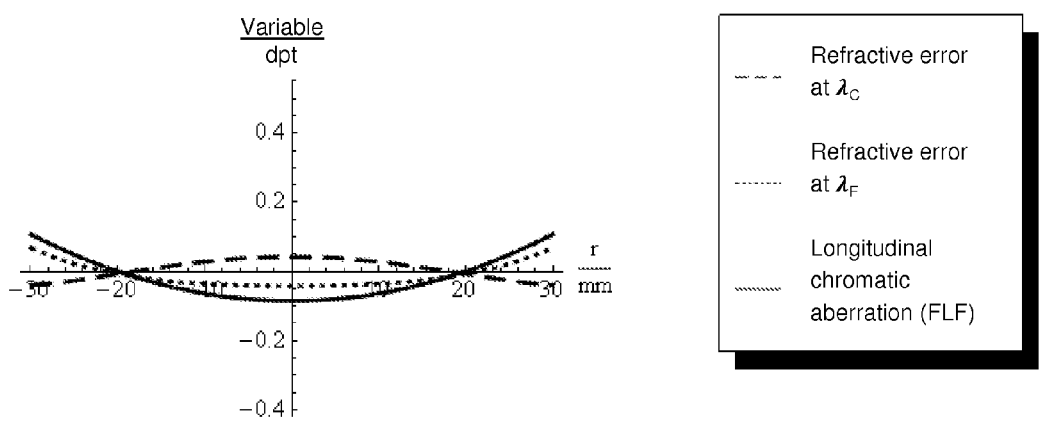
Figure 15C:
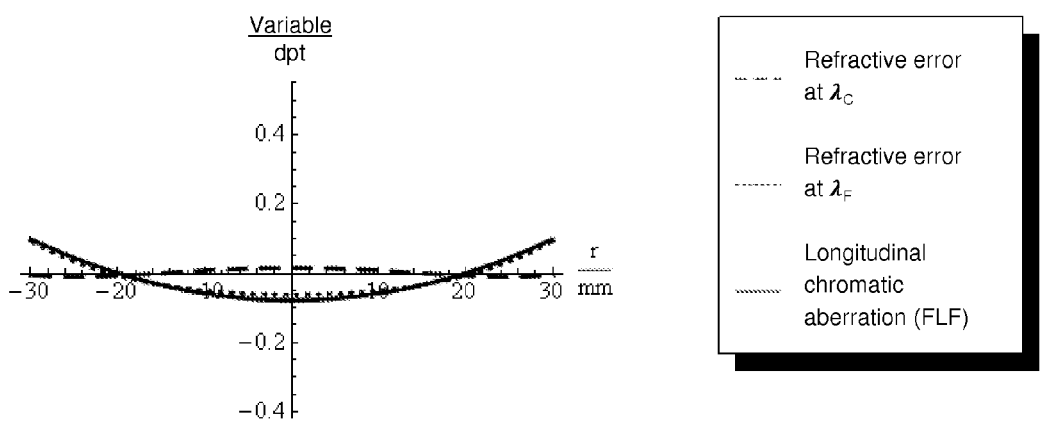

In contrast, in FIGS. 15A-C, the refractive errors at different wavelengths and the longitudinal chromatic aberration are plotted on a finer scale against the radial coordinate. In particular, FIG. 15A shows the refractive error at the wavelength $\lambda_C$, the refractive error at the wavelength $\lambda_F$, and the longitudinal chromatic aberration of a lens according to comparative example 2, which has been optimized according to the above-described monochromatic target function. FIG. 15B shows the refractive error at the wavelength $\lambda_C$, the refractive error at the wavelength $\lambda_F$, and the longitudinal chromatic aberration of a lens according to the third example, which has been optimized according to a polychromatic target function of type 1. FIG. 15C the refractive error at the wavelength $\lambda_C$, the refractive error at the wavelength $\lambda_F$, and the longitudinal chromatic aberration of a lens according to the fourth example, which has been optimized according to a polychromatic target function of type 2.

As can be seen from FIG. 15A, the spectacle lens optimized according to a monochromatic optimization at first has a large stroke of the refractive errors at both wavelengths. However, that is substantially a feature of the selected surface representation and can substantially be avoided by selecting a more flexible surface representation. In contrast, the constantly high longitudinal chromatic aberration in FIG. 15A is an evitable feature of the monochromatic optimization method according to the prior art, in which the color fringe is not corrected. By adding a diffraction grating and by using an exemplary method according to the invention, the longitudinal chromatic aberration can be improved strongly (FIG. 15B). The optimization by means of a target function of type 1 results in a clear reduction of the longitudinal chromatic aberration combined with a simultaneous, clear reduction of the refractive errors. An optimization by means of a target function of type 2 results in similarly great improvements, but with a different error distribution as a function of the coordinate (FIG. 15C) in the individual case.

Figure 16A:
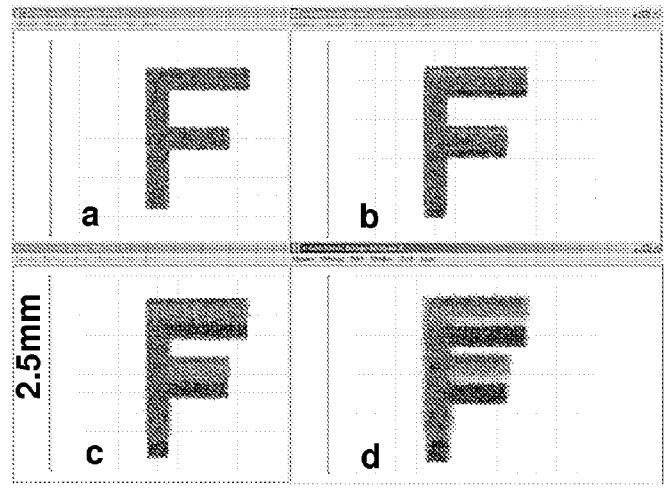
FIG. 16B shows an image formation through a spectacle lens with corrected color fringe, without an aspherical follow-up optimization of the refractive surfaces.
FIG. 16C shows an image formation through a spectacle lens optimized by means of a simultaneous color fringe optimization and an aspherical follow-up optimization.
Figure 16B:
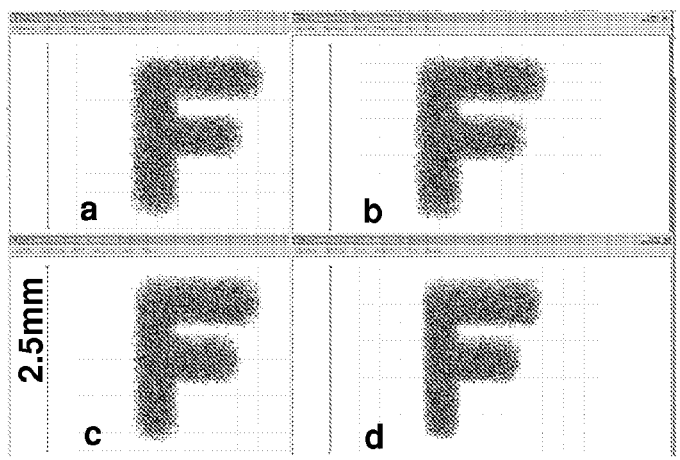
Figure 16C:
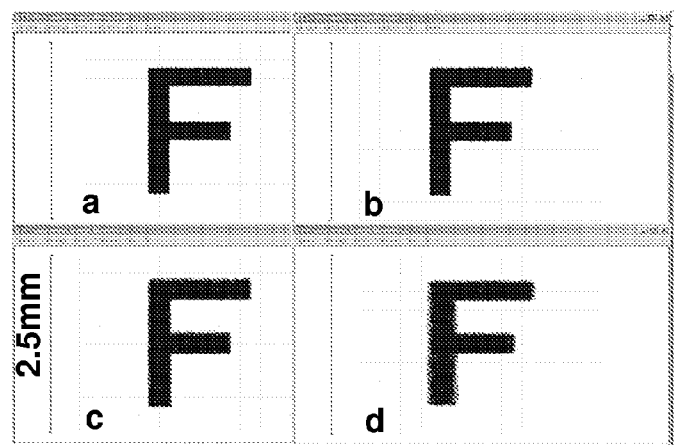

FIGS. 16A to 16C illustrate the color fringe of a spectacle lens for different viewing angles a) 0° b) 10° c) 20° d) 30°, wherein FIG. 16A shows a non-corrected image formation through a monochromatically optimized spectacle lens, FIG. 16B shows an image formation through a spectacle lens with corrected color fringe, without an aspherical secondary optimization of the refractive surfaces, and FIG. 16C shows an image formation through a spectacle lens optimized by means of a simultaneous color fringe optimization and an aspherical secondary optimization. As can be seen from FIG. 16B, a color fringe correction without taking the refractive errors of the spectacle lens with the grating results in a slightly more blurred image formation. Only considering both the color fringe and the refractive error, e.g. by means of a simultaneous optimization of the diffraction grating and at least one of the refractive surfaces, leads to a sharp image formation with corrected color fringe.

With the proposed procedure according to a preferred embodiment of the invention, an optimum combination of refractive surfaces and diffraction gratings can be determined both for single-vision lenses and for multifocal lenses, which optimizes at least the second-order aberrations and also minimizes the color fringe. In this respect, the method according to the fourth example of the invention is particularly suitable. However, a good approximation of an optimum combination can also be achieved with the methods according to the first to third embodiments.

Figure 17C:
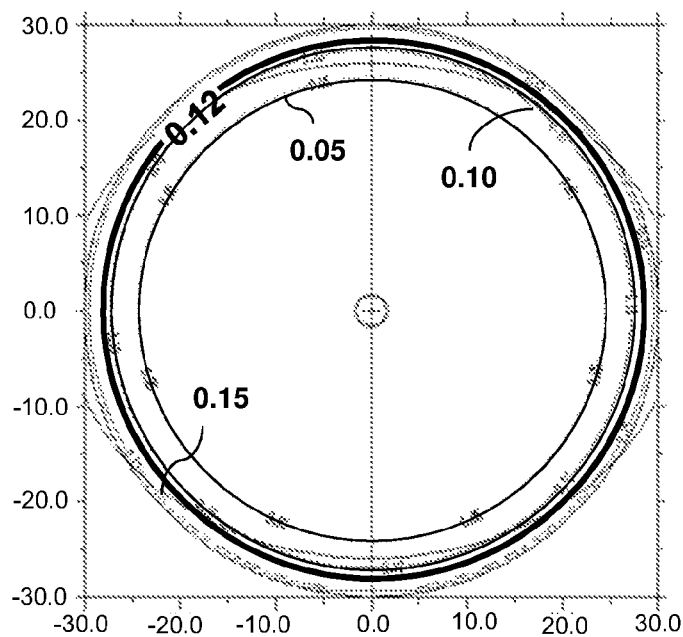

FIGS. 17A-17C show the results of an exemplary color fringe correction with a rotationally symmetric single-vision lens having a spherical power (sph) of −4.0 dpt, wherein the lens properties are indicated in mm as a function of the spectacle lens coordinates. FIG. 17A shows the color fringe of a conventional non-corrected single-vision lens of the optical material Perfalit 1.5 with a refractive index 1.5 and an Abbe number of 58.5. FIG. 17B shows the color fringe of a conventional non-corrected single-vision lens of the optical material Perfalit 1.6 with a refractive index 1.6 and an Abbe number of 40.5. FIG. 17C shows the color fringe of a color fringe-corrected single-vision lens of the highly refractive optical material Perfalit 1.74, with a refractive index of 1.74. The color fringe-corrected single-vision lens has an effective Abbe number of approximately 130.

FIGS. 18a-18D show an exemplary color fringe correction of a progressive spectacle lens by means of a diffraction grating, wherein FIG. 18A shows the astigmatism in the wearing position of the spectacle lens, FIG. 18B shows the diffractive phase or form of the grating lines of the diffraction grating, FIG. 18C shows the color fringe of the non-corrected spectacle lens, and FIG. 18D shows the color fringe of the corrected spectacle lens. The progressive spectacle lens has a spherical power in the distance reference point (sph) of −4.0 dpt and an addition of 2.5 dpt. The refractive index of the optical material of the spectacle lens is n=1.668 and the Abbe number is $v_d$=31.81. As can be seen from a comparison of FIGS. 18C and 18D, it is possible to achieve a good color fringe correction also for relatively highly asymmetric surfaces or optical elements.

REFERENCE NUMERAL LIST 10 incident wavefront
12 boundary surface
14 periodic structure (diffraction grating)
16 outgoing wavefront
20 prism
100 optical element/system (e.g. spectacle lens)
102 incident ray
104,106 refractive boundary surfaces
108 outgoing ray
108-m outgoing ray of the $m^{th}$ diffraction order
110 incident wavefront
112 outgoing wavefront
122 diffraction grating
114 optical material
116 passage through the optical material
122a grating lines
112b projected grating lines
124 plane of incidence
126 orthogonal trajectories
130-134 steps of the transition between a period function and a phase function

The invention claimed is:

1. A computer-implemented method for assessing at least one optical property of $k^{th}$ order, wherein k≥3 and is an integer, of an optical element at at least one evaluation point, wherein the optical element comprises at least one boundary surface formed of a refractive base surface and at least one phase-modifying optical element, and manufacturing the optical element, the method comprising:
    determining the properties of a wavefront in the local surrounding of the at least one evaluation point by a local wavefront tracing; and
    determining the at least one optical property at the at least one evaluation point on the basis of the properties of the wavefront in the local surrounding of the at least one evaluation point,
    wherein the local wavefront tracing comprises a local wavefront tracing upon passage through the at least one boundary surface, and the local wavefront tracing upon passage through the at least one boundary surface is performed according to an equation for the local wavefront tracing through the refractive base surface, said equation being supplemented by an additive additional term $PK^{(k)}$, and
    wherein the additive additional term $PK^{(k)}$ depends on the local derivatives of $k^{th}$ order of a phase function $\Psi(\bar{x},\bar{y})$, assigned to the phase-modifying optical element, with respect to the coordinates tangentially to the base surface, wherein the phase function $\Psi(\bar{x},\bar{y})$ represents the optical path length difference introduced by the at least one phase-modifying optical element as a function of the coordinates $(\bar{x},\bar{y})$ tangentially to the base surface; and
    manufacturing the optical element based on the local wavefront tracing.

2. The method according to claim 1, wherein determining the at least one optical property comprises determining the course of a main ray passing through the evaluation point.

3. The method according to claim 1, further comprising obtaining surface data of the at least one refractive base surface and of the phase-modifying optical element.

4. The method according to claim 3, wherein the data of the phase-modifying optical element comprises data relating to the course of a grating lines of the phase-modifying optical element, and wherein the phase function $\psi(\bar{x},\bar{y})$ is determined on the basis of the obtained data relating to the course of the grating lines of the phase-modifying optical element such that isolines of the phase function or curves with $\psi(\bar{x},\bar{y})$=c, where c is an integer constant and c≥0, are parallel to the grating lines of the phase-modifying optical element.

5. The method according to claim 4, wherein determining the phase function comprises:
    measuring a grating projection in a predetermined plane ($\bar{x}^0,\bar{y}^0$); determining a phase function $\psi^0(\bar{x}^0,\bar{y}^0)$ in a global coordinate system $(\bar{x}^0,\bar{y}^0,\bar{z}^0)$ by regarding the grating lines projected in the plane $(\bar{x}^0,\bar{y}^0)$ as curves $\psi^0(\bar{x}^0,\bar{y}^0)$=c, where c is an integer constant and c≥0, wherein for all points lying between the grating lines, the values of the phase function are obtained by interpolation;
    transforming the determined phase function $\psi^0(\bar{x}^0,\bar{y}^0)$ into a local coordinate system $(\bar{x},\bar{y},\bar{z})$, the $\bar{z}$ axis of which is perpendicular to the base surface in the evaluation point:

$$\psi(\bar{x},\bar{y})=\psi^0(\bar{x}^0(\bar{x}^0,\bar{y}^0),\bar{y}^0(\bar{x},\bar{y}))$$

specifying a wavelength and a diffraction order;
    determining the phase function $\Psi(\bar{x},\bar{y})$ according to the equation $\Psi(\bar{x},\bar{y})=\Psi(\bar{x},\bar{y};\lambda,m)=m\lambda\cdot\psi(\bar{x},\bar{y})$,
    wherein the global coordinate system $(\bar{x}^0,\bar{y}^0,\bar{z}^0)$ is a coordinate system serving to describe the base surface by its vertex depth; and the local coordinate system $\bar{x},\bar{y},\bar{z}$ is a local coordinate system serving to describe the passage of a main ray through a boundary surface, wherein $(\bar{x},\bar{y},\bar{z})$=(0,0,0) holds at a penetration point of the main ray with the boundary surface, and wherein the $\bar{z}$ axis is perpendicular to the base surface at the penetration point.

6. The method according to claim 1, further comprising comparing the optical property determined at the at least one evaluation point to a predetermined target value for the at least one optical property at the at least one evaluation point.

7. The method according to claim 1, wherein the at least one optical property is a coma and/or a spherical aberration and/or a trefoil.

8. The method according to claim 1, wherein the at least one optical property is assessed at a plurality of evaluation points, wherein the plurality of evaluation points comprises at least 1000 evaluation points.

9. The method according to claim 1, wherein the optical element is a spectacle lens.

10. The method according to claim 9, wherein determining at least one optical property of the spectacle lens is performed taking a predetermined average or individual wearing position of the spectacle lens and/or a predetermined average or individual object distance model into consideration.

11. The method according to claim 1, wherein the phase-modifying optical element is a diffraction grating.

12. A non-transitory computer program product adapted, when loaded and executed on a computer, to perform a method for assessing at least one optical property of an optical element according claim 1.

13. A storage medium with a non-transitory computer program stored thereon, wherein the computer program is adapted, when loaded and executed on a computer, to perform a method for assessing at least one optical property of an optical element according to claim 1.

14. A device for assessing at least one optical property of an optical element at at least one evaluation point, comprising a computer adapted to perform a method for assessing at least one optical property of an optical element according to claim 1.

15. A method for manufacturing an optical element comprising at least one phase-modifying optical element arranged on a refractive base surface, comprising:
    specifying an optical element to be optimized;
    optimizing the specified optical element so as to reduce the deviation of the value of at least one optical property of the optical element from a target value at at least one evaluation point, wherein the at least one optical property is assessed according to the method for assessing at least one optical property of the optical element according to claim 1.

16. The method for manufacturing an optical element according to claim 15, wherein optimizing or modifying the specified optical element comprises calculating a target function, which depends on the at least one optical property.

17. The method for manufacturing an optical element according to claim 15, wherein optimizing or modifying the specified optical element comprises varying the refractive base surface and/or the phase-modifying optical element.

18. A device for manufacturing an optical element, the optical element being a spectacle lens, with at least one phase-modifying optical element, comprising
    a specifier adapted to specify an optical element to be optimized;
    an optimizer adapted to perform an optimization or modification of the specified optical element so as to reduce the deviation of the value of at least one optical property of the optical element from a target value at at least one evaluation point, wherein the at least one optical property is assessed according to the method for assessing at least one optical property of the optical element according to claim 1.

19. The method according to claim 1, wherein the at least one optical property is assessed at a plurality of evaluation points, wherein the plurality of evaluation points comprises at least 2000 evaluation points.

20. The method according to claim 1, wherein the at least one optical property is assessed at a plurality of evaluation points, wherein the plurality of evaluation points comprises at least 5000 evaluation points.

21. The method according to claim 1, wherein the at least one optical property is assessed at a plurality of evaluation points, wherein the plurality of evaluation points comprises at least 10000 evaluation points.

* * * * *